(12) United States Patent
He

(10) Patent No.: US 10,827,876 B2
(45) Date of Patent: Nov. 10, 2020

(54) AUTOMATED COOKING APPARATUS WITH A STIRRING MECHANISM AND A LID MECHANISM

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 346 days.

(21) Appl. No.: 15/869,805

(22) Filed: Jan. 12, 2018

(65) Prior Publication Data

US 2018/0140132 A1    May 24, 2018

Related U.S. Application Data

(63) Continuation-in-part of application No. 14/918,608, filed on Oct. 21, 2015, now abandoned.
(60) Provisional application No. 62/068,521, filed on Oct. 24, 2014.

(51) Int. Cl.
*A47J 36/16* (2006.01)
*A47J 36/06* (2006.01)

(52) U.S. Cl.
CPC ............. *A47J 36/165* (2013.01); *A47J 36/06* (2013.01)

(58) Field of Classification Search
None
See application file for complete search history.

(56) References Cited

U.S. PATENT DOCUMENTS

| | | | |
|---|---|---|---|
| 3,688,684 A * | 9/1972 | Piedallu | A47J 37/1209 99/409 |
| 4,173,925 A * | 11/1979 | Leon | A47J 27/14 219/389 |
| 4,432,650 A * | 2/1984 | Langen | A22C 5/00 366/147 |
| 4,704,956 A * | 11/1987 | Gill | A47J 27/14 99/372 |
| 4,763,570 A * | 8/1988 | Bellanca | A47J 27/14 366/144 |
| 4,821,631 A * | 4/1989 | Wong | A47J 27/14 99/327 |
| 5,351,605 A * | 10/1994 | Sai | A47J 27/18 392/471 |
| 6,190,032 B1 * | 2/2001 | Choda | B01F 11/0014 366/208 |

(Continued)

*Primary Examiner* — Tu B Hoang
*Assistant Examiner* — Masahiko Muranami

(57) ABSTRACT

The present application discloses an automated cooking apparatus comprising: a cookware configured to hold food or food ingredients; a stirring motion mechanism configured to produce a motion in the cookware as to stir, mix or distribute the food or food ingredients held in the cookware; and a lid mechanism. The lid mechanism comprises a blocking device and a motion mechanism configured to move the blocking device relative to a support component of the stirring motion mechanism. If the blocking device is at a certain position relative to the support component of the stirring motion mechanism and when the cookware is moved by the stirring motion mechanism, the blocking device is configured to help trap the food or food ingredients held in the cookware. Our stirring motion mechanism produces rather complex movements in the cookware. It is advantageous than rotational motions around an axis, as our stirring motion does not induce eccentric forces which can make the food or food ingredients move away from a rotating axis, and escape the cookware en masse.

18 Claims, 53 Drawing Sheets

(56) References Cited

U.S. PATENT DOCUMENTS

| | | | | |
|---|---|---|---|---|
| 6,629,491 B1* | 10/2003 | Chan | ............... | A47J 27/004 |
| | | | | 366/145 |
| 2008/0289510 A1* | 11/2008 | Liu | ............... | A47J 36/34 |
| | | | | 99/348 |
| 2010/0112183 A1* | 5/2010 | Gurner | ............... | A47J 43/10 |
| | | | | 426/614 |
| 2013/0224359 A1* | 8/2013 | Cretors | ............... | A47J 37/049 |
| | | | | 426/523 |
| 2014/0199459 A1* | 7/2014 | Jackson | ............... | A47J 37/0611 |
| | | | | 426/523 |

\* cited by examiner

AUTOMATED COOKING APPARATUS WITH A STIRRING MECHANISM AND A LID MECHANISM

This application is a continuation-in-part of the U.S. patent application Ser. No. 14/918,608 filed Oct. 21, 2015, which claims the benefit of U.S. Provisional Application Ser. No. 62/068,521 filed Oct. 24, 2014. Entire contents of all the above applications are incorporated herein by reference.

CROSS-REFERENCE TO RELATED APPLICATIONS

U.S. Provisional Patent Application

Ser. No. 62/068,521; Filed Oct. 24, 2014; Inventor: Zhengxu He

U.S. Nonprovisional Patent Application

Ser. No. 14/918,608; Filed Oct. 21, 2015; Inventor: Zhengxu He
Ser. No. 15/706,136; Filed Sep. 15, 2017; Inventor: Zhengxu He
Ser. No. 13/607,712; Filed Sep. 8, 2012; Inventor: Zhengxu He

BACKGROUND OF THE INVENTION

The present application relates to an automated cooking apparatus comprising a cookware configured to hold food or food ingredients for cooking; a stirring motion mechanism configured to produce a motion in the cookware as to stir, mix or distribute the food or food ingredients held in the cookware; and a lid mechanism. The stirring motion mechanism may substitute a spatula or a traditional mixer.

Our stirring motion mechanism produces rather complex movements in the cookware. It is advantageous than rotational motions around an axis, as rotational motion induces eccentric forces which may make the food or food ingredients move away from the rotating axis, and thus out of the cookware. Our motions are of vibratory type. For this reason, it is much harder to design a lid. The motion of the cookware can be quite vibrant; and magnitudes of the motion are often in tens of millimeters, usually much smaller than the diameter of the cookware.

In addition, during some time-period in a heated cooking, depending on recipe and other factors, it may be necessary to limit air flow between inside the cookware and the outside, so that the heat in the food ingredients inside the cookware may be better preserved. In this case, a solid cover may be needed to close on the cookware. During other times, it may be necessary to have air flow between the inside and outside of the cookware, so the heat inside the cookware can be efficiently dissipated; and in this case a net cover (or a porous cover) may be needed to help prevent the food or food ingredients from jumping out of the cookware.

Traditionally, a cover is on the cookware only when the motion in the cookware by a stirring motion mechanism is stopped. However, there may be times when the cover or lid is needed during periods when the food ingredients are vibrantly stirred or mixed or distributed and when it is necessary to limit or insulate the heat flow from the inside of the cookware.

An automated cover may be mounted on a holder wherein the holder is a solid which is fixedly connected to the cookware. However, this would add some burden to the stirring motion mechanism as the cover and the cookware need to be moved together. Thus there is a need for a lid mechanism which does not move with the cookware, and which may be used to satisfy the above needs.

BRIEF SUMMARY OF THE INVENTION

The present patent application discloses an automated cooking apparatus comprising: a cookware configured to hold food or food ingredients for cooking; a stirring motion mechanism configured to produce a motion in the cookware as to stir, mix or distribute the food or food ingredients held in the cookware; and a blocking device and a corresponding motion mechanism configured to move the blocking device.

Implementations of the system may include one or more of the following: a blocking device and a lid (or cover), whether in motion or not, is configured to not interfere with the motion of a cookware produced by the stirring motion mechanism. When a blocking device and a lid are moved to a certain (fixed) position, they may help enclose or otherwise limit the food or food ingredients held in a cookware while the cookware is moved by a stirring motion mechanism.

Implementations of the system may also include one or more of the following. A lid mechanism may comprise a blocking device which can be moved to an end-position above the cookware when needed. A cookware may comprise a closed curve on its top edge wherein the closed curve is configured to be within a substantially small distance from the surface of the blocking device if the blocking device is moved to an end-position, when the cookware is moved by a stirring motion mechanism. Alternatively, the blocking device may comprise a closed curve on its bottom edge wherein the closed curve is configured to be within a substantially small distance of the surface of the cookware if the blocking device is at an end-position, when the cookware is moved by a stirring motion mechanism. The closed curve and a part of the above-mentioned surface may be substantially contained in a pair of "invariant surfaces" of a stirring motion mechanism; wherein the two invariant surfaces are substantially close to each other. The surface of blocking device (or the surface of the cookware) comprises a sub-surface of flat shape, and the stirring motion mechanism produces a planar movement in the cookware along the planes which are parallel to the flat sub-surface, and a closed curve on a top edge of the cookware (or respectively, a lower edge of the blocking device) is contained in a plane which is parallel to the flat sub-surface. The surface of blocking device (or the surface of the cookware) comprises a sub-surface of spherical shape, and the stirring motion mechanism produces a spherical movement in the cookware along the spheres which are concentric with the sub-surface; and a closed curve on a top edge of the cookware (or respectively, a lower edge of the blocking device) is contained in a sphere which is concentric with the sub-surface.

In another general aspect, an automated cooking apparatus may comprise: a cookware, a stirring motion mechanism configured to move the cookware, a blocking device, and a corresponding motion mechanism configured to move the blocking device; wherein the surface of the cookware comprises a first sub-surface; wherein the surface of the blocking device comprises a second sub-surface. The first sub-surface and the second sub-surface are substantially close to each other if the blocking device is at an end-position, when the cookware is moved by the stirring motion mechanism.

In another general aspect, a lid mechanism may comprise a solid cover, or a net cover (or porous cover), or both. A solid cover may block air from passing. A net (or porous) cover may let air pass.

In another general aspect, the present invention relates to a lid mechanism with a blocking device which may have a big enough passage (i.e., opening) in the middle as to allow the food ingredients to be dispensed into the cookware through the passage, without having to move the blocking device away. The lid mechanism may further include one or more automated covers, porous or non-porous, which can open or block the passage; wherein the said automated covers may be moved away while the blocking device stays fixed during the cooking process.

In another general aspect, a blocking device may comprise a ring shape; where the ring shape can be round, oval, rectangular, polygonal, regular or irregular, etc.

In another general aspect, a lid mechanism may comprise a pipe or tube configured to let air, liquid, solid powder or other ingredients pass through a lid mechanism into a cookware when a blocking device is closed on the cookware. The lid mechanism may further comprise one or more air pumps or shut-off valves, liquid dispensers, solid powder dispensers, or other dispensers.

These and other aspects, their implementations and other features are described in detail in the drawings, the description and the claims.

DETAILED DESCRIPTION OF THE INVENTION

Figure 1:
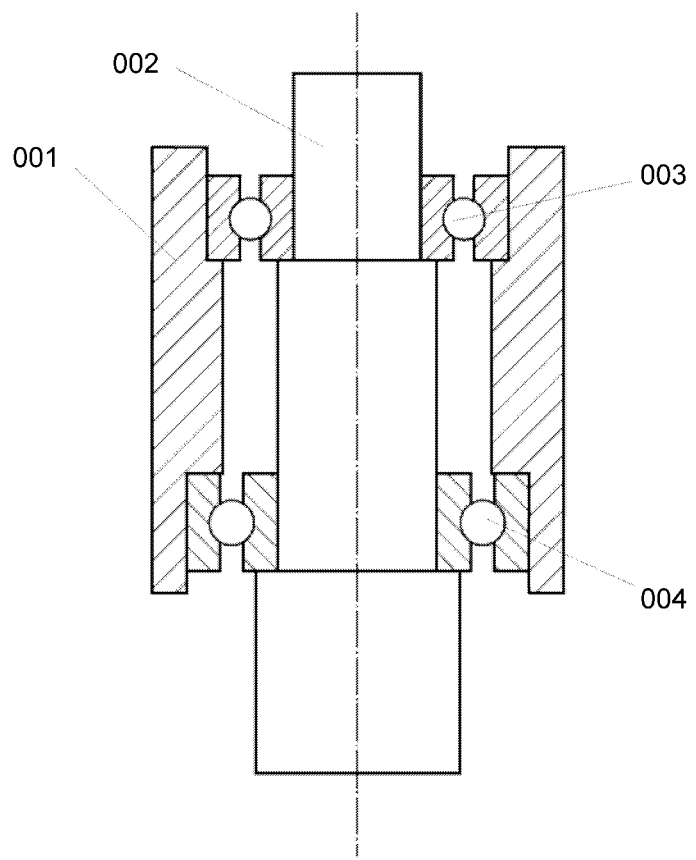
FIG. 1 shows a cut view of a rotational mechanism.

The present application discloses an automated cooking apparatus comprising: (1) a cookware configured to hold food or food ingredients for cooking, and a stirring motion mechanism configured to move the cookware as to stir, mix or distribute the food ingredients held in the cookware; and (2) a lid mechanism comprising a blocking device and a corresponding motion mechanism configured to move the blocking device, wherein the lid mechanism may optionally comprise a lid. At an end-position, a blocking device, optionally in combination with a lid, is configured to help enclose or otherwise limit the food or food ingredients contained in a cookware while the cookware is moved by the stirring motion mechanism.

In some embodiments, the surface of one of the blocking device and the cookware comprises a closed curve, the surface of the other one of the blocking device and the cookware comprises a sub-surface. The distance from the closed curve to the sub-surface stays substantially small if the blocking device is moved to an end-position, when the cookware is moved by the stirring motion mechanism.

For the purpose of present patent application, a "motion mechanism" refers to a mechanism comprising a support component and a sub-mechanism configured to produce a motion in a solid object relative to the support component. The support component is called the support component of the motion mechanism; the solid object is referred to as a moving object of the motion mechanism. The solid object may be a solid component of the motion mechanism, or a solid which is rigidly connected to a component of the motion mechanism. A support component can be a solid component of any shape. In the following applications, a support component is configured to be rigid.

It should be noted that a support component of a motion mechanism may comprise a frame, a board, a shell, or a solid of any shape, etc. In many applications, a support component of a motion mechanism provides a base on which some of the other parts of the motion mechanism may be mounted. A support component can be any rigid component.

In the present patent application, a stirring motion mechanism is a special case of motion mechanism which moves a cookware; where the cookware may be considered to be a rigid body, by ignoring elastic and other deformations, and allowances in spaces and errors.

For the purpose of the present patent application, a rotational motion mechanism refers to a motion mechanism configured to move a solid object in a rotation relative to the support component of the motion mechanism.

Similarly, a translational motion mechanism is a motion mechanism configured to move a solid object in a translation relative to the support component of the motion mechanism.

For the purpose of the present patent application, a rotational mechanism refers to a mechanism comprising two rigid components and a mechanism configured to constrain the relative movement of the two rigid components to an axial rotation, i.e., a rotation around an axis. The two rigid components are referred to as mating parts of each other. The axis of the rotation is referred to as the axis of the rotational mechanism. It should be noted that the two mating parts of a rotational mechanism may or may not touch each other.

For the purpose of present patent application, a bearing is said to connect a bearing housing and a shaft, if the bearing is mounted in between the bearing housing and the shaft such that the bearing constrains the relative movement of the shaft and the bearing housing to a rotation. Usually, a bearing connecting a bearing housing and a shaft comprises an inner ring and an outer ring; wherein the outer ring of the bearing is mounted in the bearing housing and the inner ring of the bearing is mounted on the shaft. The rotation of the shaft relative to the bearing housing is usually around the axis of the shaft. As is well-known to the professionals, installation of a bearing, as to connect a bearing housing and a shaft, may use additional parts such as, caps, screws, rings, nuts or locknuts, etc.

Referring to FIG. 1, a rotational mechanism comprises a ring-shaped bearing housing 001, a shaft 002 and a pair of ball bearings 003 and 004; wherein each one of the bearings connects the bearing housing 001 and the shaft 002. As another example, a rotational mechanism may comprise a bearing housing and a shaft and a single ball bearing configured to connect the bearing housing and the shaft. Implicitly, such a rotational mechanism may also comprise some standard parts (such as caps, screws, rings, or locknuts, etc., not shown in FIG. 1) which are used to mount the bearing (s) in between the bearing housing and shaft.

FIGS. 2A-5B below describe a sub-apparatus which is a major part of an automated cooking apparatus.

Figure 2A:
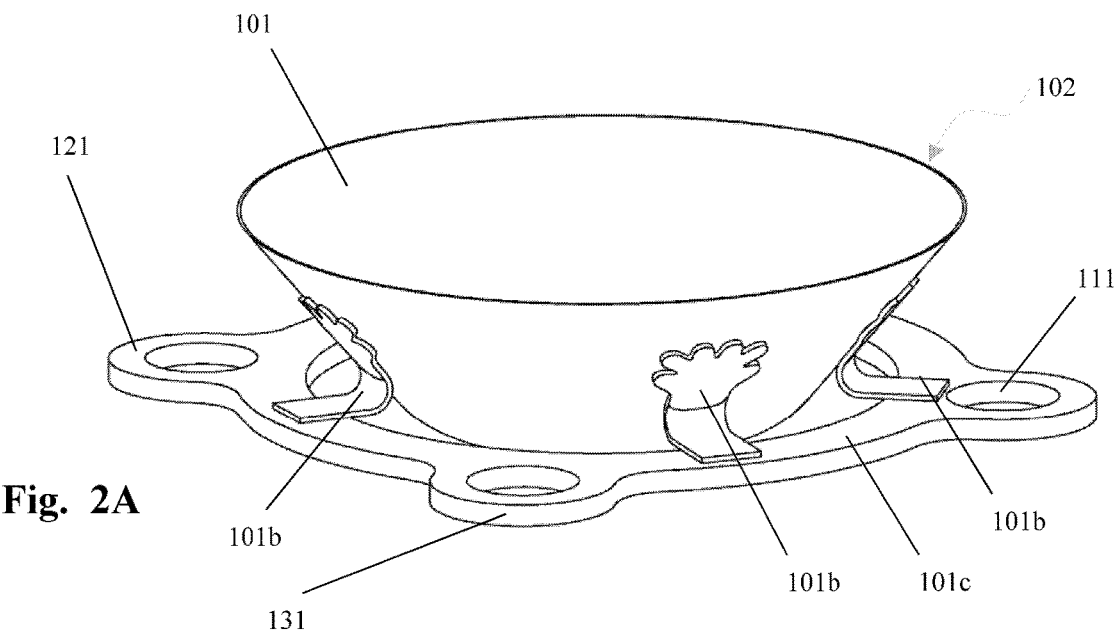
FIGS. 2A-2B show aerial views of some parts of a cooking sub-apparatus without a lid.

Referring to FIGS. 2A-5B, a sub-apparatus 100A includes a cookware 101 which is welded or otherwise joined with some connectors 101b; wherein the connectors 101b are rigidly joined with a holder 101c (by welding, bolting, or other means). Referring to FIG. 2A, the holder 101c and some bearing housings 111, 121, 131 are rigidly joined together. (In the case as shown in the figures, the holder 101c and the three bearing housings 111, 121 and 131 are combined seamlessly into a flat board with round holes. But this combination is not a requirement.) The cookware 101 comprises a top edge 102 which is a closed planar curve (e.g. a circle).

Figure 2B:
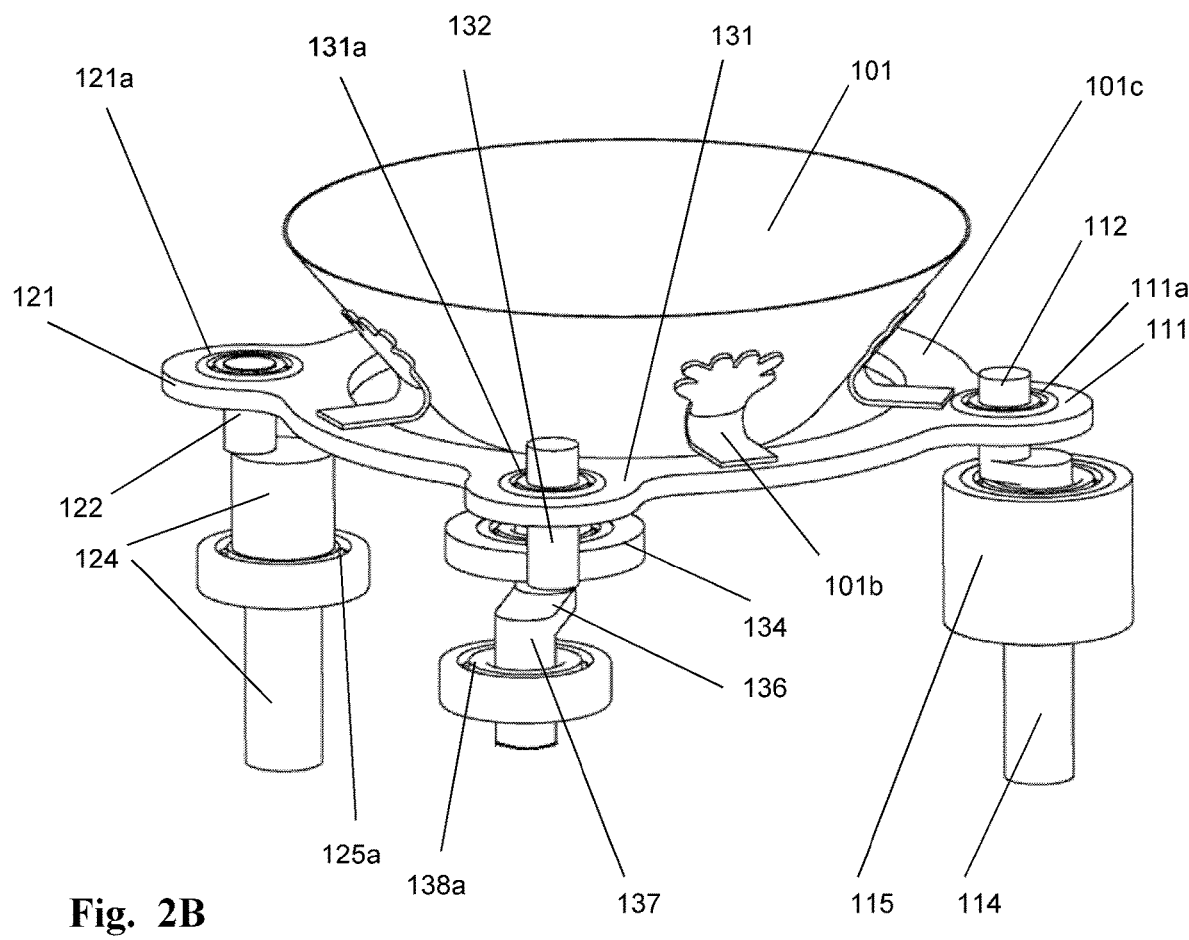
Figure 2C:
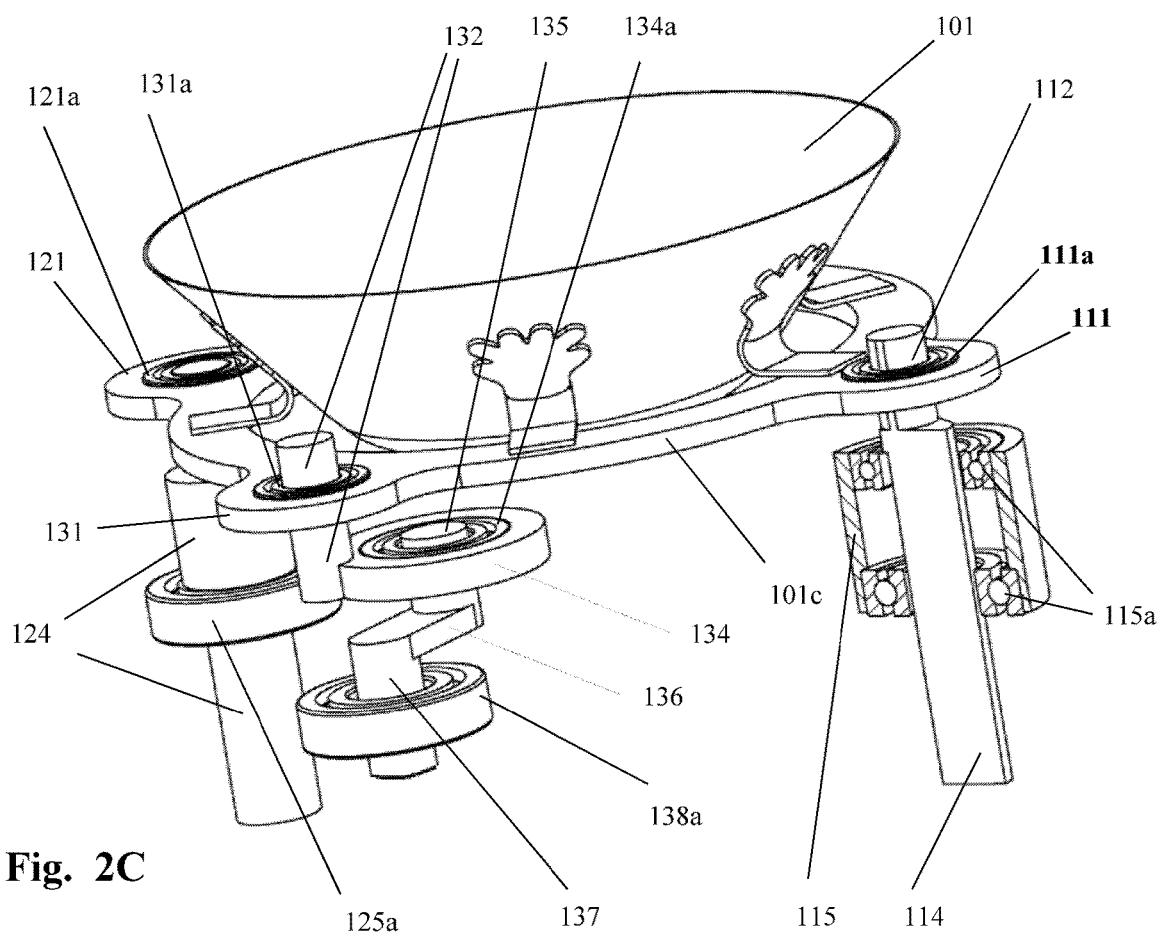
FIG. 2C shows an aerial view with a partial cut view of some parts of the sub-apparatus.

The sub-apparatus 100A further includes: shafts 112, 122, 132; a bearing 111a which connects the shaft 112 and the bearing housing 111; a bearing 121a which connects the shafts 122 and the bearing housing 121; a bearing 131a which connects the shaft 132 and the bearing housing 131 (FIG. 2B). Thus, the shaft 112 is rotatable around the axis of the bearing housing 111; the shaft 122 is rotatable around the axis of the bearing housing 121; the shaft 132 is rotatable around the axis of the bearing housing 131. The shaft 112 is rigidly joined with a shaft 114. The shaft 114 is connected to a bearing housing 115 by a pair of bearings 115a (FIG. 2C). The shaft 122 is rigidly connected to a shaft 124 (FIG. 2B). The shaft 132 is rigidly connected to a bearing housing 134 (FIG. 2C). A shaft 135 is connected to the bearing housing 134 by a bearing 134a. The shaft 135 is rigidly connected to a shaft 137 via a connector 136.

Figure 2D:
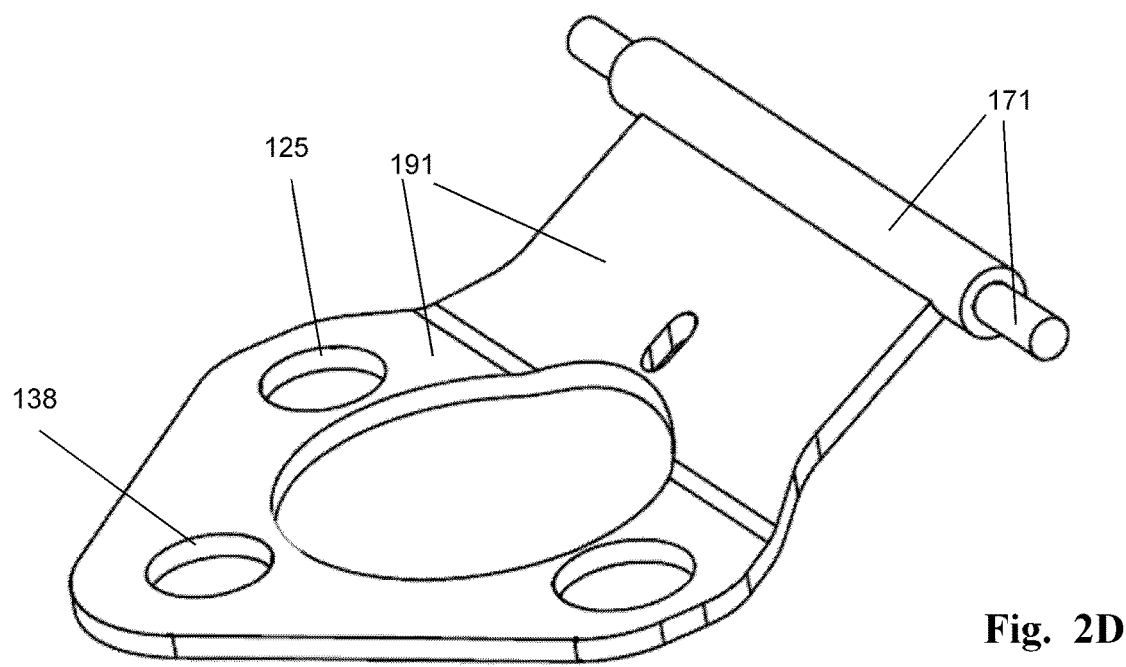
FIG. 2D shows an aerial view of some parts of the sub-apparatus.

The sub-apparatus 100A further includes a support component 191 which is rigidly connected to some bearing housings 125, 138 and a shaft 171. In the special application as shown in FIG. 2D, the bearing housings 125, 138, shaft 171 and the support component 191 are combined into a single part. It should be noted that a shaft, such as the shaft 171, may not have a uniform radius; i.e., its radius may be different at different sections.

The sub-apparatus 100A also includes a bearing 125a which connects the shaft 124 and the bearing housing 125, and a bearing 138a which connects the shaft 137 and the bearing housing 138. The bearing housing 115 is rigidly connected to the support component 191. The sub-apparatus 100A includes belt wheels 151, 152 and 153, and a belt 155 which wraps around the three belt wheels as to link their rotations (see FIG. 3C). The belt wheel 151 is fixedly connected to the shaft 114 and the axis of the belt wheel 151 coincides with the axis of the shaft 114. The belt wheel 152 is fixedly connected to the shaft 124 and the axis of the wheel 152 coincides with the axis of the shaft 124. The belt wheel 153 is configured to have a cylindrical hole removed, and a bearing 153a connects a shaft 154 and the belt wheel 153 in the sense that the inner ring of the bearing 153a is connected to the shaft 154 and the outer ring is connected to the belt wheel 153 such that the belt wheel is rotatable relative to the shaft 154, around the axis of the shaft 154. The shaft 154 is fixedly connected to the support component 191 by bolts. The position of the belt wheel 153 may be adjusted as to tighten or loosen the belt 155.

Figure 4A:
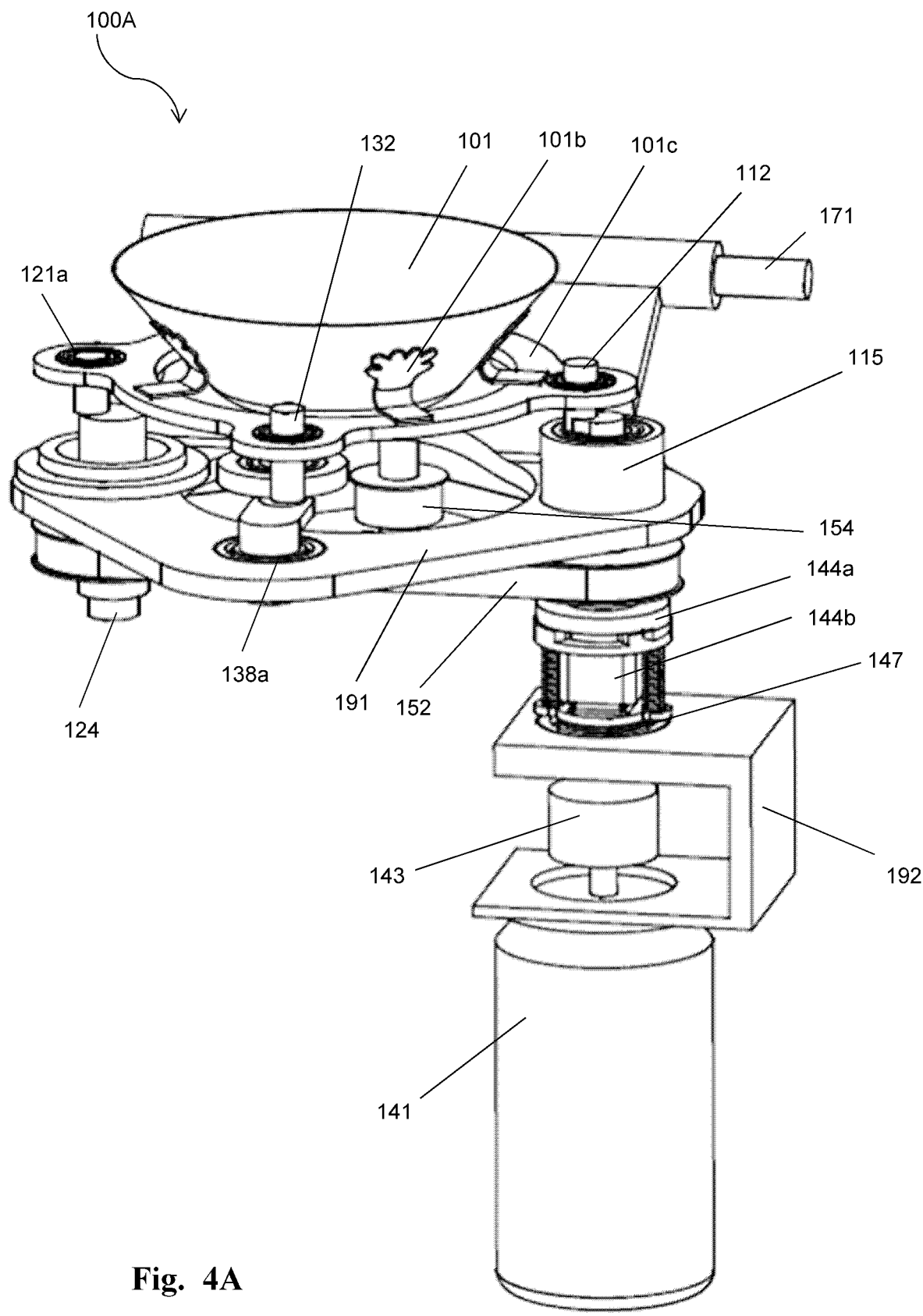
FIGS. 4A-4B shows an aerial view and an aerial view with a partial cut view of a cooking sub-apparatus (without a lid) comprising a cookware and a stirring motion mechanism configured to move the cookware.
Figure 4B:
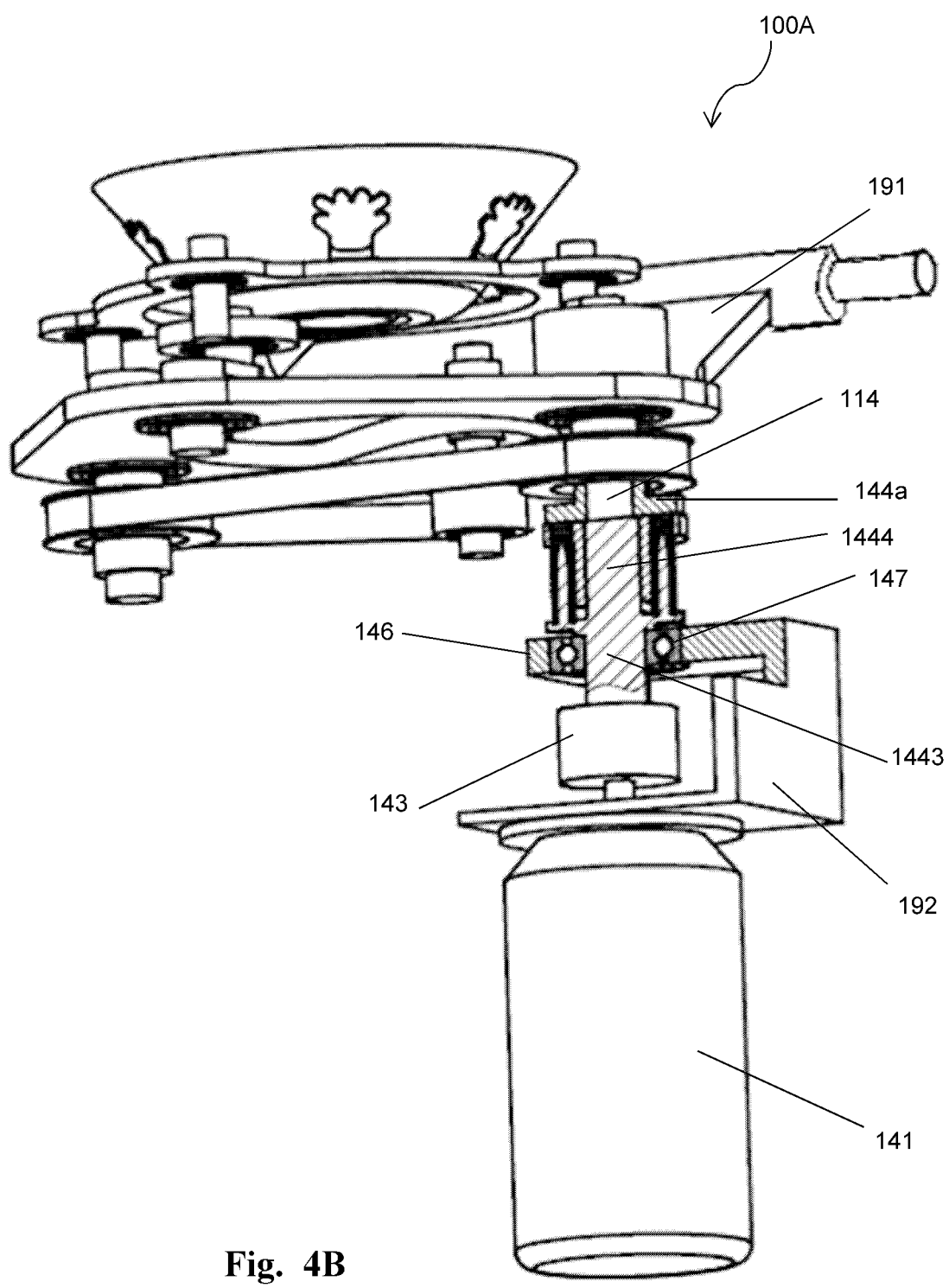
Figure 5A:
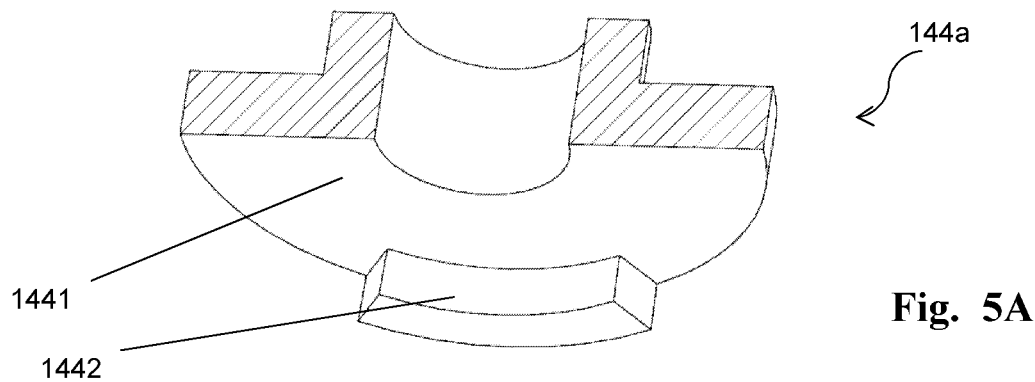
FIGS. 5A-5B show cut views of some parts of the sub-apparatus of FIGS. 4A-4B.
Figure 5B:
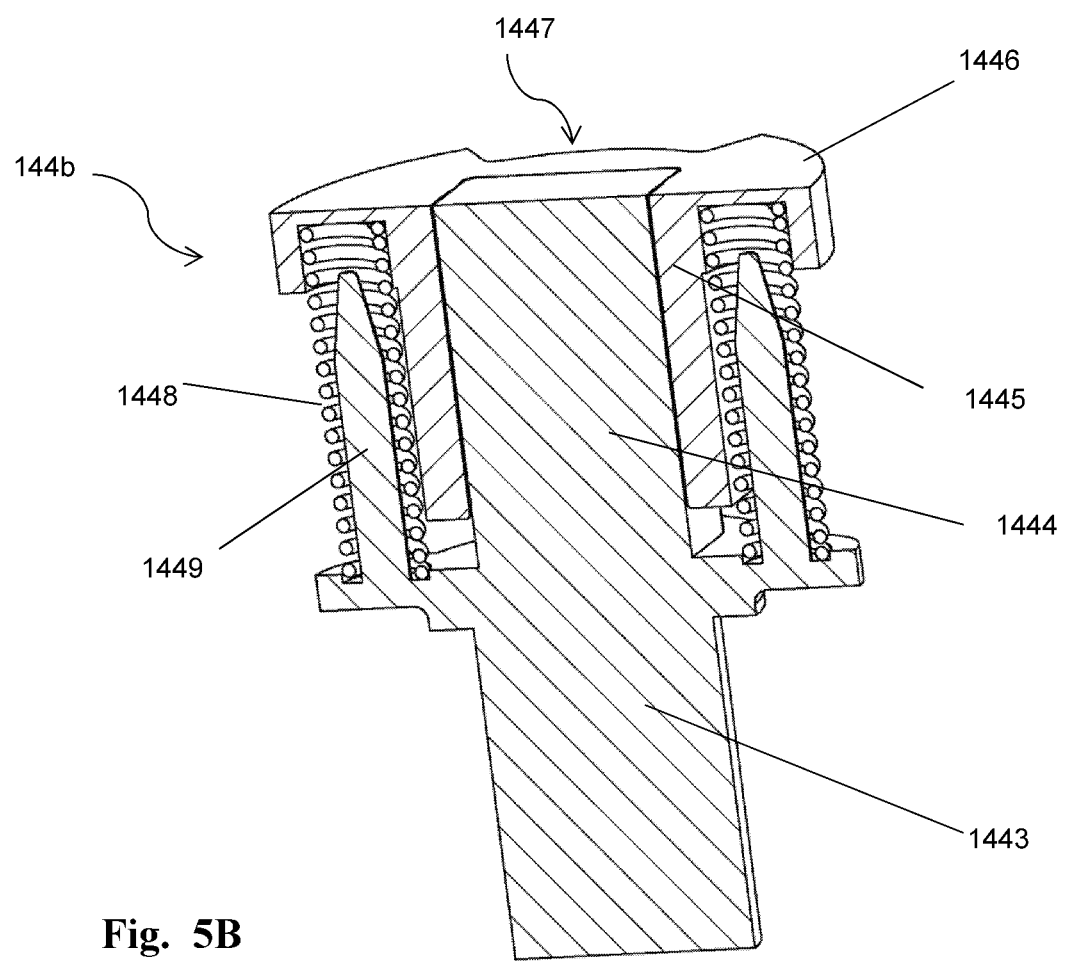

The sub-apparatus 100A further includes a motor 141 which is mounted on a support component 192 (FIG. 4A). A connection of the shaft of the motor with the shaft 114 may be achieved as follows. The shaft 114 is fixedly connected to a device 144*a* which comprises a solid 1441 with a flat bottom surface and a raised part 1442 under the flat surface (FIGS. 4B, 5A). Referring to FIG. 5B, a mechanism 144*b* comprises a shell 1445 comprising a square hole, and a shaft 1443 which is rigidly connected to a square shaft (shaft with a sectional shape of square instead of circle) 1444. The square shaft 1444 is configured to insert into the square hole of the shell 1445 so that the shell 1445 may slide along the square shaft 1444, in directions which are parallel to the axis of the shaft 1444, where the axis of the square shaft 1444 is configured to coincide with the axis of the shaft 1443. The shell 1445 is connected to a solid 1446 which has a flat surface on top and a carved area 1447 which matches the shape of the raised part 1442 in the device 144*a*. Some springs 1448 are positioned to push the part 1446 towards upward direction relative to the shaft 1443 (or equivalently, relative to the square shaft 1444). The springs 1448 are retained in their positions by some sticks 1449 which are rigidly connected to the square shaft 1444. The shaft of the motor 141 is connected to the shaft 1443 by a coupling 143 (see FIG. 4B). A bearing 147 connects the shaft 1443 and a bearing housing 146; and the bearing housing 146 is rigidly joined with the support component 192. During the time-periods the motor 141 makes a rotation, the support components 191 and 192 are configured to be fixed relative to each other, and the top surface of the part 1446 lies close and below the bottom surface of the part 1441, and the raised part 1442 of 144*a* is inserted into the carved area 1447 of 144*b*. At this position, the shaft of the motor 141, the shafts 1443 and 114 are configured to have a same axis. This way, the motor 141 may drive the rotation of the shaft 1443 and hence that of the device 144*a* and the shaft 114. The axes of the shafts 112, 114, 122, 124, 132, 135 and 137 in the apparatus 100A are configured to be parallel to each other. Moreover, the distance between the axes of the shafts 112 and 114 is configured to be equal to the distance between the axes of the shafts 122 and 124; the distance between the axes of the bearing housings 111 and 121 is configured to be equal to the distance between the axes of the bearing housings 115 and 125. The belt 155 is configured to be a timing belt; and the belt wheels 151 and 152 may be configured to have the same radii. The rotations of the shafts 114 and 124 is configured to be synchronous. As the motor 141 drives a rotation in the shaft 114 around its own axis, the holder 101*c* and the cookware 101 make a planar movement. This completes the description of the sub-apparatus 100A.

It should be noted that the sub-apparatus 100A comprises the cookware 101 with a top edge 102, the shaft 171, and a stirring motion mechanism, wherein the stirring motion mechanism comprises the following parts:

(1) a first rotational mechanism comprising the shaft 112, the bearing housing 111, and a connection comprising the bearing 111*a* configured to constrain the relative movement of the shaft 112 and the bearing housing 111 to an axial rotation;

(2) a second rotational mechanism comprising the shaft 114, the bearing housing 115, and a connection comprising the bearings 115*a* configured to constrain the relative movement of the shaft 114 and the bearing housing 115 to an axial rotation;

(3) a third rotational mechanism comprising the shaft 122, the bearing housing 121, and a connection comprising the bearing 121*a* configured to constrain the relative movement of the shaft 122 and the bearing housing 121 to an axial rotation;

(4) a fourth rotational mechanism comprising the shaft 124, the bearing housing 125, and a connection comprising the bearing 125*a* configured to constrain the relative movement of the shaft 124 and the bearing housing 125 to an axial rotation;

(5) a fifth rotational mechanism comprising the shaft 132, the bearing housing 131, and a connection comprising the bearing 131*a* configured to constrain the relative movement of the shaft 132 and the bearing housing 131 to an axial rotation;

(6) a sixth rotational mechanism comprising the shaft 135, the bearing housing 134, and a connection comprising the bearing 134*a* configured to constrain the relative movement of the shaft 135 and the bearing housing 134 to an axial rotation;

(7) the support component 191; (8) the belt wheel 151, 152, 153, the shaft 154, the belt 155, (8) the device 144*a*, the mechanism 144*b*, the bearing housing 146, the bearing housing 147, the coupling 143, the motor 141, the support component 192;

(9) the mutual connections among the above parts, if any.

It should be noted that the axis of rotation of the first rotational mechanism is different from the axis of the rotation of the second rotational mechanism as discussed above.

The support component 191 in the sub-apparatus 100A is referred to as the support component of the stirring motion mechanism, and the stirring motion mechanism produces a planar movement in the cookware 101 relative to the support component 191. The magnitudes of movements of points on the cookware may be configured to be in tens of millimeters, anywhere from 10 to 99 millimeters.

It should be noted that the rigid connection of the shafts 122 and 124 in the apparatus 100A may be substituted by a connection comprising a rotational mechanism comprising a shaft and a bearing housing as mating parts and a bearing configured to connect the shaft and bearing housing, wherein the shaft is rigidly connected to the shaft 124 and the bearing housing is rigidly connected to the shaft 122, wherein the axis of the rotational mechanism is configured to be parallel to the axes of the shafts 122 and 124. The distance between the axis of the rotational mechanism and the axis of the shaft 124 is configured to be equal to the distance between the axis of the shaft 112 and 114. The distance between the axis of the rotational mechanism and the axis of the shaft 122 may be configured to be quite small (e.g., 5 to 50 times smaller) compared with the distance between the axis of the rotational mechanism and the shaft 124.

Our above stirring motion mechanism is special in that it produces motions in the cookware so that each point of the cookware is only displaced by a small distance from its original position. The acceleration vector of the point of the cookware can be large and the direction of velocity vector of the point may rotate fast. The trajectories of the points of the cookware are never concentric circles. The stirring motion mechanism produces a planar motion in the cookware 101. The trajectory of each point of the cookware 101 is a planar curve. However, the motion of the cookware is different from a rotation, and the food or food ingredients contained in the cookware are not subject to eccentric forces, even if the speed of motion becomes very fast. In contrast, an eccentric force induced by a rotation may push the food or food ingredients move away from the rotational axis, and escape from the cookware en masse. On the other hand, the trajectory of the top edge 102 of the cookware 101 is a surface, not a curve. This makes a lid design more difficult.

As explained above, for the present patent application, a motion mechanism (such as a stirring motion mechanism)

comprises a support component and a solid component and a mechanism configured to move the solid component (such as a cookware) relative to the support component. Ignoring elastic and other deformations and the allowances in spaces and errors, the solid component may be considered as a (finite) rigid body. Theoretically, a motion mechanism may move any point in space, as if the point belonged to an imaginary rigid body which is rigidly extended from the (finite) rigid body. Thus, trajectories of a point in space under a motion mechanism may be defined and studied. A trajectory of a point under a motion mechanism can be a cyclic curve such as a circle or ellipse, a curve contained in a smooth surface, or a curve of other type. When a motion mechanism produces spherical motions, then the trajectories of a point are spherical curves.

Depending on design, the trajectories of a same point may include many curves. For example, a motion mechanism may be a composition of two independent linear motion mechanisms, along the directions of the X-axis and Y-axis respectively; wherein the speeds of motion of the two independent linear motion mechanisms may not be related at all. In this case, the trajectories of a point may be a collection of rather arbitrary plane curves which are parallel to the XY-plane.

For the purpose of present patent application, an invariant surface of a motion mechanism is a surface which satisfies the following two conditions: (1) the surface is fixed with respect to the support component of the motion mechanism; (2) the surface contains all the trajectories under the motion mechanism of a point if the point was on the surface at an initial time. In plain words, a fixed surface is an invariant surface of a motion mechanism, if and only if the motion mechanism never moves a point on the surface to the outside of the surface. For example, if a motion mechanism produces spherical motions, then its invariant surfaces may be concentric spheres, and the directions of the movements produced by the motion mechanism are along these concentric spheres.

It should be noted that some motion mechanism, e.g., a motion mechanism which is configured to produce compositions of three independent linear motions along three linearly independent directions (e.g., along X, Y, Z-axis), may not have any invariant surface.

As a stirring motion mechanism (which moves a cookware) is a special case of a motion mechanism, we may discuss invariant surfaces of a stirring motion mechanism. It should be noted that the planes which are perpendicular to the axes of the shafts 112 and 122 are invariant surfaces of stirring motion mechanism in the sub-apparatus 100A. These planes may also be referred to as invariant planes. The directions of motion of any point of the cookware in the motion produced by the stirring motion mechanism is parallel to the invariant surfaces.

Figure 6A:
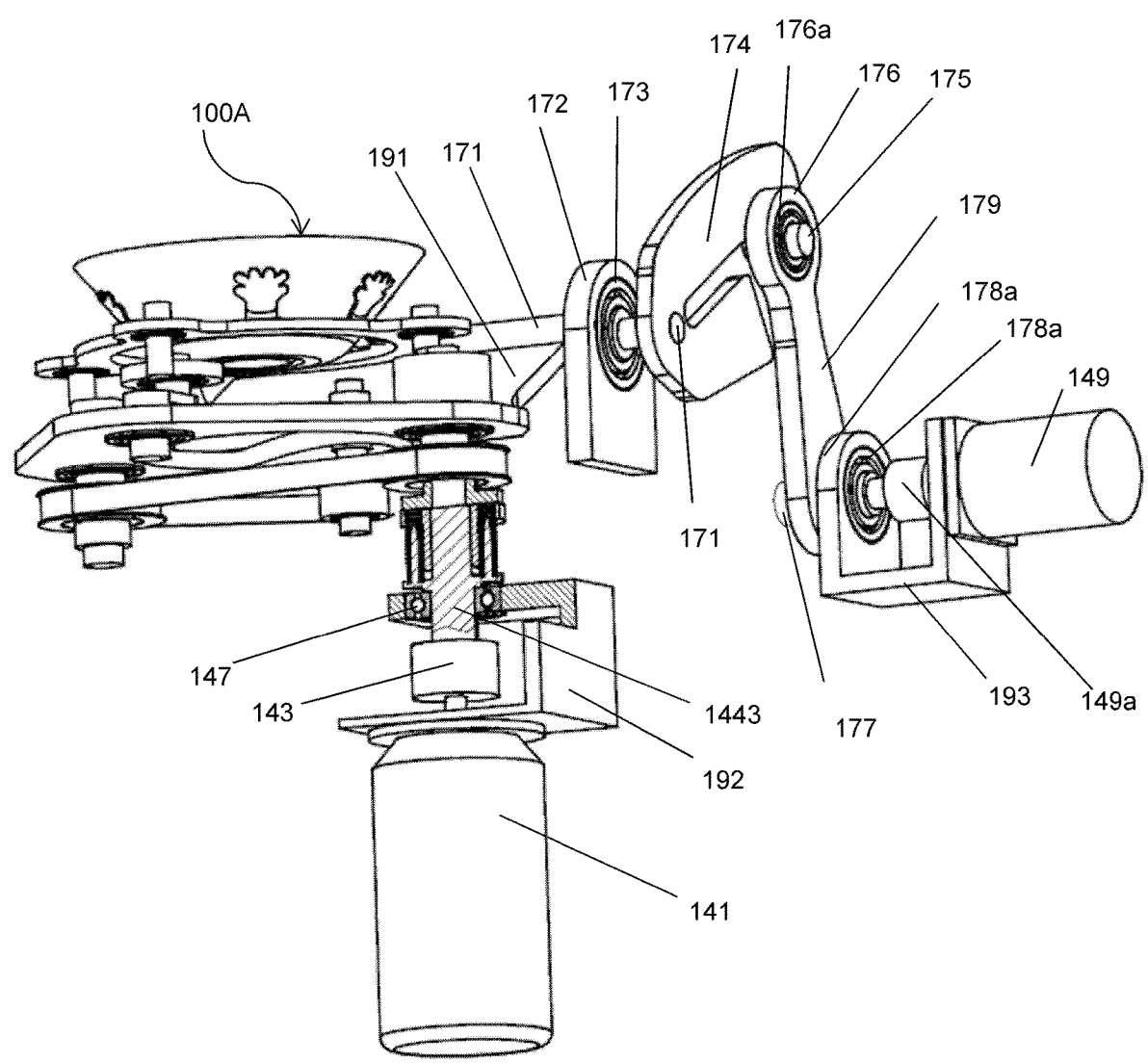
FIG. 6A shows an aerial view with a partial cut view of parts of a cooking sub-apparatus without a lid.
Figure 6B:
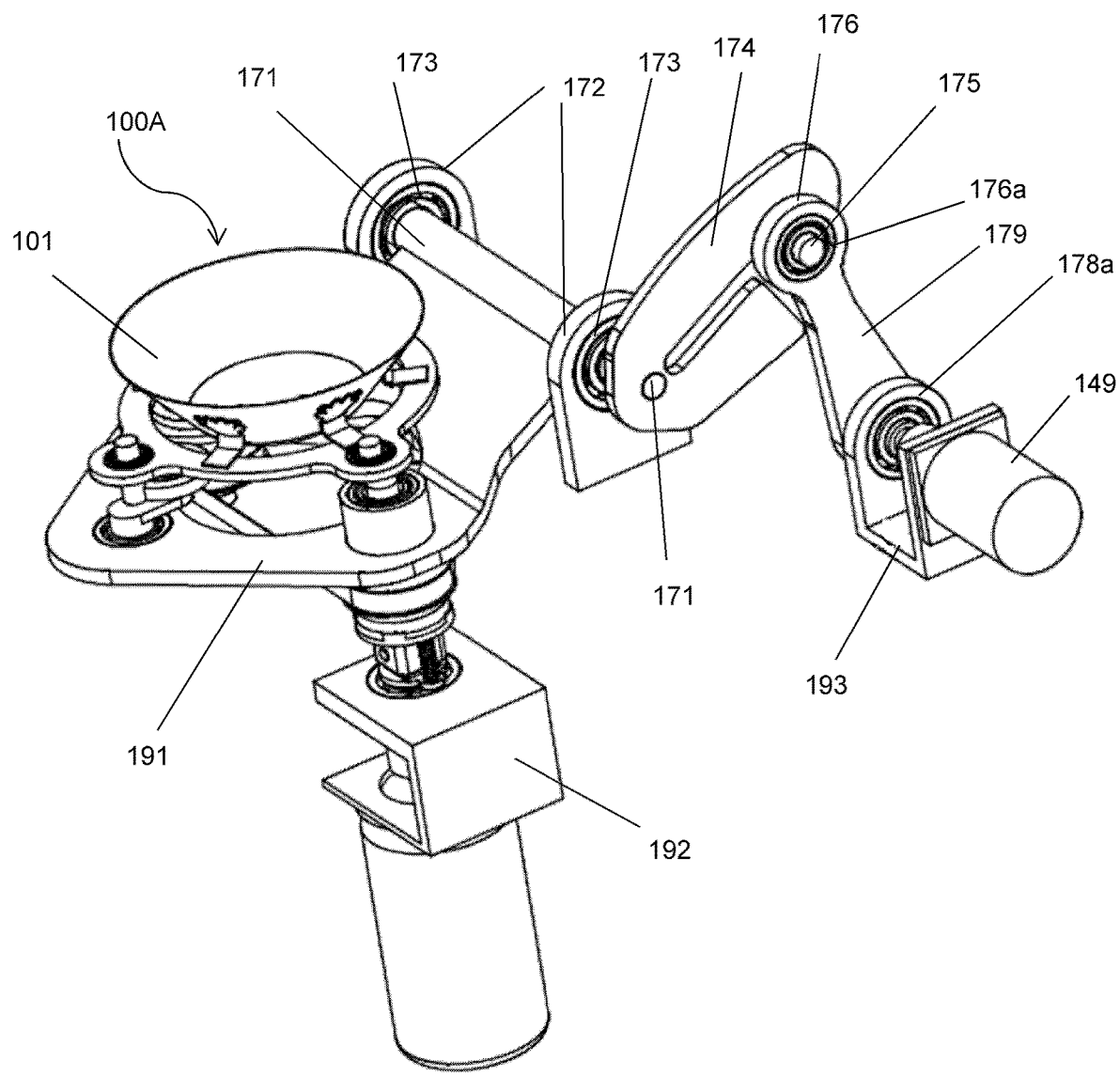
FIGS. 6B-6D show aerial views of parts of the sub-apparatus.
Figure 6C:
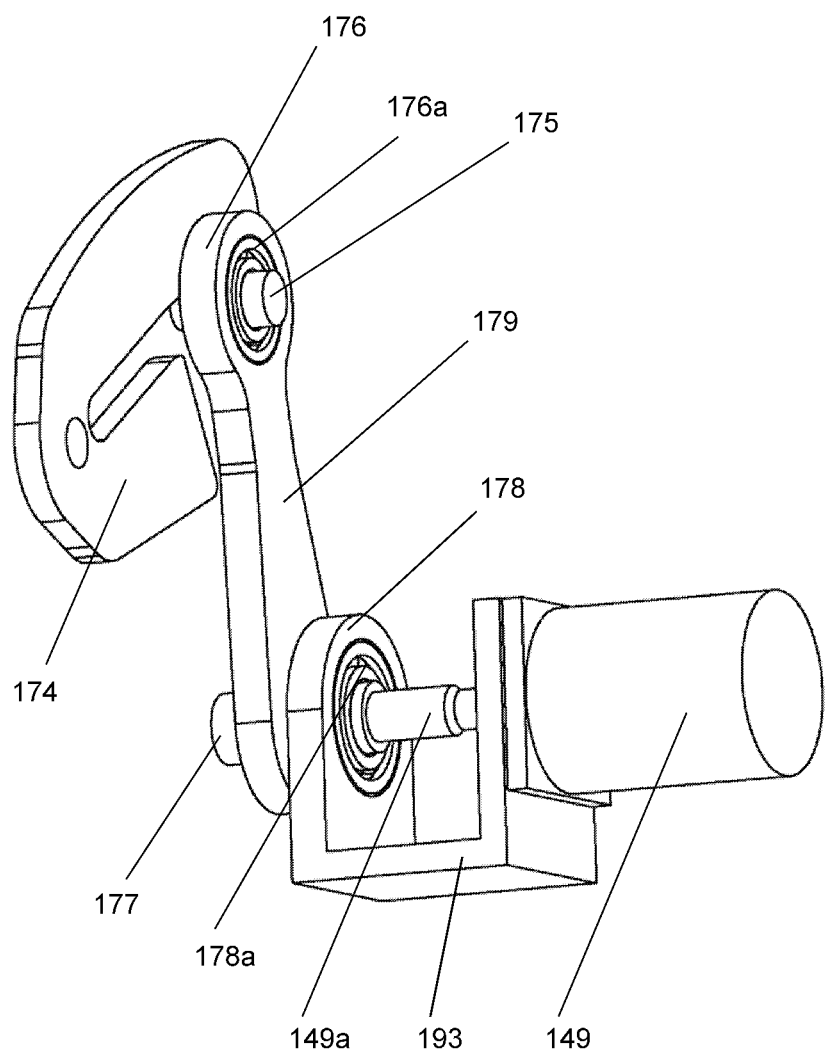
Figure 6D:
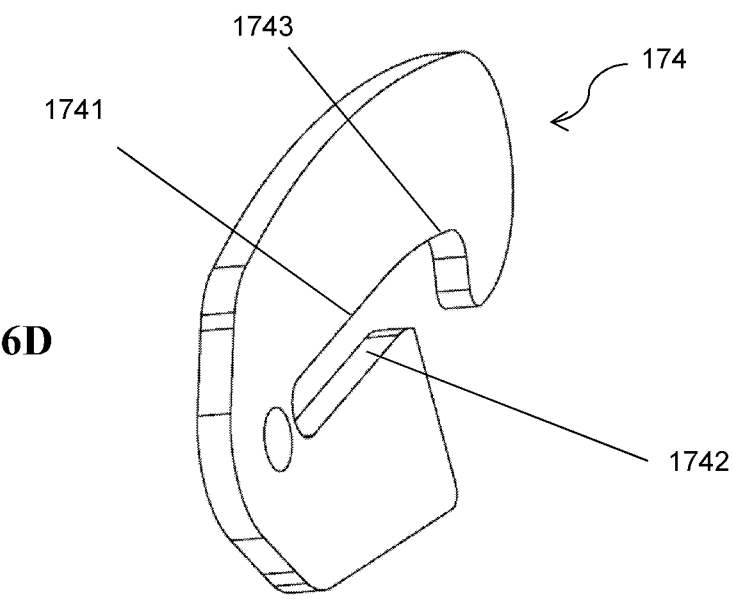

Referring to FIGS. 6A-7C, a sub-apparatus 100B comprises the sub-apparatus 100A and an unloading mechanism wherein the unloading mechanism comprises two bearing housings 172 and two bearings 173; where each bearing 173 connects the shaft 171 and a bearing housing 172 (e.g. FIG. 6B). The unloading mechanism also comprises a cam 174 which is rigidly connected to the shaft 171. The surface along the edge of the cam 174 comprises two mutually parallel flat surfaces 1741 and 1742 (along two straight edges), and a section 1743 which is a part of a cylindrical surface (along a circular edge), see FIG. 6D. The unloading mechanism also includes a shaft 175 and a bearing housing 176 which are connected by a bearing 176a (FIG. 6C). A section of the shaft 175 is configured to touch surfaces on the edges of the cam 174. The bearing housing 176 is rigidly joined with a shaft 177 by a connector 179. A bearing 178a connects the shaft 177 and a bearing housing 178.

Figure 7A:
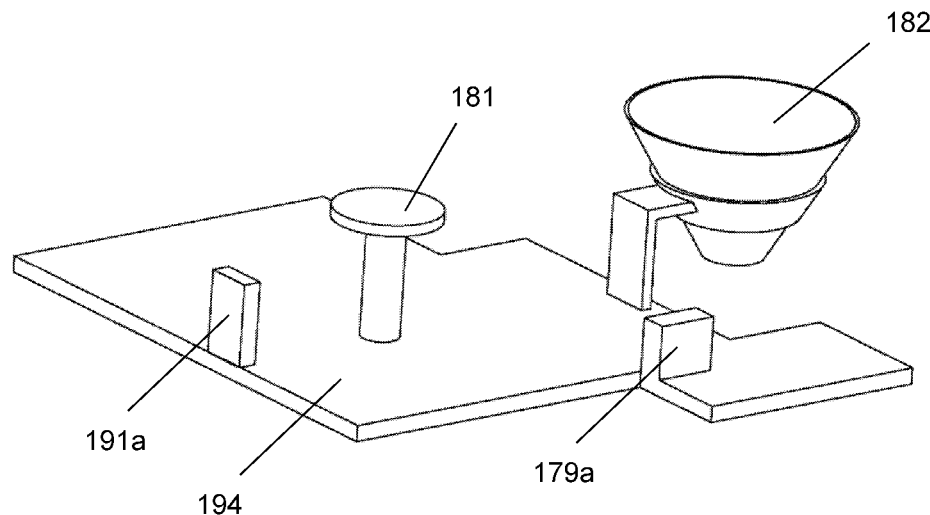
FIG. 7A shows an aerial view of parts of a cooking sub-apparatus without a lid which comprises an unloading mechanism.
Figure 7B:
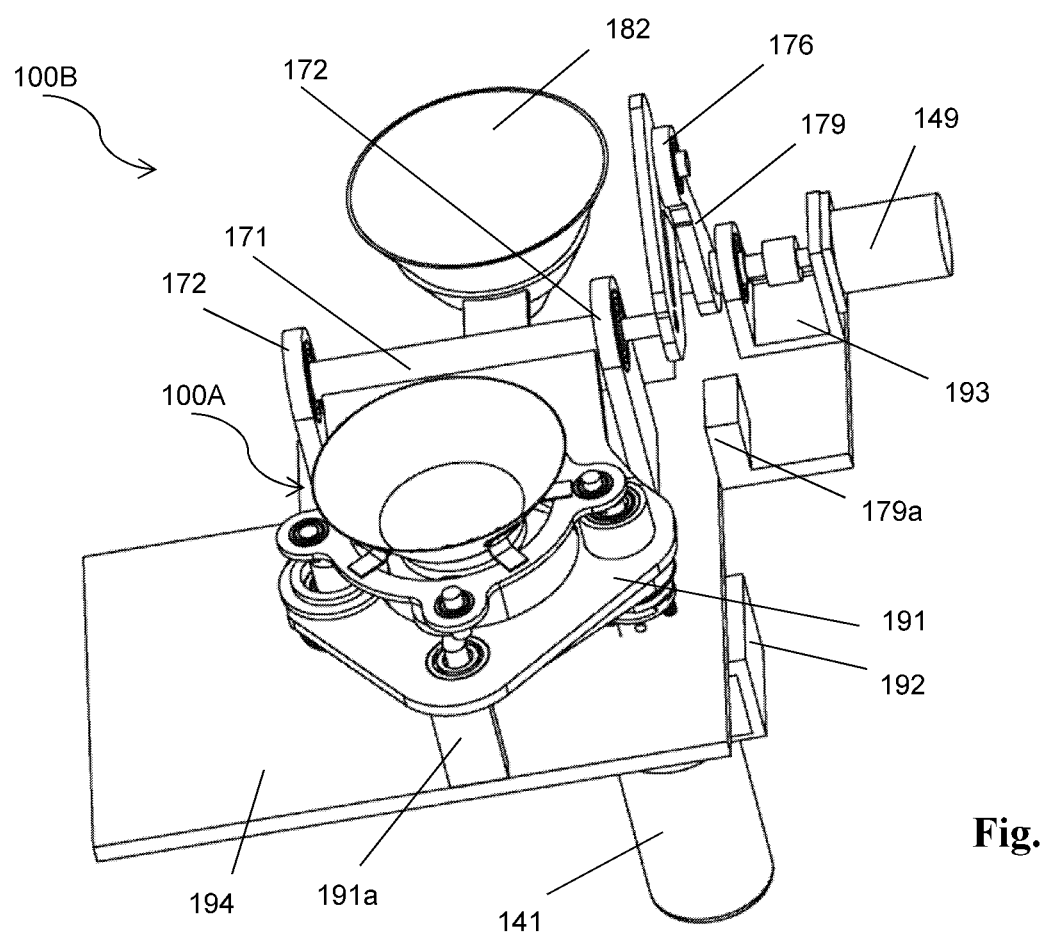
FIGS. 7B-7C show aerial views of the sub-apparatus.
Figure 7C:
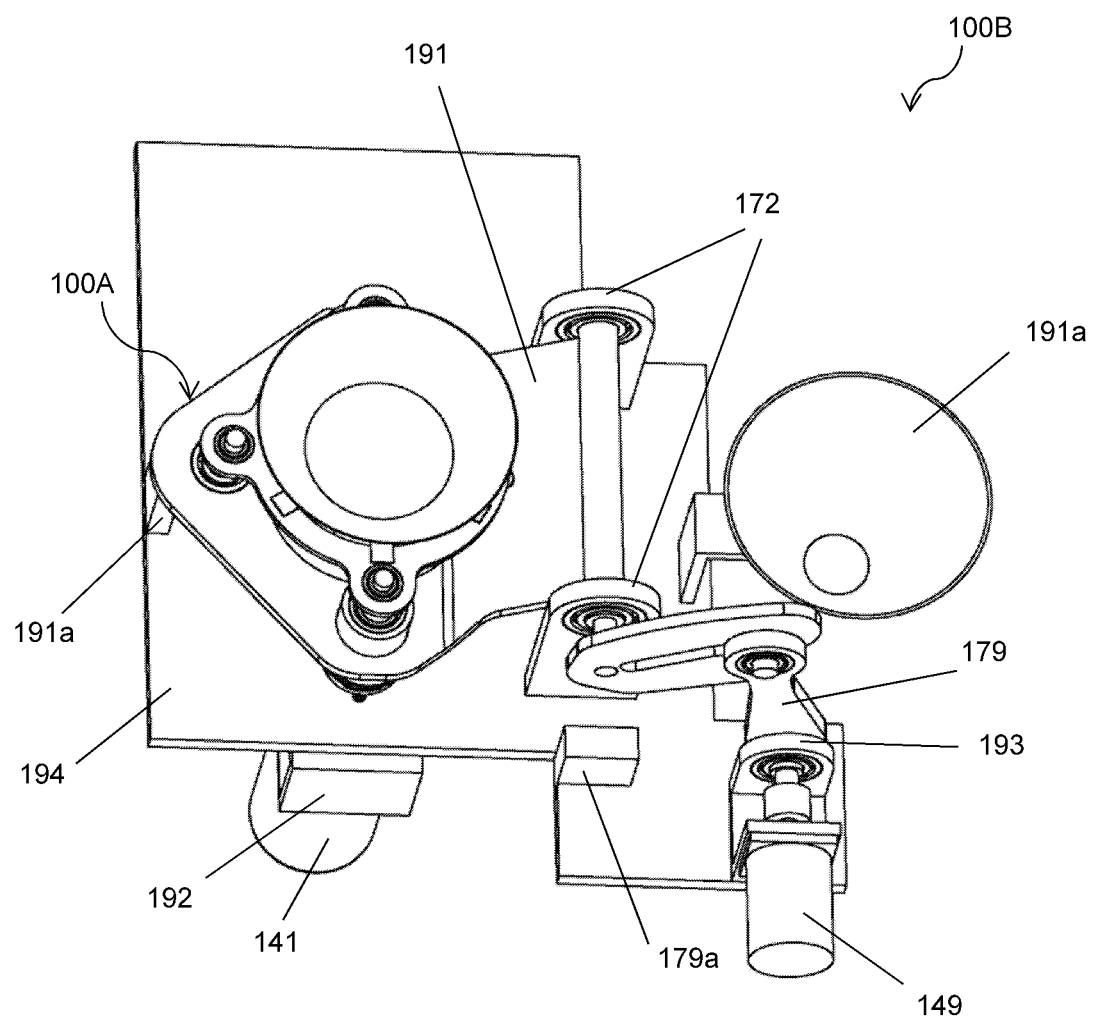

The bearing housing 178 is connected to a support component 193. The shaft 177 is connected to the shaft of a motor 149 by a coupling 149a. The unloading mechanism further includes a support component 194, a stove 181 and a funnel 182 wherein the stove and the funnel are mounted on the support component 194 (FIG. 7A). The unloading mechanism also comprise two plates 191a and 179a which are also mounted on the support component 194. The support components 192, 193 and 194 are all rigidly connected to each other (FIG. 7B). The bearing housings 172 are also rigidly connected to the support component 194. The plate 191a is configured to limit the position of the support component 191. The plate 179a is configured to limit the position of the connector 179 (FIG. 7C). As the motor 149 rotates the shaft 177 around its axis, the bearing housing 176 (and hence the axis of the shaft 175) rotates around the axis of the shaft 177. The rotation of the axis of the shaft 175 drives the cam 274 into a rotation around the axis of the shaft 171. Therefore, the support component 191 and hence the cookware 101 may be rotated around the axis of 171 relative to the support component 194. As the cookware 101 is rotated by an angle (when the connector 179 touches the plate 179a), cooked food in the cookware 101 may be unloaded into a container (e.g., a bowl, plate, etc.) via the funnel 182. The unloading mechanism in the sub-apparatus 100B is configured to not move the support component 191 when the cooking of a culinary dish is actively in process. The cam 174 and the positioning of the limiting plate 191a are configured so that, during a time-period when a culinary dish is being processed, the shaft 175 is configured to touch surface on the circular edge 1743, and the support component 191 is kept touching the plate 191a. In particular, the support component 191 is kept at a fixed position relative to the support component 194. The cylindrical radius and center of the surface 1743 (on the edge of the cam 174) is configured so that a rotation of the shaft 177 produces no movement in the cam 174 when the shaft 175 is kept touching the surface 1743. What the latter happens, the support component 191 is configured to touch the plate 191a. Moreover, the union of surfaces 1741 and 1743 are configured to have continuous tangent planes.

The unloading mechanism produces a two-way motion in the support component 191. When the support component 191 touches the plate 191a, the support component 191 is said to be at a first end-position, or first position, relative to the support component 194.

When the support component 191 is at the first end-position, the top edge 102 of the cookware 101 is configured to be contained in a horizontal plane, and the cookware 101 is configured to hold food or food ingredients for cooking, and the stirring motion mechanism in the sub-apparatus 110A produced a planar motion in the cookware 101 as to stir, mix or distribute the food or food ingredients contained in the cookware 101.

For purpose of the present patent application, a "sub-surface" of a surface is a part (or the whole) of the surface. A sub-surface is itself a surface. It should be particularly noted that the term "sub-surface" does not have the meaning of "under the surface" or "beneath the surface." Similarly, a "sub-curve" of a curve is a part of the curve. A sub-curve can be a connected curve, or a union of broken curves. A "closed curve" is, in a sense, a curve which ends at its starting point. For example, a circle or ellipse or polygon is a closed curve; while a line segment (or circular chord) from a point, say A, to a different point, say B, is not a closed curve. A closed curve may be the boundary of a surface; e.g., the tropical circle, as a closed curve, is the boundary curve of the Northern Hemisphere, where the Northern Hemisphere is considered to be a surface.

Figure 8A:
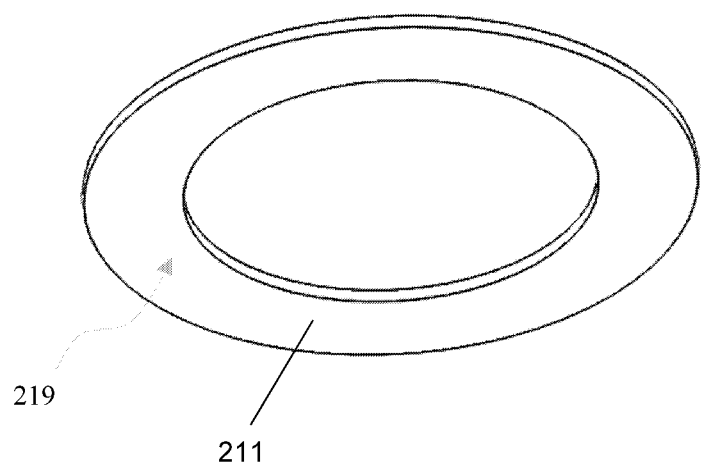
FIG. 8A shows an aerial view of a blocking device.

Referring to FIG. 8A, a blocking device 211 comprises ring-shaped board with a flat lower surface 219 and a flat upper surface. In particular, the lower surface 219 is a planar surface.

Figure 8B:
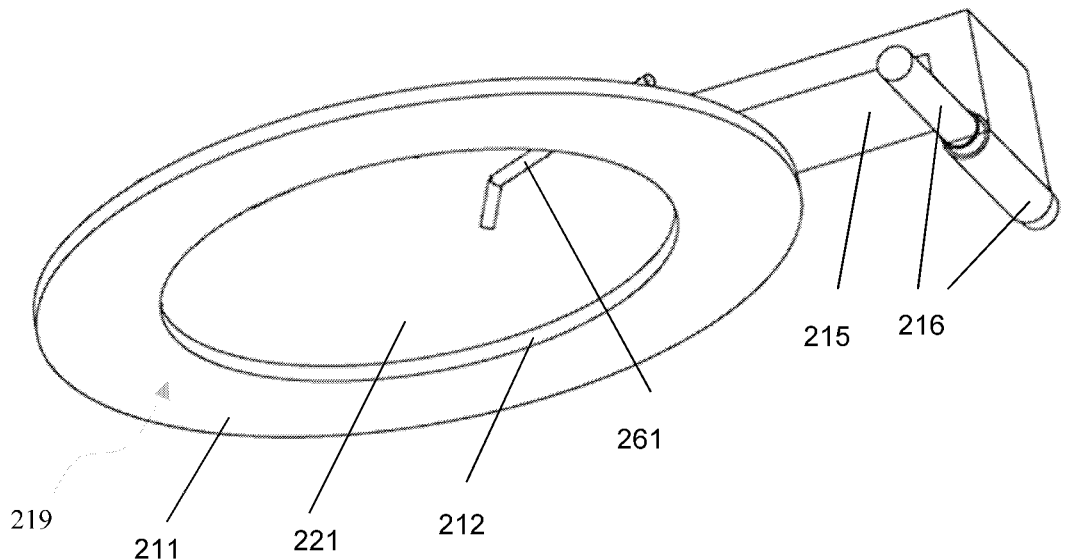
FIGS. 8B-8C show aerial views of parts of a lid mechanism.
Figure 8C:
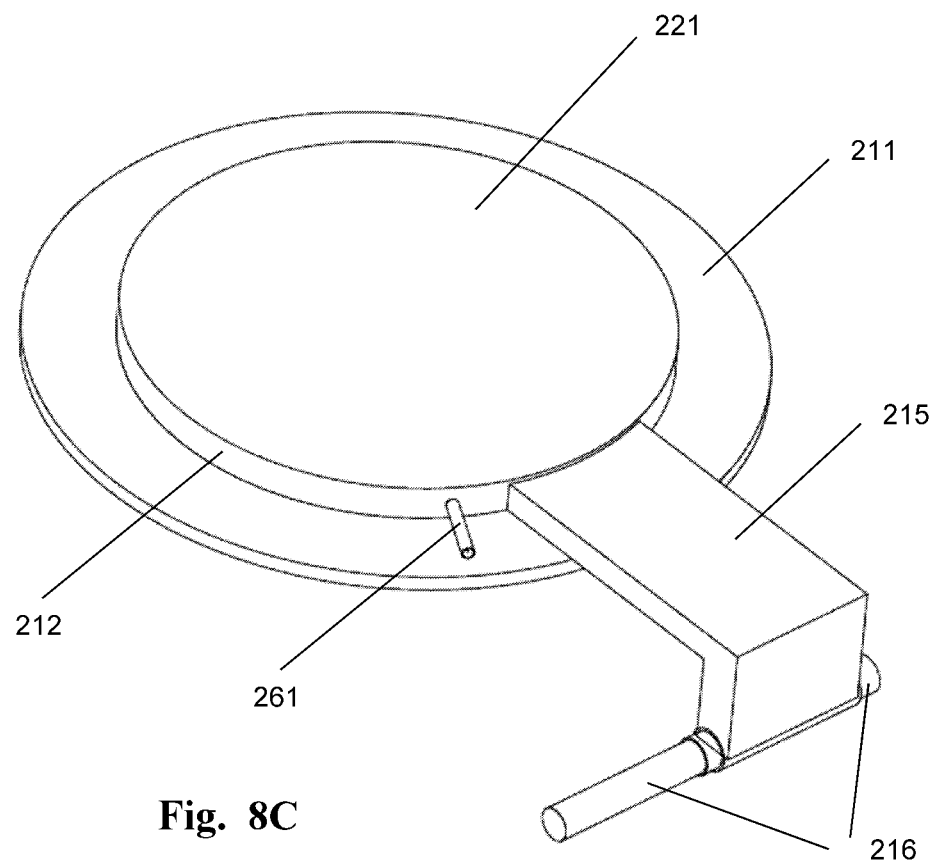
Figure 9:
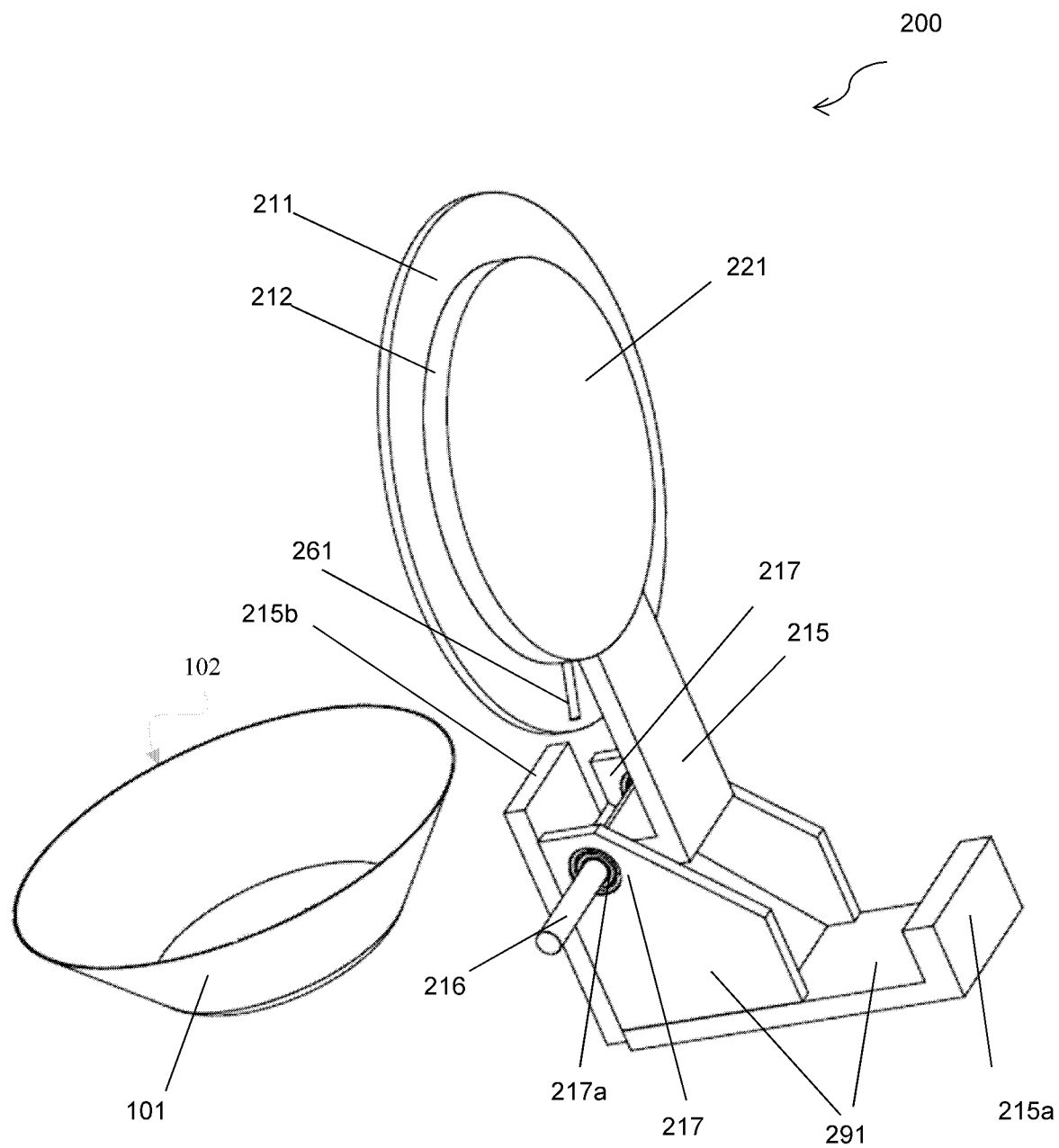
FIG. 9 shows an aerial view of a lid mechanism and a cookware.

Referring to FIGS. 8B-9, a lid mechanism 200 comprises the blocking device 211; a cylindrical ring 212 as a support element (for supporting the blocking device), with a lower surface and an upper surface; a solid cover 221; wherein (a part of) the upper surface of the ring 211 is rigidly joined by the lower surface of the ring 212, and the cover 221 is rigidly connected to and encloses the upper surface of the ring 212 (see FIGS. 8B-8C). The lid mechanism 200 also comprises a tube 261 which is inserted through the ring 212. The tube is configured to flow liquid ingredient into the cookware. The lid mechanism 200 also comprises a shaft 216, and a connector 215 configured to rigidly join the shaft 216 with the ring 212. The lid mechanism 200 also comprises a support component 291 which comprises a pair of bearing housings 217 which comprise a same axis (FIG. 9). Each bearing housing 217 is connected by a bearing 217a to the shaft 216, so that the shaft 216 is rotatable relative to the support component 291. The lid mechanism 200 also comprises plates 215a and 215b mounted on the support component 291; wherein the plates 215a and 215b are configured to limit the position of the rigid connector 215, and thus limit the rotation of the shaft 216 from both directions.

In some applications, when the connector 215 touches the limiting plate 215b, the lower surface of the ring 211 may be substantially close to the top edge 102 of a cookware 101 when the cookware is moved by the stirring motion mechanism in the sub-apparatus 100B.

It should be noted that the lower surface of the ring 211 is configured to be a flat surface. However, the other parts of the surface of the ring 211 can have a different shape. In particular, the upper surface of the ring 211 need not to be flat; the side surfaces of the ring need not be cylindrical surfaces.

It should also be noted that the cover 221 is not required to be flat. It can have a curved shape. It may also be reinforced by a stiffener.

It should also be noted that the parts 211, 212 and 221 in combination may be substituted by a single part, such as a flat board, or a partially curved board with a lower surface, wherein the lower surface includes a flat sub-surface in the same configuration as the lower surface of the ring 211. Such a board may be reinforced by a stiffener.

The ring 211 is referred to as a blocking device.

It should be noted that more than one tubes 261 may be installed to dispense liquid food ingredients into the inside of the cookware 101. Moreover, a liquid pump (e.g. peristaltic pump) or a shut-off valve may be installed to facilitate or control the liquid flow through a pipe 261. A computer may control the amount and timing of dispensed liquid ingredients.

It should be noted that the tube 261 may also be used to flow air or gas through. In some applications, two or more tubes 261 are used, one tube to flow air or gas into the inside of the cookware 101, another tube to flow air or gas from the inside to the outside of the cookware. Moreover, an air pump or shut-off valve may be added to facilitate or control air or gas flow through the pipe 261.

Figure 10A:
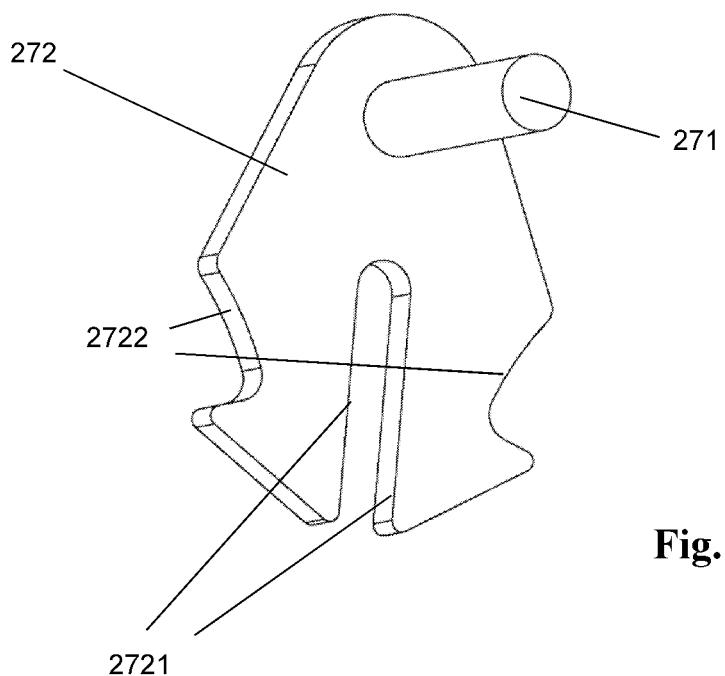
FIGS. 10A-10B show aerial views of some parts of a motorized mechanism in a lid mechanism.
Figure 10B:
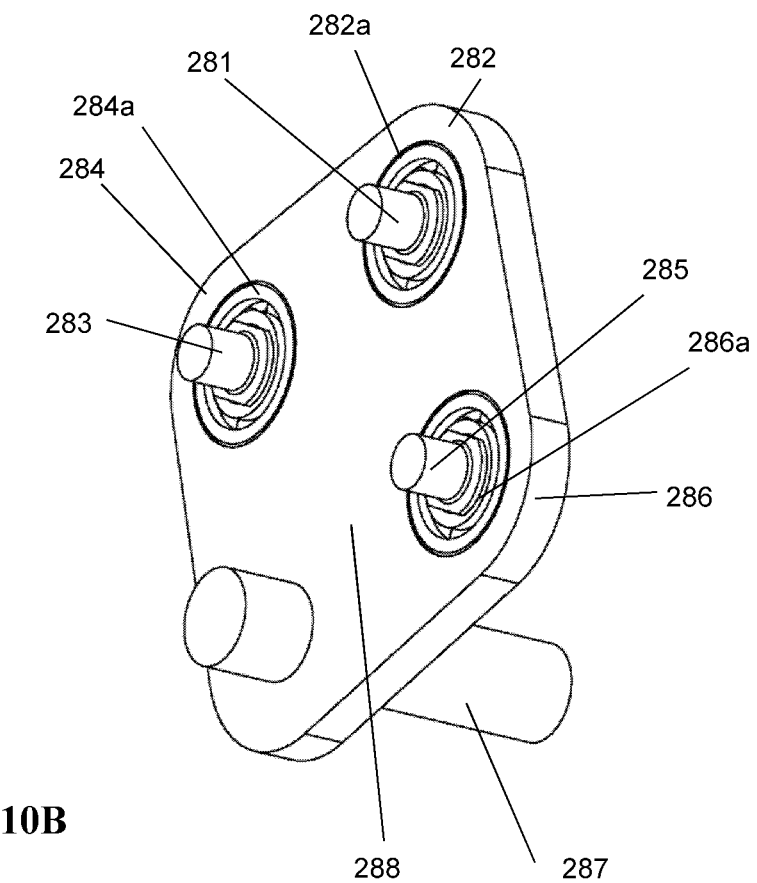
Figure 10C:
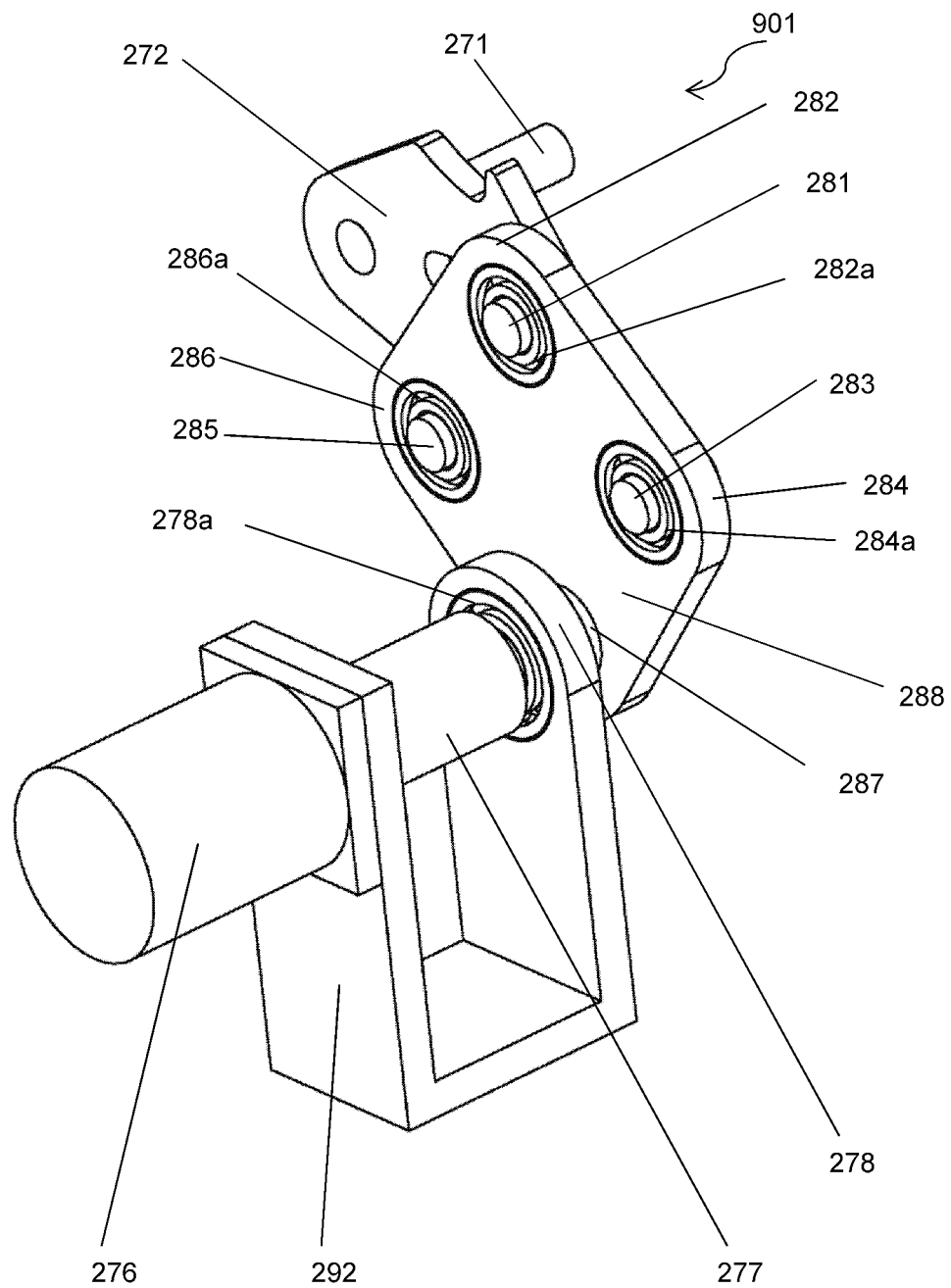
FIGS. 10C-10D show aerial views of the motorized mechanism.
Figure 10D:
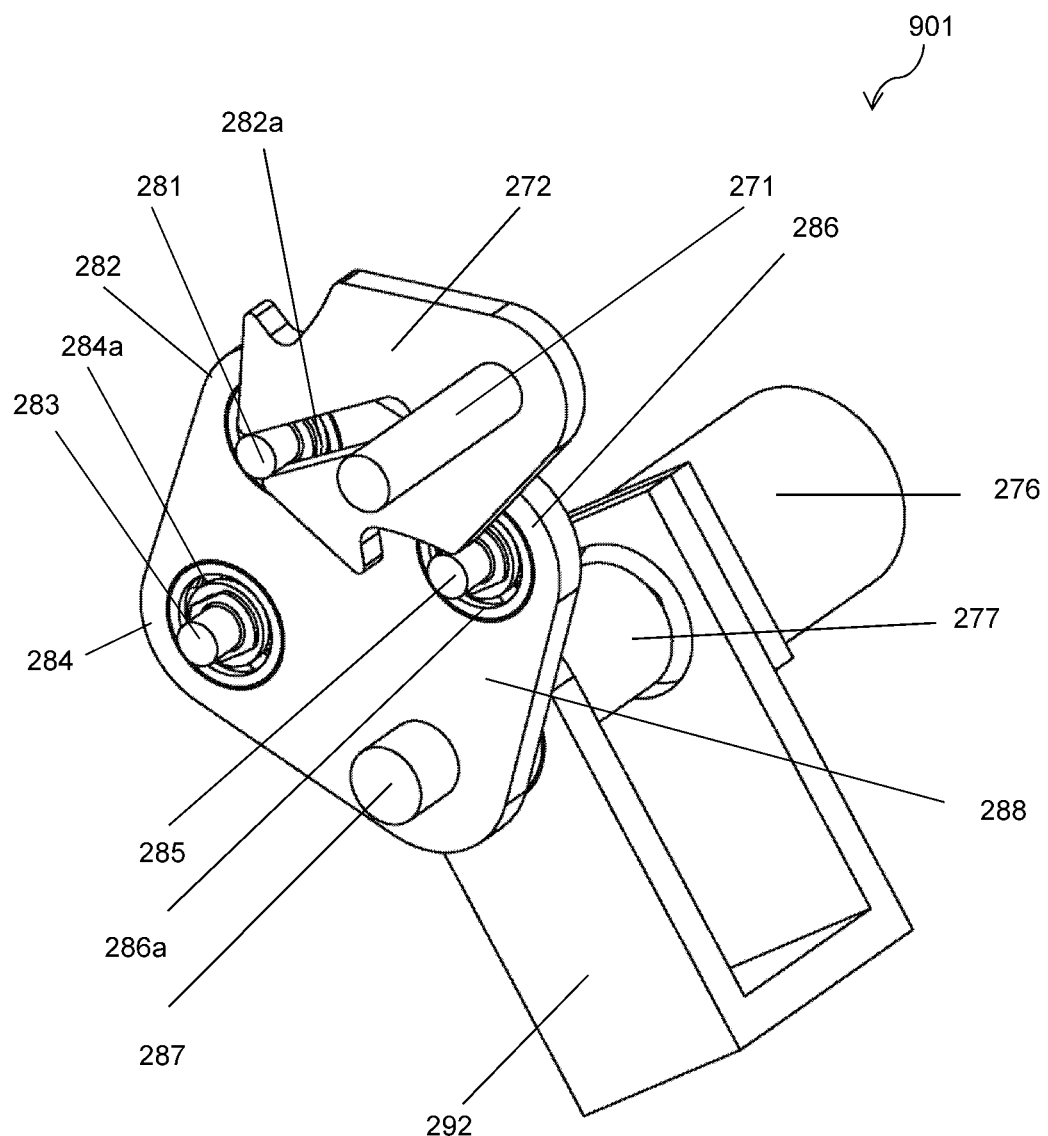
Figure 10E:
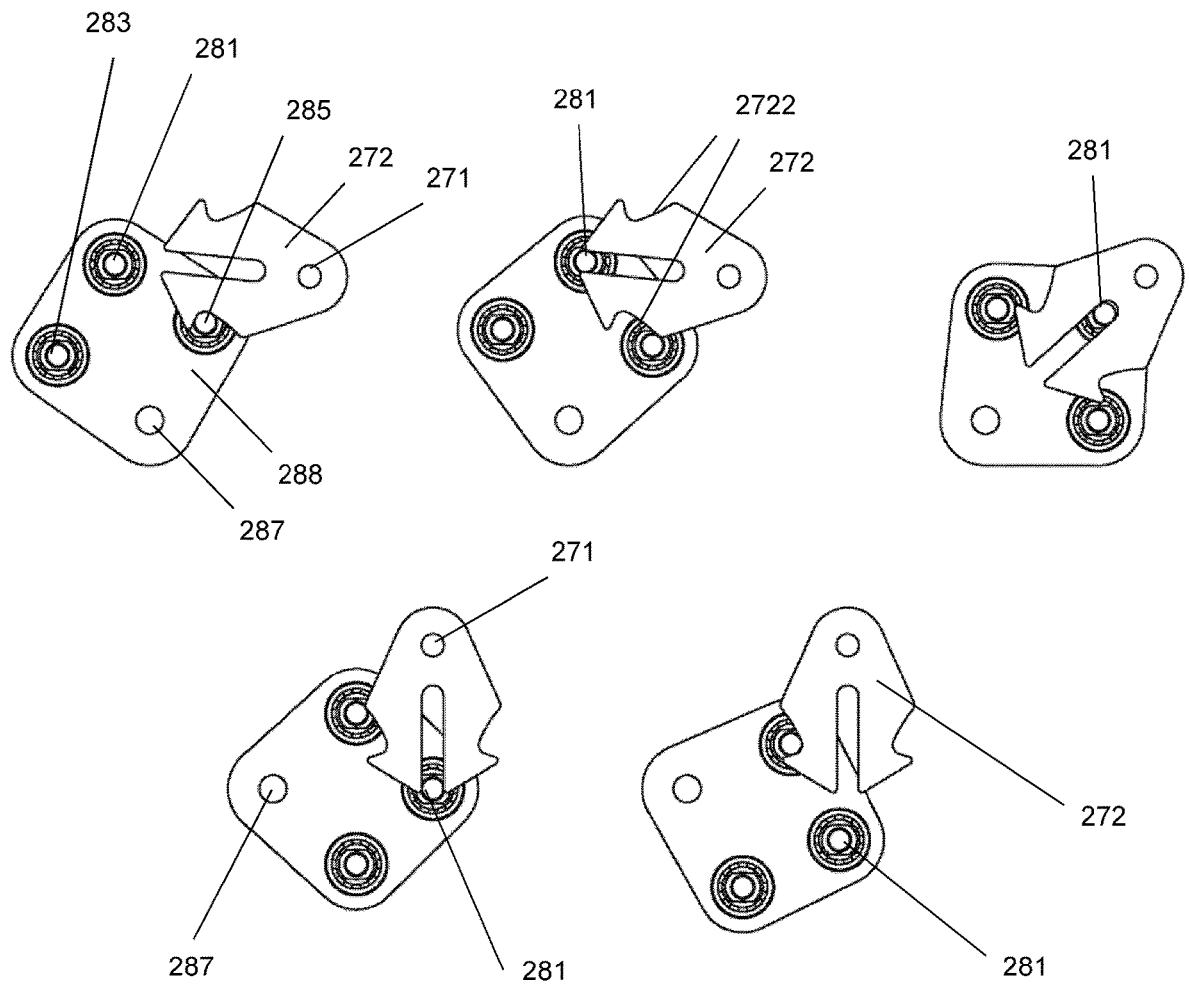
FIG. 10E shows different relative positions of some parts in the motorized mechanism.

Referring to FIGS. 10A-10D, a motorized mechanism 901 comprises a shaft 271 and a cam 272 in the shape of a plate which are rigidly connected to each other; wherein the two flat surfaces of the cam 272 are perpendicular to the axis of the shaft 271 (FIG. 10A). The surface on the edge of the cam 272 comprises two parallel flat surfaces 2721 (along two straight edges) and two sections 2722 of cylindrical surfaces (along two circular edges). The motorized mechanism 901 further comprises a shaft 287 and a flat plate 288 which are rigidly joined with each other; wherein the two flat surfaces of the plate 288 are perpendicular to the axis of the shaft 287 (see FIG. 10B). The flat plate 288 also comprises three bearing housings 282, 284 and 286. The motion mechanism 901 further comprises three shafts 281, 283 and 285, and three bearings 282a, 284a and 286a; wherein the bearing 282a connects the shaft 281 and the bearing housing 282, the bearing 284a connects the shaft 283 and the bearing housing 284, and the bearing 286a connects the shaft 285 and the bearing housing 286. The motorized mechanism 901 further comprises: (1) a support component 292 which comprises a bearing housing 278; (2) a bearing 278a which connects the bearing housing 278 and the shaft 287 (FIG. 10C); (3) a motor 276 mounted on the support component 292; (4) a coupling 277 joining the shaft of the motor 276 with the shaft 287 (FIGS. 10C-10D). The shafts 281, 283, 285, 271 and 287 are configured to be parallel to each other: and the distance between the axis of the shaft 271 and the axis of the shaft 287 is configured to be kept fixed. One or two of the shaft 281, 283 and 285 are configured to touch surface on the edges of the cam 272 as to limit or drive the rotation of the cam 272. As shown in FIG. 10E, a rotation of the shaft 287 (by the motor 276) may result in the motion of the cam 272, and hence in a rotation of the shaft 271. When the shaft 283 or 285 is kept touching the surface on a circular edge 2722, the cam 272 is configured to be not moved by a rotation of the shaft 287.

Figure 11:
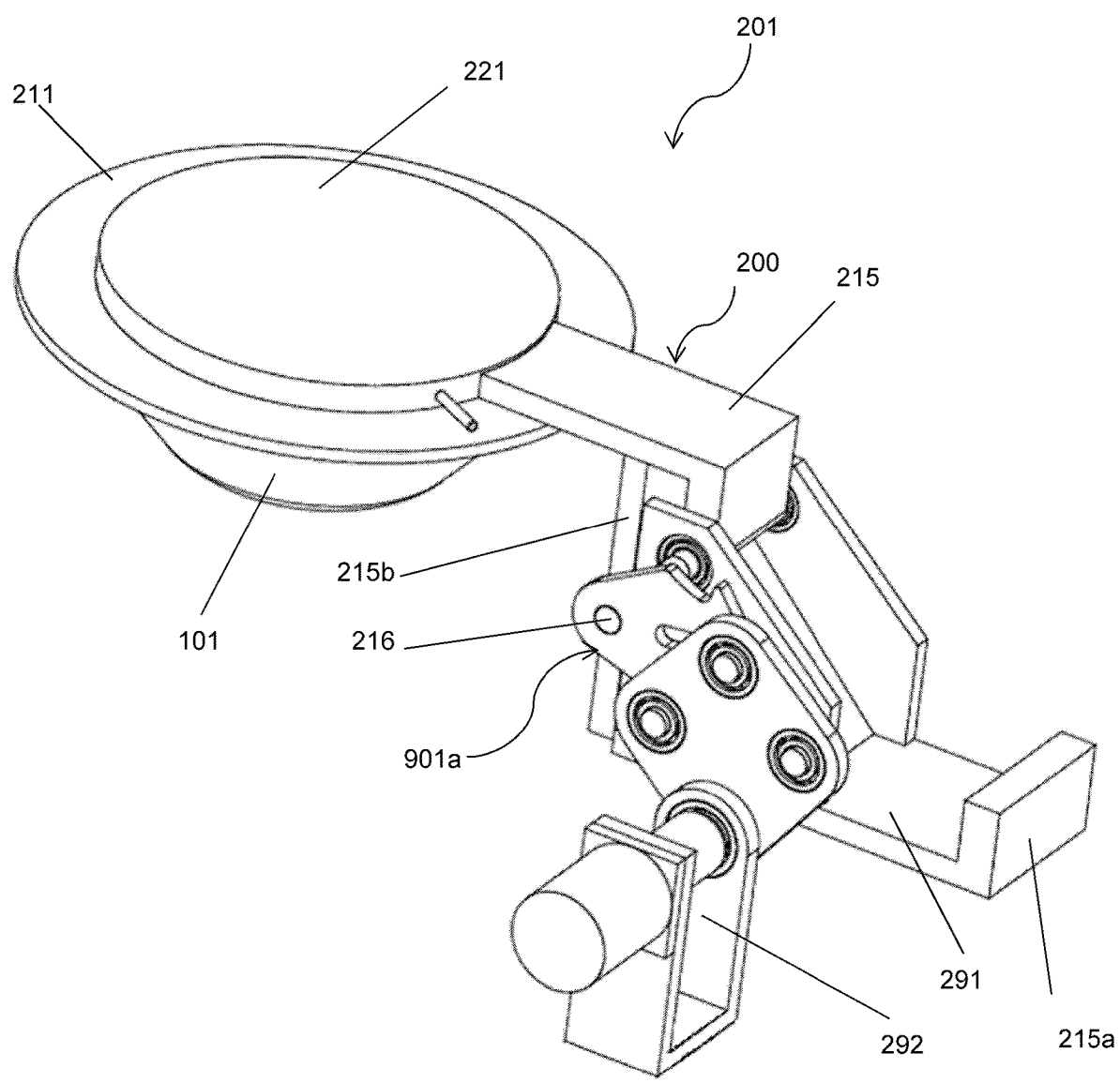
FIG. 11 shows an aerial view of an automated lid mechanism and a cookware.

Referring to FIG. 11, a lid mechanism 201 comprises the lid mechanism 200 and a motorized mechanism 901a; wherein the motorized mechanism 901a is the same as the motorized mechanism 901 where the shaft 271 in the motorized mechanism 901 is substituted by the shaft 216 of the lid mechanism 200. Moreover, the support component 291 in the mechanism 200 and the support component 292 in the mechanism 901a are configured to be rigidly connected. Thus, the distance between the axis of the shaft 216 and the axis of the shaft 287 is fixed. A rotation of the motor 276 in the motorized mechanism 901a may produce a rotation of the shaft 216, thus move the blocking device 211, ring 212 and solid cover 221 towards and away from a cookware 101. When the connector 215 touches the plate 215b, the shaft 285 in the motorized mechanism 901a is configured to touch the surface on a circular edge 2722 in the motorized mechanism 901a. At this position, the blocking device 211, ring 212, cover 221, together with shaft 216 and connector 215 are fixed relative to the support component 291. When the connector 215 touches the plate 215a, the shaft 283 in the apparatus 901a is configured to touch the surface along a circular edge 2722 in the apparatus 901a. At this position, the blocking device 211, ring 212, cover 221, together with shaft 216 and connector 215 are fixed relative to the support component 291.

It should be noted that the connector 215 is referred to as a first support component of the lid mechanism 201, and the support component 291 is referred to as a second support component of the lid mechanism 201.

It should be noted that the cookware 101, as shown in FIG. 11, is not part of the lid mechanism 200 or 201.

Figure 12:
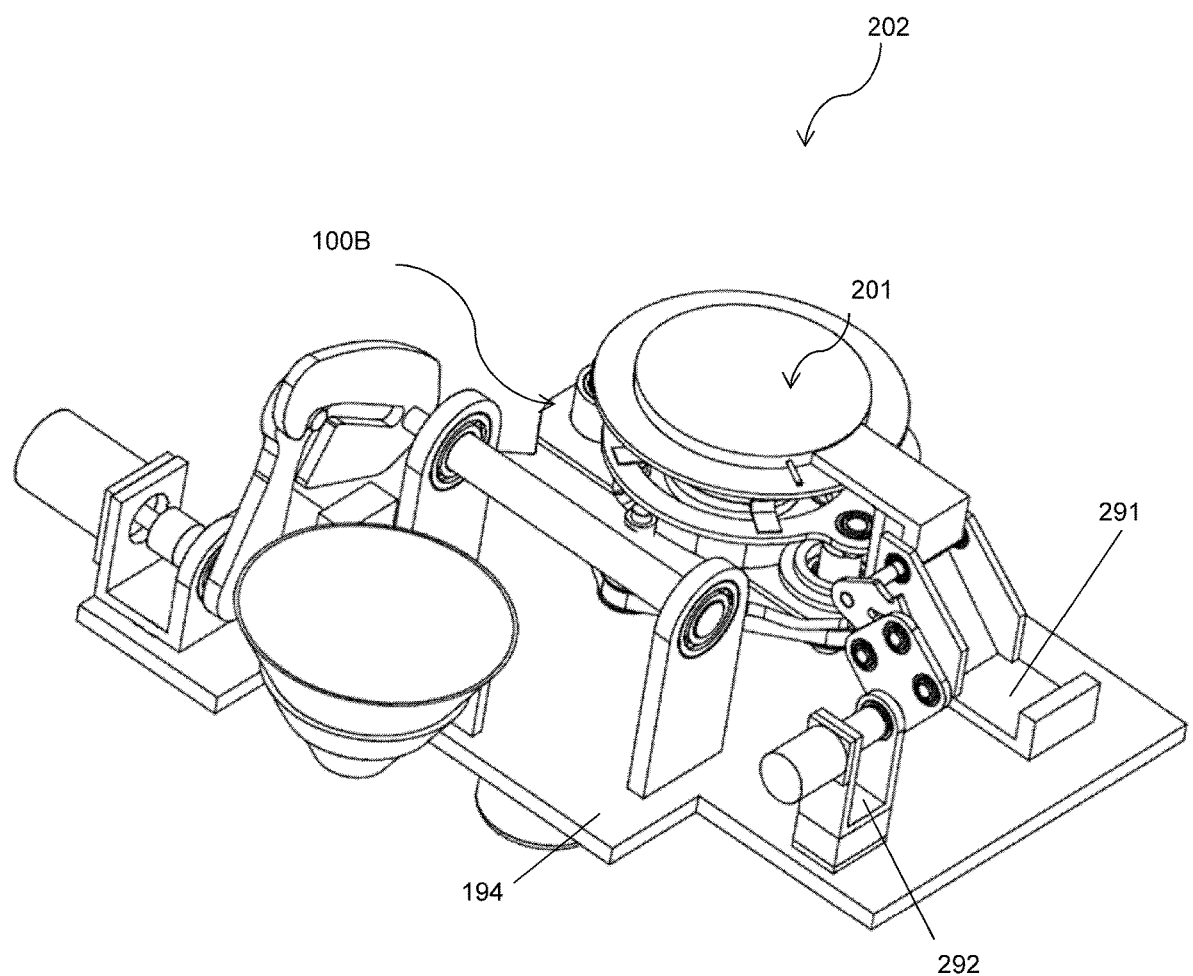
FIG. 12 shows an aerial view of an automated lid mechanism which includes a lid mechanism.

In some embodiments, referring to FIG. 12, an automated cooking apparatus 202 comprises the sub-apparatus 100B and the lid mechanism 201 wherein the support components 291 and 292 of the lid mechanism 201 are rigidly joined with the support component 194 in the sub-apparatus 100B. As explained before, during the time-period a culinary dish is processed by the automated cooking apparatus 202, the unloading mechanism in the sub-apparatus 100B is configured to keep the support component 191 at the first end-position relative to the support component 194. The stirring motion mechanism of the sub-apparatus 100B is further configured to produce a planar motion in the cookware 101 (where the directions of the planar motions may be configured to be horizontal or nearly horizontal in many applications). The closed curve 102 on the top edge of the cookware 101 is configured to be a curve which substantially lies in a plane parallel to the directions of the planar motions as produced by the stirring motion mechanism. If the blocking device 211 (together with the ring 212, cover 221, shaft 216 and connector 215) is rotated by the motorized mechanism 901a to the limit position when the connector 215 touches the plate 215b, the lower surface of the blocking device 211 is also configured to be on a plane which is parallel to the directions of the planar motions as produced by the stirring motion mechanism, and the cookware 101 is configured to be positioned below the blocking device 211. Then the distance from the curve 102 to the lower surface of the blocking device 211 is kept constant (by ignoring factors such as elastic deformations and allowances in spaces and errors) when the cookware 101 is moved by the stirring motion mechanism. In particular, the blocking device 211, at the above limit position, does not interfere with the cookware when the cookware is moved by the stirring motion mechanism. If the blocking device 211 is at the above limit position, the distance from the curve 102 to the lower surface of the blocking device 211 is configured to be substantially small, less than a millimeter, or more generally, less than two millimeters in many applications, so that the blocking device may help trap the food or food ingredients held in the cookware. In fact, the blocking device, together with the ring 212 and the cover 221, may also help trap the air and preserve heat in the inside of the cookware 101, in case of a heated cooking.

It should be noted that the blocking device 211, ring 212, cover 221, shaft 216 and connector 215 are rotated away from the limit position (i.e., the position when the connector 215 touches the plate 215b), they should not interfere with the cookware 101 either, when the cookware is moved by the stirring motion mechanism.

Figure 13:
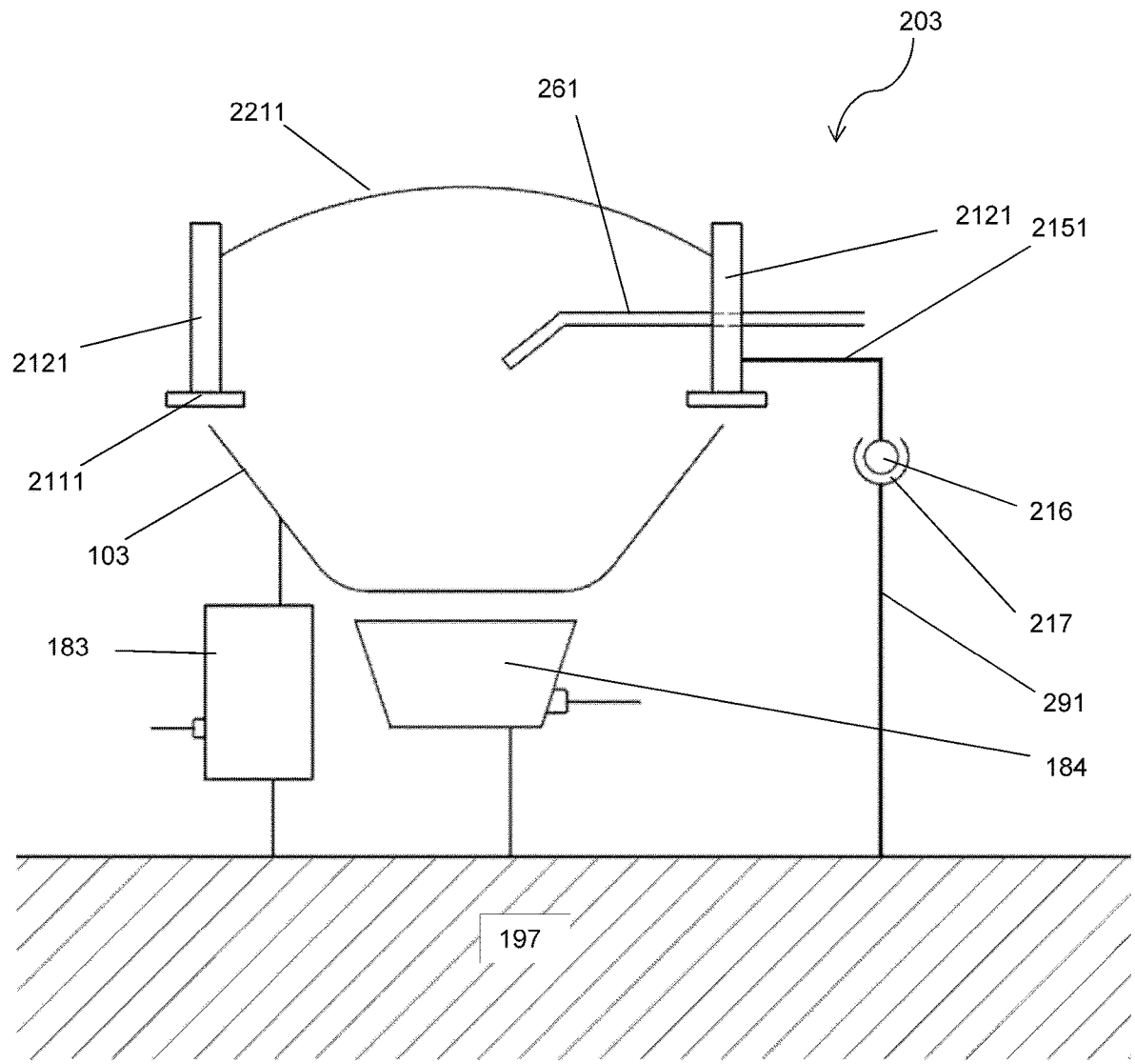
FIG. 13 shows a schematic view of an automated lid mechanism which includes a lid mechanism.

Referring to FIG. 13, an automated cooking apparatus 203 comprises: a cookware 103 configured to hold food or food ingredients; a support component 197; a stirring motion mechanism 183 comprising a support component which is fixedly connected to the support component 197, wherein the stirring motion mechanism 183 is configured to move the cookware 103 as to stir or mix or distribute the food or food ingredients held in the cookware 103; a heater 184 mounted on the support component 197 and configured to heat the food or food ingredients held in the cookware 103; and a lid mechanism described in the following. The lid mechanism comprises: a blocking device 2111; a frame 2121 which is configured to be rigidly connected to the blocking device 2111; a tube 261 which is inserted through the frame 2121, a solid cover 2211 which is connected to the frame 2121; a support component 291 which comprises a bearing housing 217; a shaft 216 which is connected to the bearing housing 217 by a bearing; a connector 2151 joining the frame 2121 with the shaft 216; wherein the support components 291 and 197 are fixedly connected. At a certain fixed position relative to the support component 197, the blocking device 2111 is configured to help trap the food or food ingredients held in the cookware 103 when the cookware 103 is moved by the stirring motion mechanism 183. Moreover, the blocking device 2111 is configured to not interfere with the cookware 103 when the cookware is moved by the stirring motion mechanism 183.

In the automated cooking apparatus 203, a motorized mechanism may be configured to rotate the shaft 216 relative to the bearing housing 217, and thus move the blocking device 2111. The blocking device 2111 as moved by the motorized mechanism is configured to not interfere with the cookware 103 when the cookware is moved by the stirring motion mechanism 183. Moreover, a computer may control the stirring motion mechanism 183, the heater 184, the motorized mechanism, and other devices in the apparatus.

In some applications, the cookware 103 may be made by metal, plastic, wood and/or other solid materials. In some applications, the heater 184 may be a gas heater, an induction heater, a microwave heater, etc. Similarly, the blocking device 2111, the frame 2121 or the cover 2211 may be made by metal, plastic, wood and/or other solid materials.

Figure 14A:
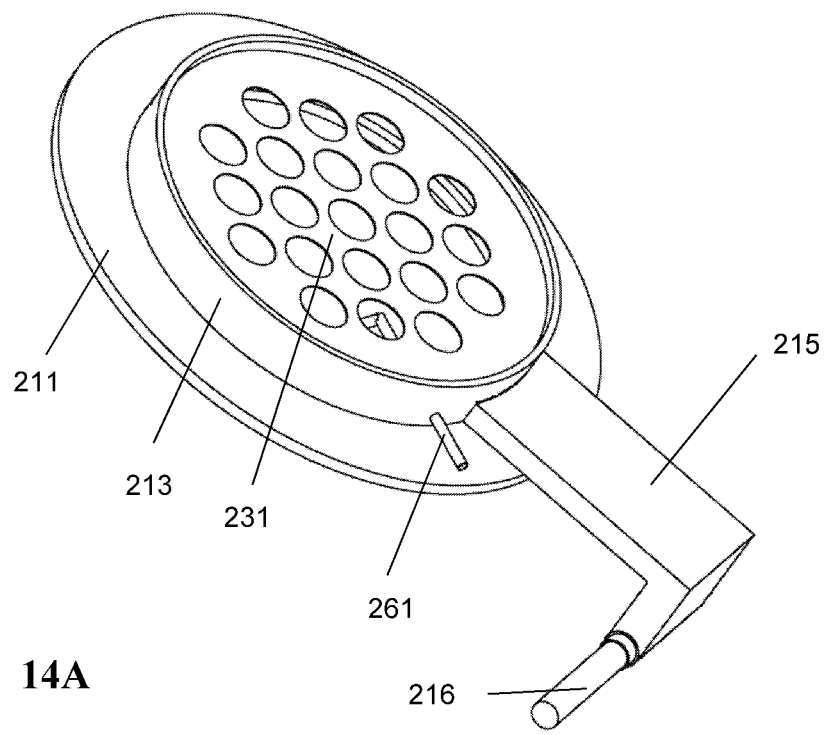
FIGS. 14A-14B show aerial views of some parts of a lid mechanism.
Figure 14B:
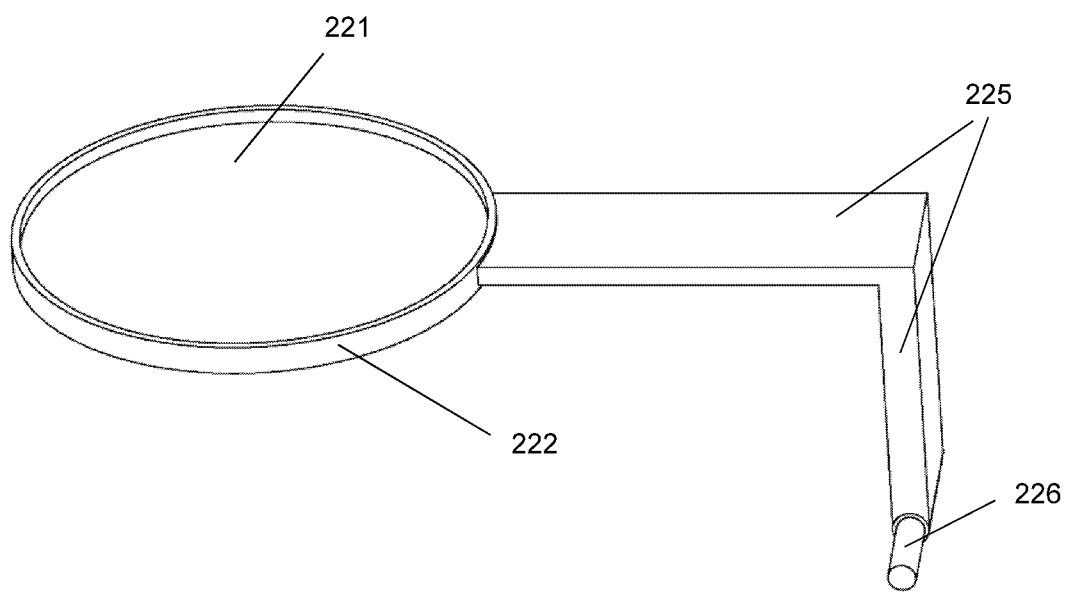
Figure 14C:
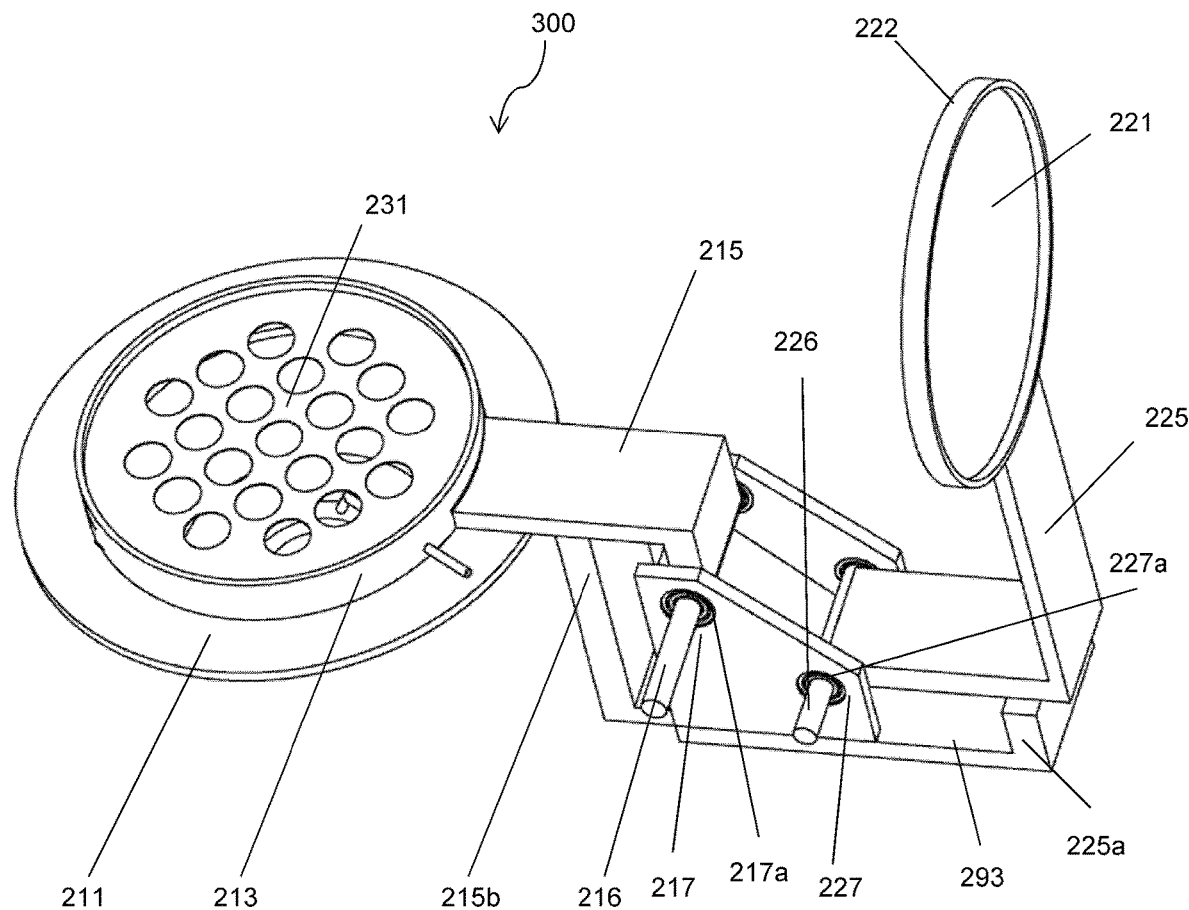
FIG. 14C show an aerial view of the lid mechanism.
Figure 14D:
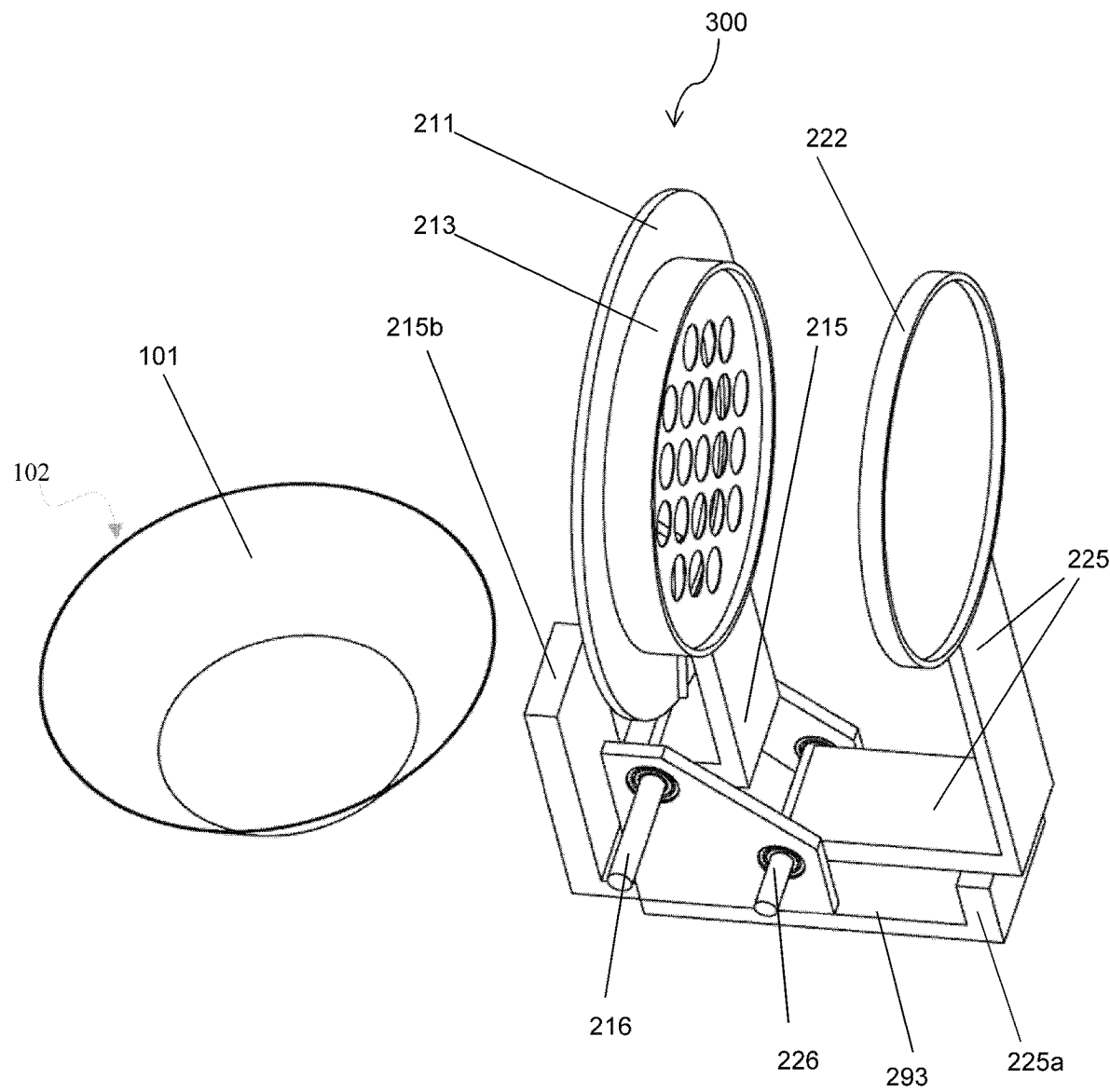
FIG. 14D shows an aerial view of the lid mechanism and a cookware.

Referring to FIGS. 14A-14D, a lid mechanism 300 comprises: a blocking device 211 which comprises a flat lower surface 219; a cylindrical ring 213 as a support element which is rigidly joined with the blocking device 211; a porous cover 231 which is joined with the ring 213; a tube 261 which is inserted through the ring 213; a shaft 216; and a connector 215 configured to connect the shaft 216 and the ring 213 (FIG. 14A). The lid mechanism 300 also comprises: a cylindrical ring 222 as a support element; a solid cover 221 which is rigidly joined with the ring 222; a shaft 226; and a connector 225 which rigidly connects the ring 222 with the shaft 226 (FIG. 14B). The lid mechanism 300 further comprises: a support component 293; two bearing housings 217 which are rigidly connected to the support component 293; two bearings 217a, each of which connects the shaft 216 and a bearing housing 217; two bearing housings 227 which are rigidly connected to the support component 293; and two bearings 227a, each of which connects the shaft 226 and a bearing housing 227; a plate 215b which is mounted on the support component 293; a plate 225a which is mounted on the support component 293 (FIG. 14C). The plate 215b is configured to limit the position of the connector 215 (FIG. 14C); and the plate 225a is configured to limit the position of the connector 225 (FIGS. 14C-14D).

It should be noted that the ring 222 and 213 in the lid mechanism 300 may touch each other. One can be a limit for the position of the other.

It should be noted that the cookware 101 in the figures is not part of the lid mechanism 300.

Figure 14E:
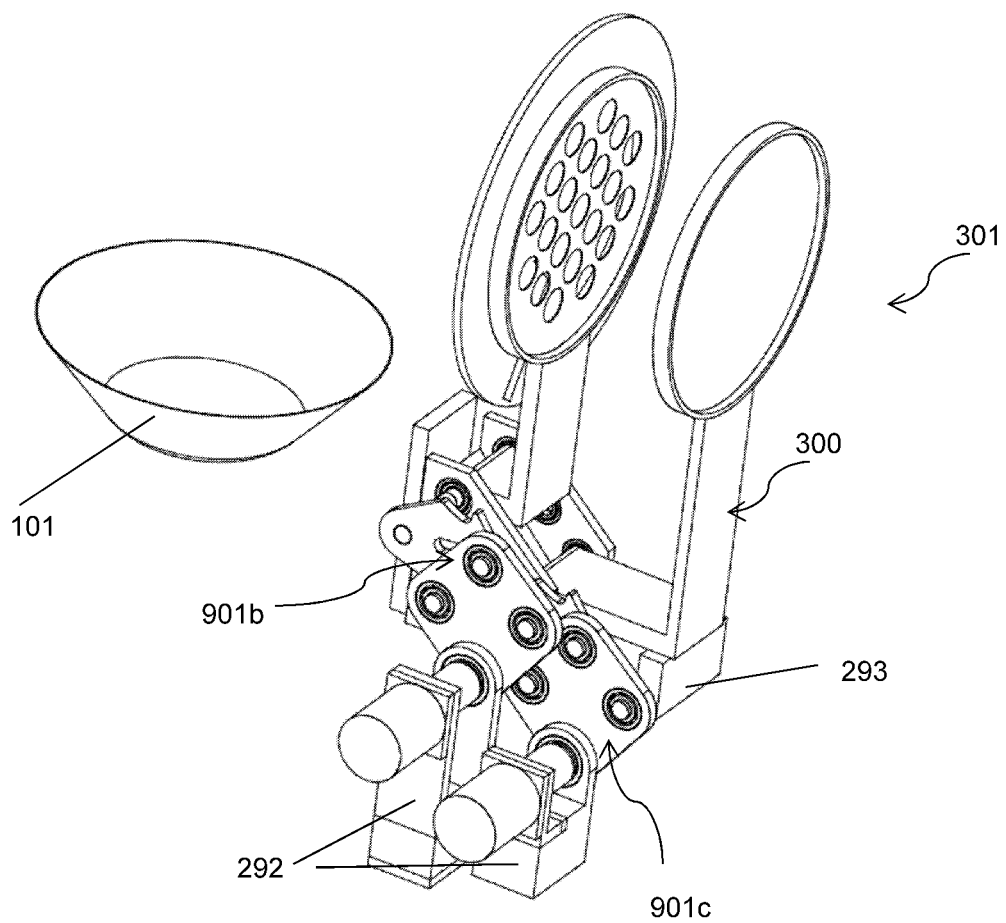
FIG. 14E show an aerial view of a cookware and a lid mechanism comprising a porous cover and a solid cover and the corresponding motorized mechanisms.

In some embodiments, referring to FIG. 14E, an automated cooking apparatus 301 comprises: the lid mechanism 300; and motorized mechanisms 901b and 901c; wherein the motorized mechanism 901b is the same as a motorized mechanism 901 except that the shaft 271 in the motorized mechanism 901 is substituted by the shaft 216 of the lid mechanism 300; wherein the motorized mechanism 901c is the same as a motorized mechanism 901 except that the shaft 271 is substituted by the shaft 226 of the lid mechanism 300. Moreover, the support components 293 in the mechanism 300 is configured to be rigidly connected to the support components 292 in the mechanisms 901b and 901c. Thus, the distance between the axis of the shaft 216 (or 226) and the axis of the shaft 287 in the motorized mechanism 901*b* (or respectively 901*c*) is fixed. A rotation of the motor 276 in the motorized mechanism 901*b* may produce a two-way rotation of the shaft 216, thus a two-way rotation of the blocking device 211, the ring 213 and the porous cover 231, towards or away from the cookware 101. When the connector 215 touches the plate 215*b*, the shaft 285 in the apparatus 901*b* is configured to touch the surface along a circular edge 2722 in the apparatus 901*b*. At this position, the blocking device 211, ring 213, porous cover 231, shaft 216 and connector 215 are fixed relative to the support component 293, and the position of the blocking device is referred to a first end-position relative to the support component 293. Similarly, a rotation of the motor 276 in the motorized mechanism 901*c* may produce a two-way rotation of the shaft 226, thus a two-way rotation in the ring 222 and the solid cover 221, towards and away from a cookware 101. When the connector 225 touches the plate 225*a*, the shaft 283 in the apparatus 901*c* is configured to touch the surface along a circular edge 2722 in the apparatus 901*c*. At this position, the ring 222, solid cover 221, shaft 226 and connector 225 are fixed relative to the support component 293.

Figure 15A:
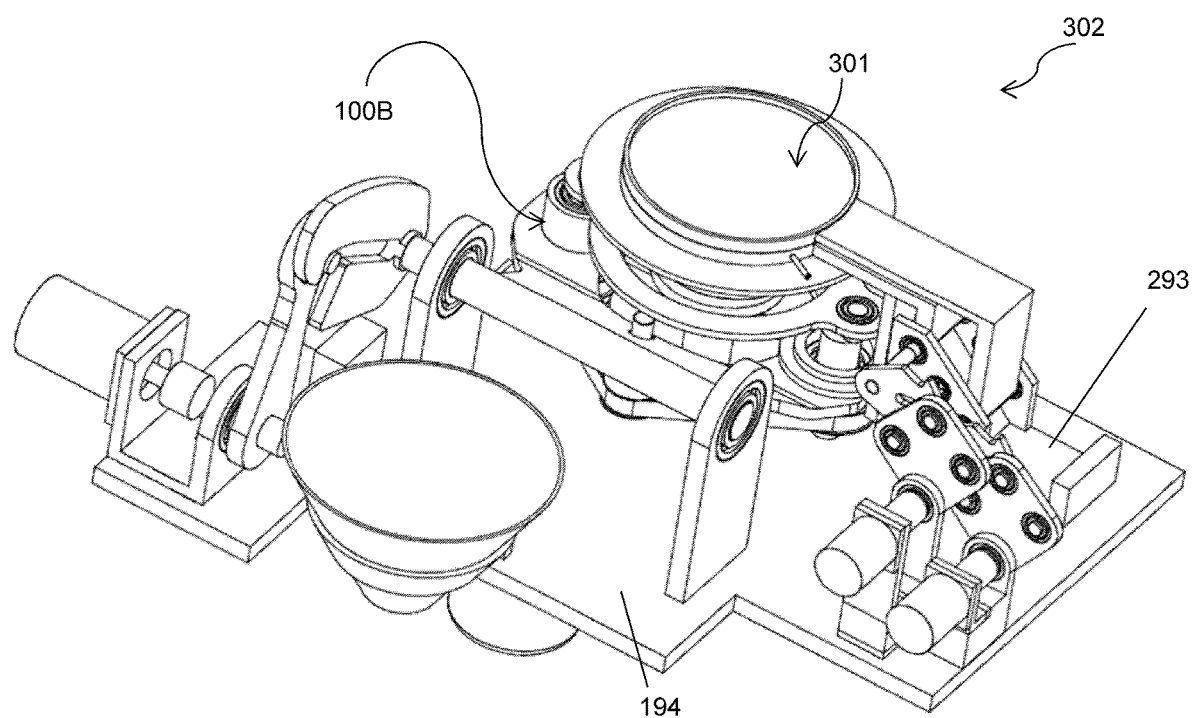
FIG. 15A shows an aerial view of an automated cooking apparatus which includes the lid mechanism of FIG. 14E.
Figure 15B:
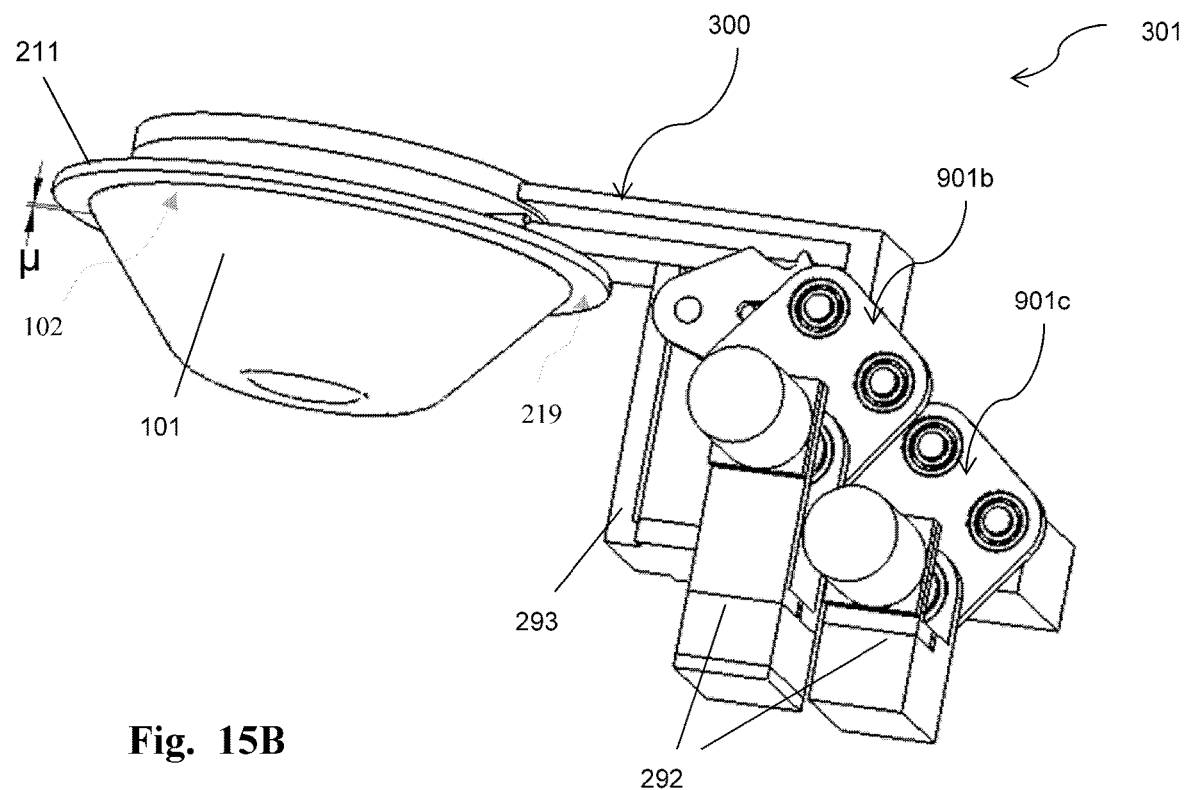
FIGS. 15B-15C show aerial views of parts of the apparatus.
Figure 15C:
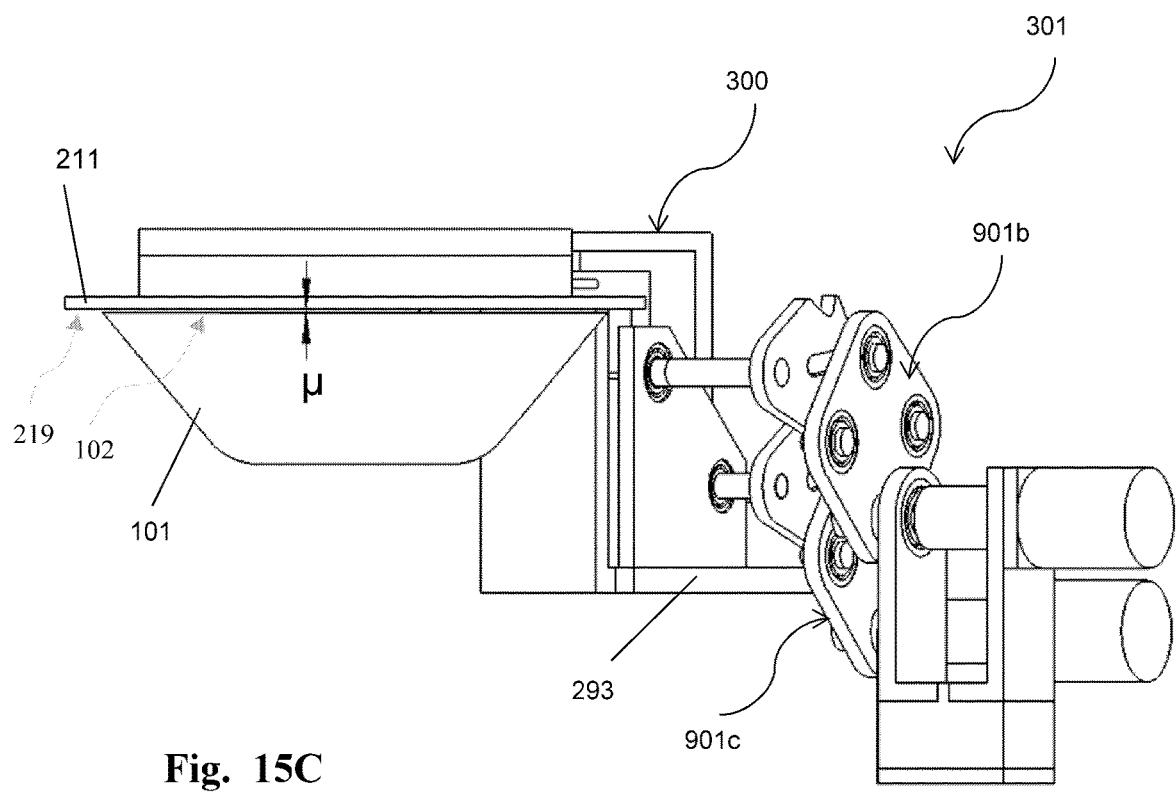

In some embodiments, referring to FIG. 15A-15C, an automated cooking apparatus 302 comprises: the sub-apparatus 100B; the lid mechanism 301; wherein the support component 194 of the sub-apparatus 100B is rigidly connected to the support component 293 (and the support components 292) in the lid mechanism 301. During the time-period a food is cooked by the automated cooking apparatus 202, the unloading mechanism in the sub-apparatus 100B keeps the support component 191 of the stirring motion mechanism of the sub-apparatus 100B at the first end-position relative to the support component 194. In the following descriptions, we will assume that the support component of the stirring motion mechanism is kept fixed at the first end-position relative to the support component 194.

The stirring motion mechanism may produce a vibrating planar motion in the cookware 101, wherein the directions of the planar motions are configured to be horizontal or nearly horizontal. The curve 102 (i.e., the ridge 102) of the cookware 101 is configured to be a curve which lies in a plane parallel to the directions of the planar motions by the stirring motion mechanism (i.e., an invariant plane of the stirring motion mechanism), wherein the plane is fixed relative to the support component of the stirring motion mechanism even if the cookware 101 is actively moved by the stirring motion mechanism.

When the blocking device 211 (together with the ring 212, shaft 216 and connector 215) is rotated by the motorized mechanism 901*b* to the limit position when the connector 215 touches the plate 215*b*, the lower surface of the blocking device 211 is also configured to be on a plane which is parallel to the directions of the planar motions produced by the stirring motion mechanism. At this position, the blocking device 211 is said to be at a first end-position relative to the support component of the stirring motion mechanism.

The ridge 102 of the cookware 101 is a planar curve, and the lower surface 219 of the blocking device 211 is a planar surface. When the blocking device 211 is at the first end-position relative to the support component 293, the cookware 101 may be configured to be positioned below the lower surface 219 of the blocking device 211, so that the ridge 102 and the surface 219 are contained in a pair of parallel planes. Therefore, the distance from the ridge 102 to the lower surface 219 of the blocking device 211 is kept constant (by ignoring factors such as elastic deformations and allowances in spaces and errors) even if the cookware 101 is moved by the stirring motion mechanism. The distance t between the ridge 102 of the cooking container 101 and lower surface 219 of the blocking device 211 is configured to be small (see FIGS. 15B-15C).

Theoretically, the distance p may be arbitrarily small. The distance t is only needed to make room for elastic and other deformations, and allowances in spaces and errors. Thus, the distance p need not be more than the sum of the following quantities: (a) the maximal effect caused by the elastic or other non-rigid deformation of the cooking container 101; (b) the maximal effect caused by the elastic or other non-rigid deformation of the blocking device 211; (c) the allowances in spaces and errors. In our applications, the sum of these quantities may be configured to be less than two millimeters, and thus the distance p is configured to be less than one millimeter in most of our applications, and no more two millimeters in any case, so that the blocking device may help trap the food or food ingredients held in the cookware when the cookware is moved by the stirring motion mechanism. This can be achieved by controlling the rigidity and accuracy of the parts in the manufacturing process and the installation and assembly. On its part, the solid cover 221, together with the ring 222, shaft 226, connector 225, may be rotated by the motorized mechanism 901*c*.

When the blocking device 211 is moved away from the limit position where the connector 215 touches the plate 215*b*, the blocking device should stay away from the cookware 101 when the cookware is moved by the stirring motion mechanism. The other parts of the lid mechanism 300 should stay away from the cookware 101 as well. Then, the lid mechanism 301 does not interfere with the cookware 101 when the cookware is moved by the stirring motion mechanism.

The planes which are parallel to the directions of motion by the stirring motion mechanism are invariant planes of the stirring motion mechanism.

Figure 16A:
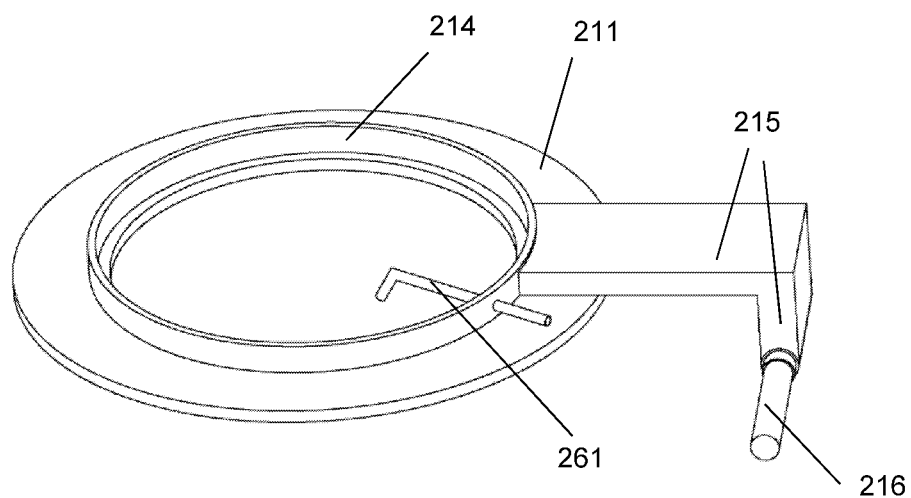
FIGS. 16A-16B show aerial views of parts of a lid mechanism.
Figure 16B:
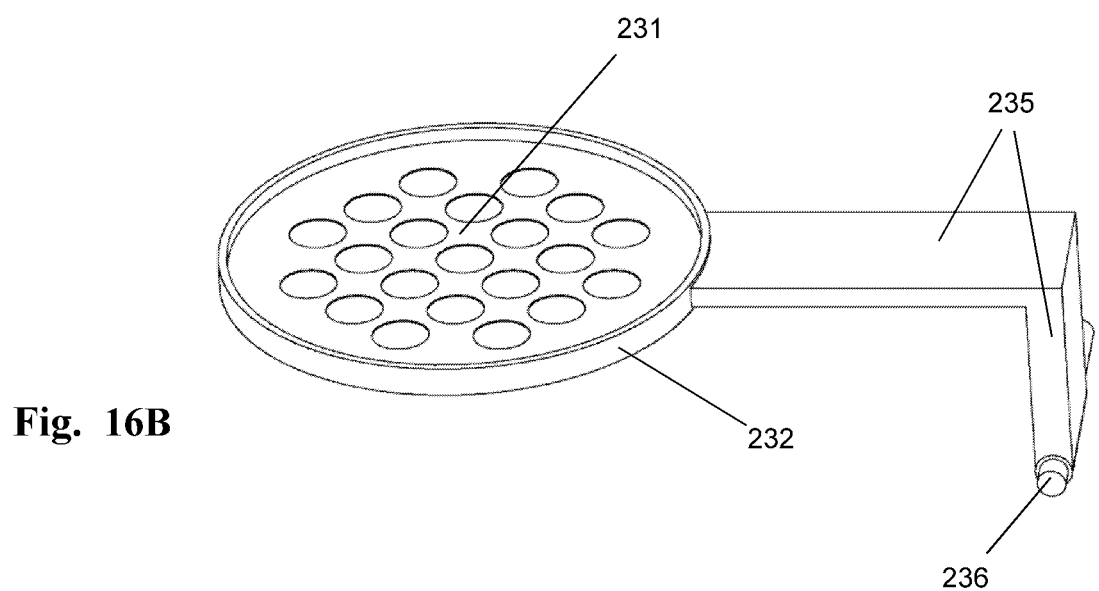
Figure 17A:
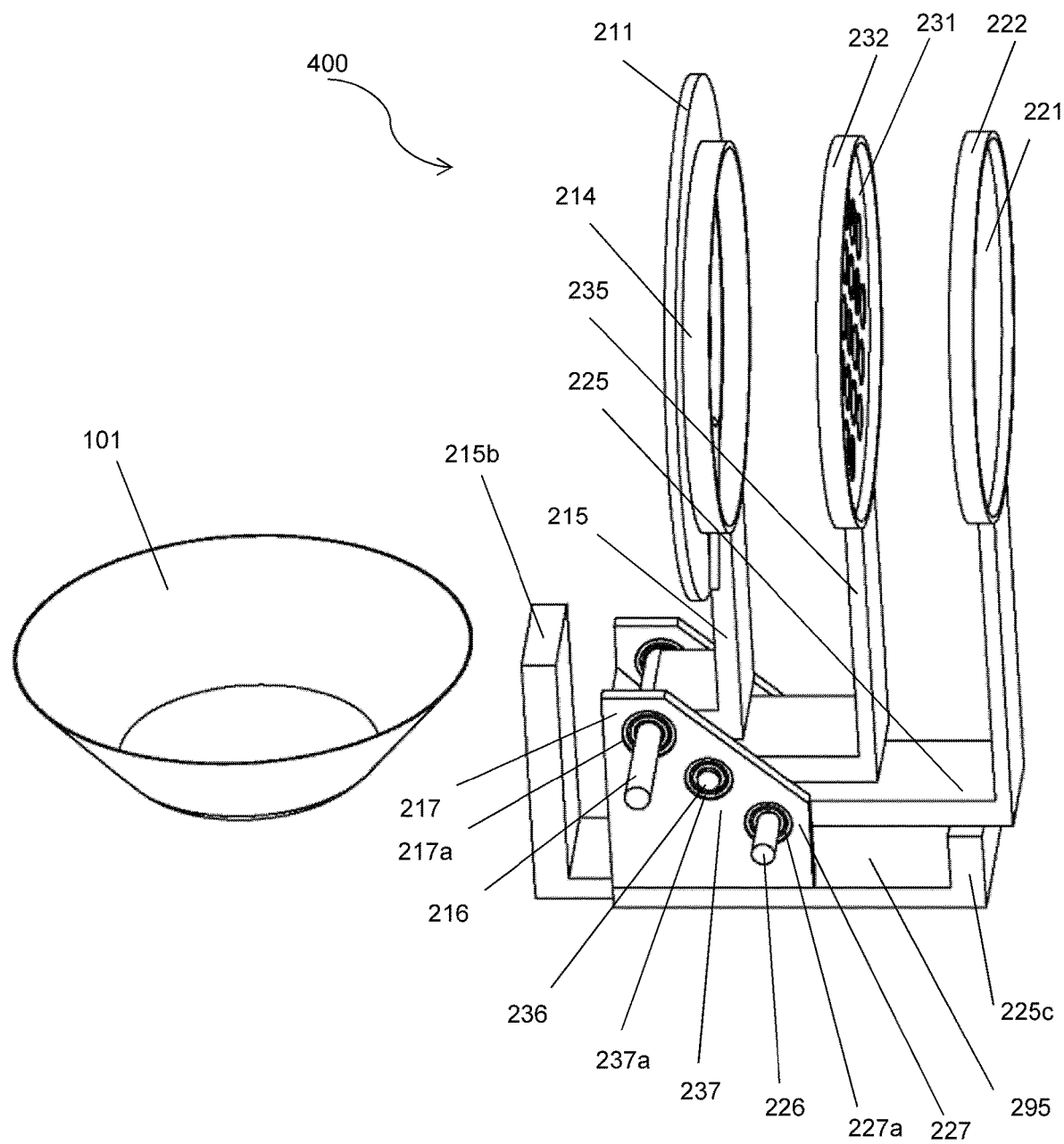
FIGS. 17A-17D show aerial views of some parts of a lid mechanism and a cookware.
Figure 17B:
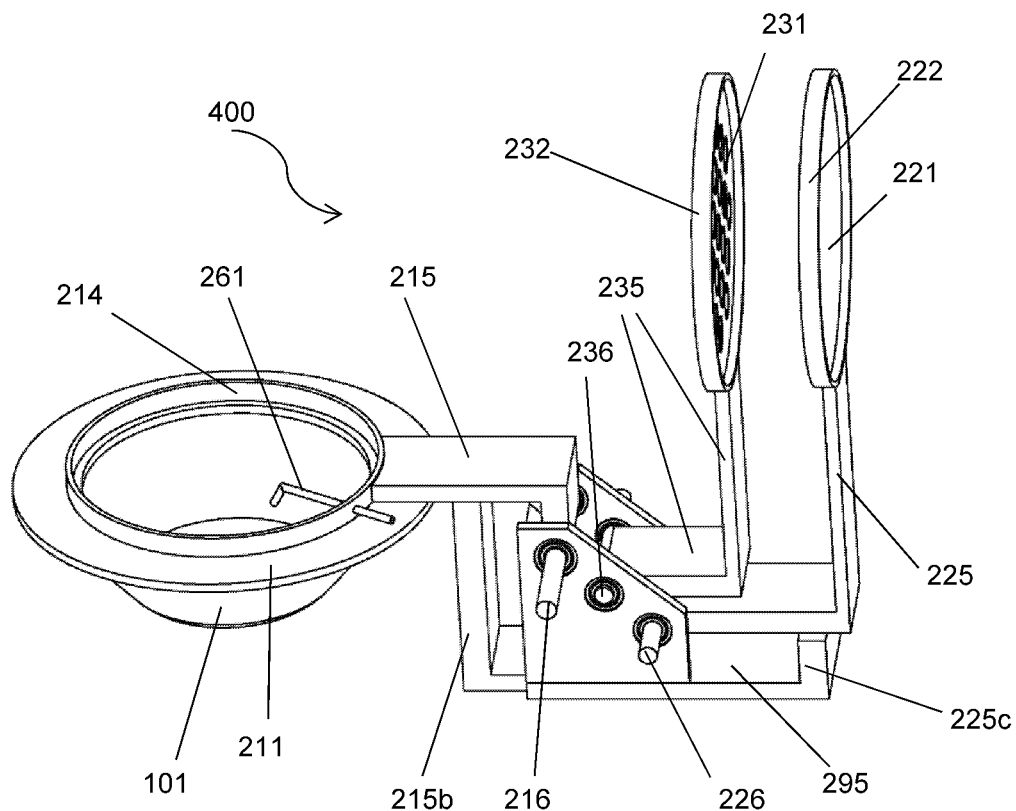
Figure 17C:
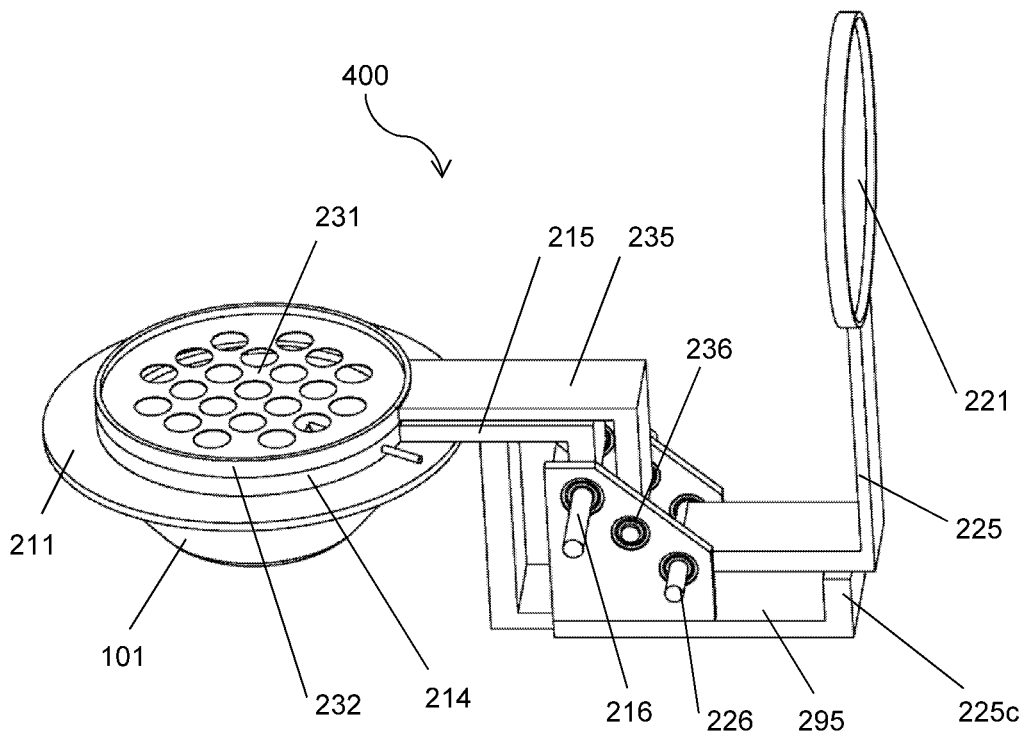
Figure 17D:
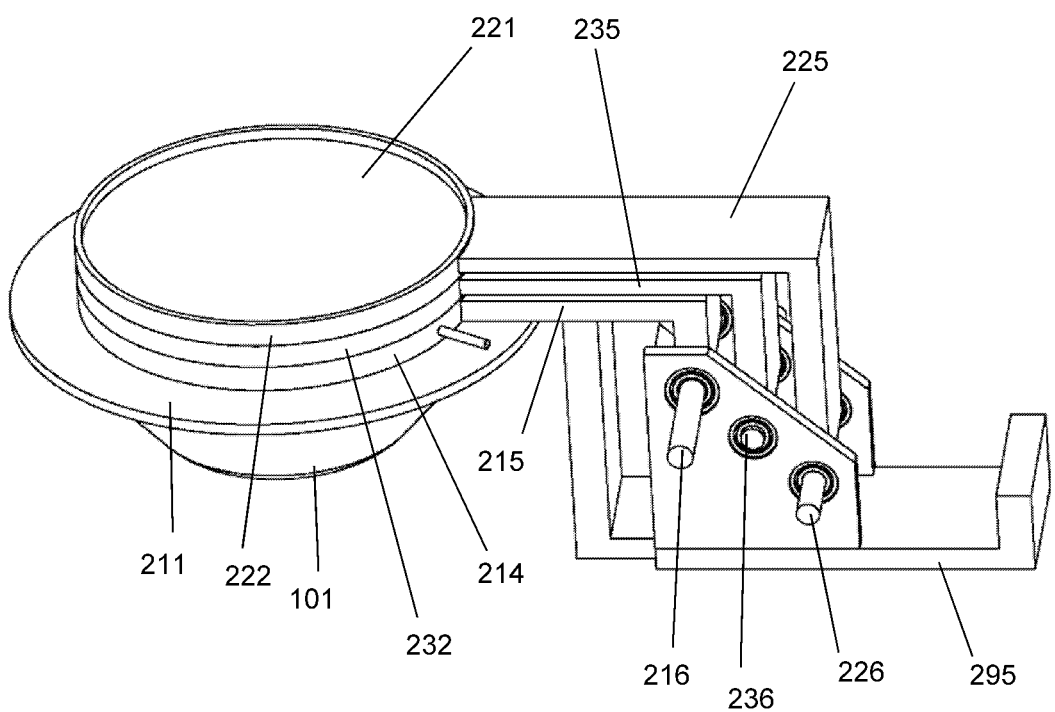

Referring to FIGS. 16A-17D and FIG. 14B, a lid mechanism 400 comprises: a blocking device 211; a cylindrical ring 214 (as a support element) which is rigidly joined with the blocking device 211; a tube 261 which is inserted through the ring 214; a shaft 216; a connector 215 configured to connect the shaft 216 and the ring 214 (FIG. 16A). The lid mechanism 400 also comprises: a cylindrical ring 232 as a support element; a porous cover 231 which is joined with the ring 232; a shaft 236; and a connector 235 which rigidly connects the ring 232 with the shaft 236 (FIG. 16B). The lid mechanism 400 also comprises: a cylindrical ring 222 as a support element; a solid cover 221 which is joined with the ring 222; a shaft 226; and a connector 225 which rigidly connects the ring 222 with the shaft 226 (FIG. 14B). Referring to FIG. 17A, the lid mechanism 400 further comprises: a support component 295; two bearing housings 217 which are rigidly connected to the support component 295; two bearings 217*a*, each of which connects the shaft 216 and a bearing housing 217; two bearing housings 227 which are rigidly connected to the support component 295; and two bearings 227*a*, each of which connects the shaft 226 and a bearing housing 227; two bearing housings 237 which are rigidly connected to the support component 295; and two bearings 237*a*, each of which connects the shaft 236 and a bearing housing 237; a plate 215*b* which is mounted on the support component 295; a plate 225*c* which is mounted on the support component 295 (FIG. 17A). The plate 215*b* is configured to limit the position of the connector 215; and the plate 225*c* is configured to limit the position of the connector 225. FIGS. 17A-17D show different positions of the connectors 215, 225 and 235, and different positions of the corresponding rings 214 (which is connected to the blocking device 211), 222 (which is connector with the solid cover 221) and 232 (which is connected to the porous cover 231).

It should be noted that the ring 232 and 214 in the lid mechanism 400 may touch each other: and one can be a limit for the position of the other. Similarly, the ring 222 and 232 in the lid mechanism 400 may touch each other; and one can be a limit for the position of the other.

It should be noted that the cookware 101 in the figures is not part of the lid mechanism 400.

Figure 18A:
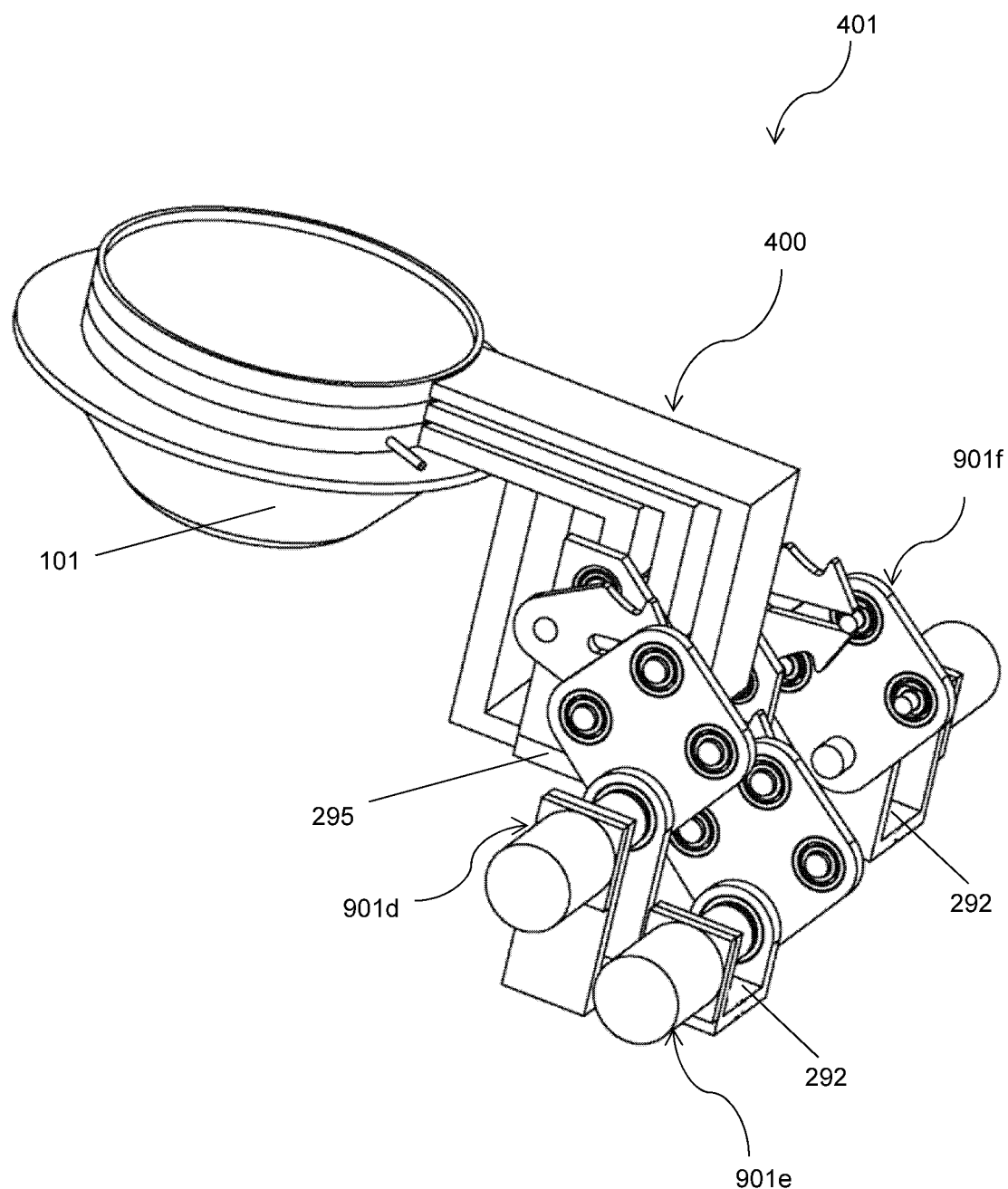
FIGS. 18A-18B show aerial views of an automated lid mechanism and a cookware.
Figure 18B:
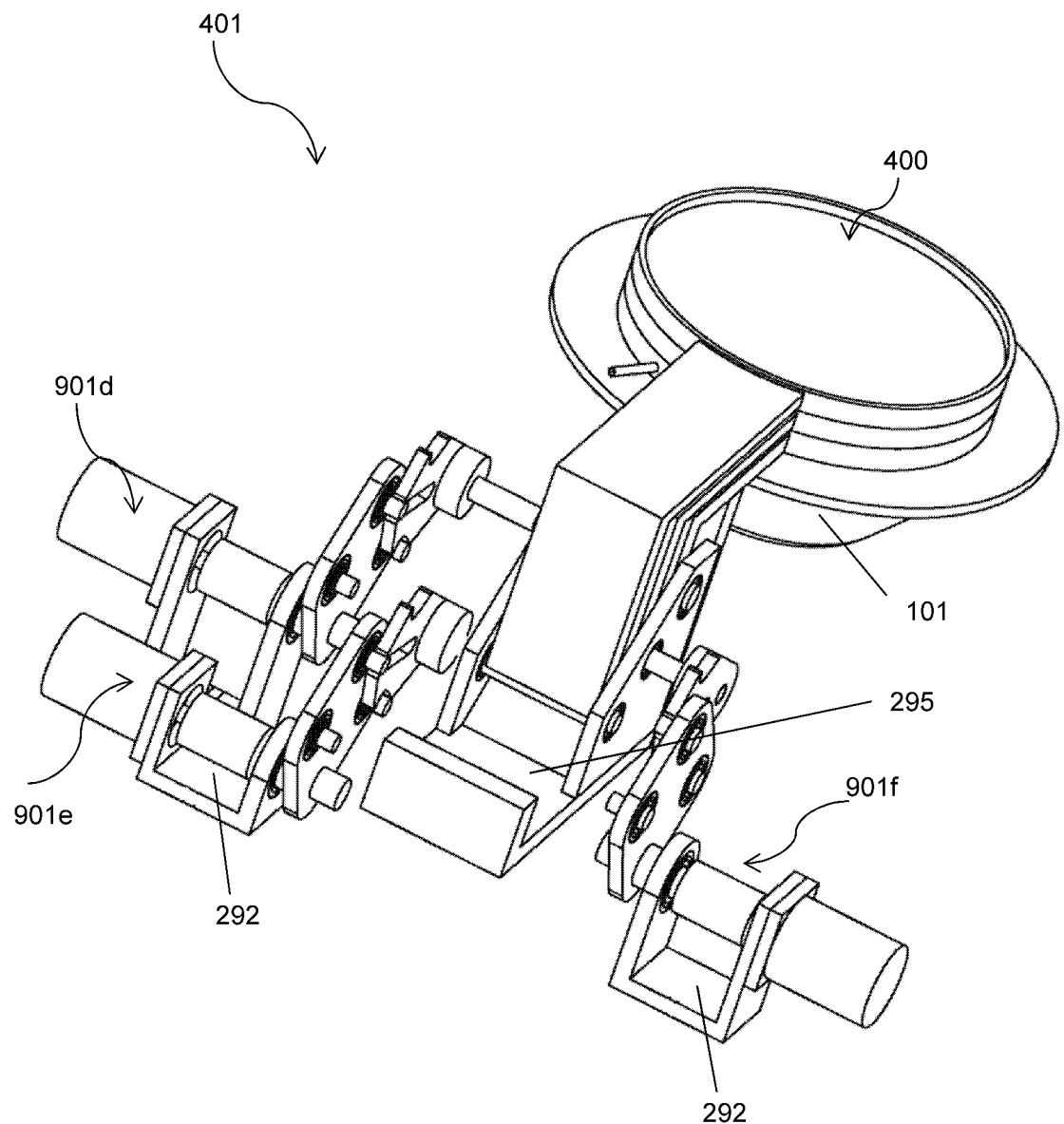

In some embodiments, referring to FIGS. 18A-18B, an automated cooking apparatus 401 comprises the lid mechanism 400 and motorized mechanisms 901d, 901e, 901f; where the motorized mechanism 901d is the same as the motorized mechanism 901 except that the shaft 271 in 901 is substituted by the shaft 216 of the lid mechanism 400; the motorized mechanism 901e is the same as the motorized mechanism 901 except that the shaft 271 is substituted by the shaft 226 of the lid mechanism 400; and the motorized mechanism 901f is the same as the motorized mechanism 901 except that the shaft 271 is substituted by the shaft 236 of the lid mechanism 400. Moreover, the support component 295 in the mechanism 400 is configured to be rigidly connected to the support components 292 in the mechanisms 901d, 901e and 901f. Thus, the distance between the axis of the shaft 216 (or 226, or 236) and the axis of the shaft 287 in the mechanism 901d (or respectively 901e, or 901f) is fixed. A rotation of the motor 276 in the motorized mechanism 901d may produce a rotation of the shaft 216, thus move the blocking device 211 and ring 214 towards or away from the cookware 101. When the connector 215 touches the plate 215b, the shaft 285 in the apparatus 901d is configured to touch the surface on the circular edge 2722 in the apparatus 901d. At this position, the blocking device 211, ring 214, shaft 216 and connector 215 are fixed relative to the support component 295. Similarly, a rotation of the motor 276 in the motorized mechanism 901e may produce a rotation of the shaft 226, thus move the ring 222 and solid cover 221 towards and away from the cookware 101. Also, a rotation of the motor 276 in the motorized mechanism 901f may produce a rotation of the shaft 236, thus move the ring 232 and porous cover 231 towards and away from the cookware 101. When the connector 225 touches the plate 225c, the shaft 283 in the apparatus 901e is configured to touch the surface on the circular edge 2722 of the cam 272 in the apparatus 901e. At this position, the ring 222, solid cover 221, shaft 226 and connector 225 are fixed relative to the support component 295.

Figure 19A:
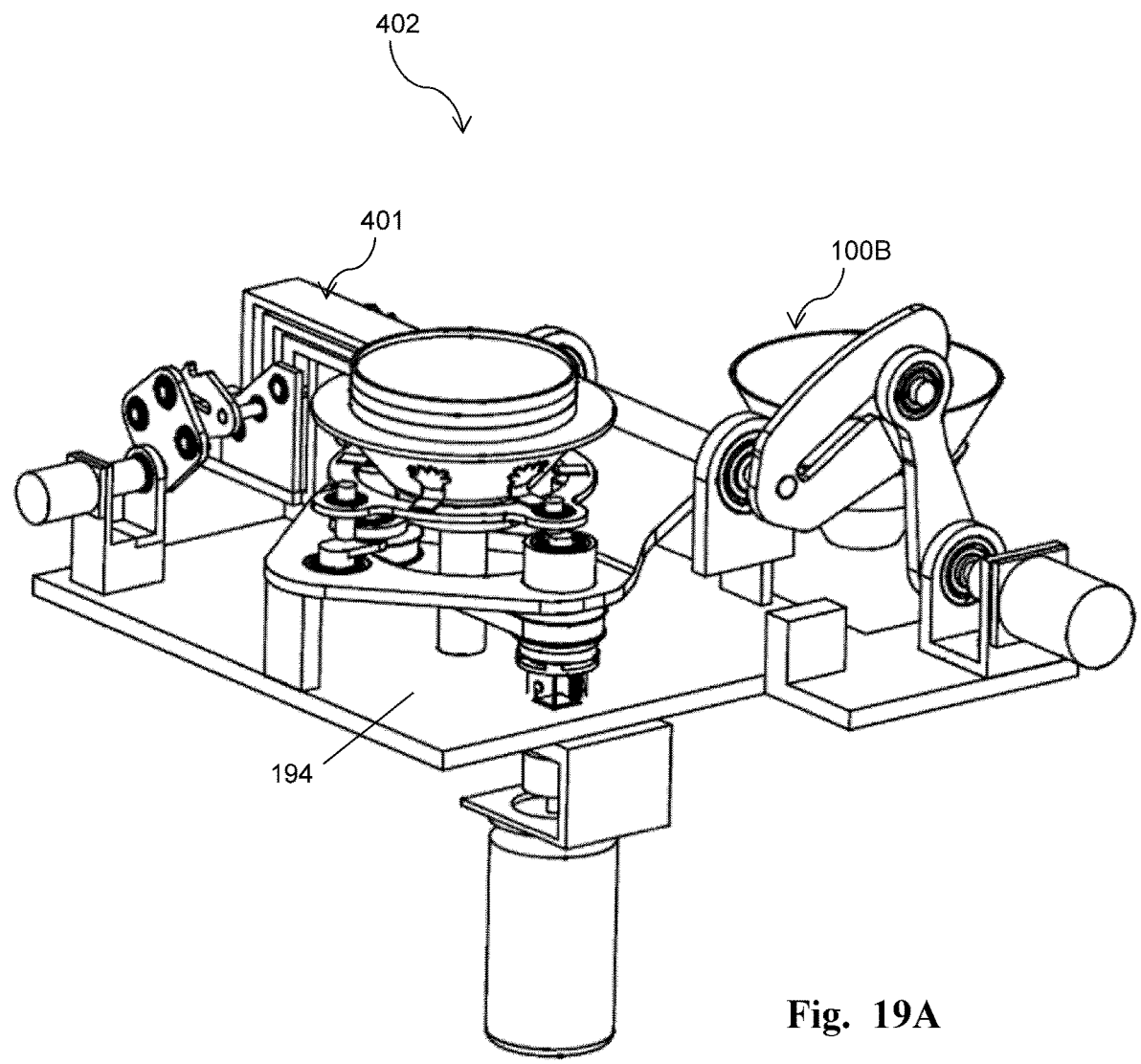
FIG. 19A-19C show aerial views of an automated cooking mechanism which includes a lid mechanism.
Figure 19B:
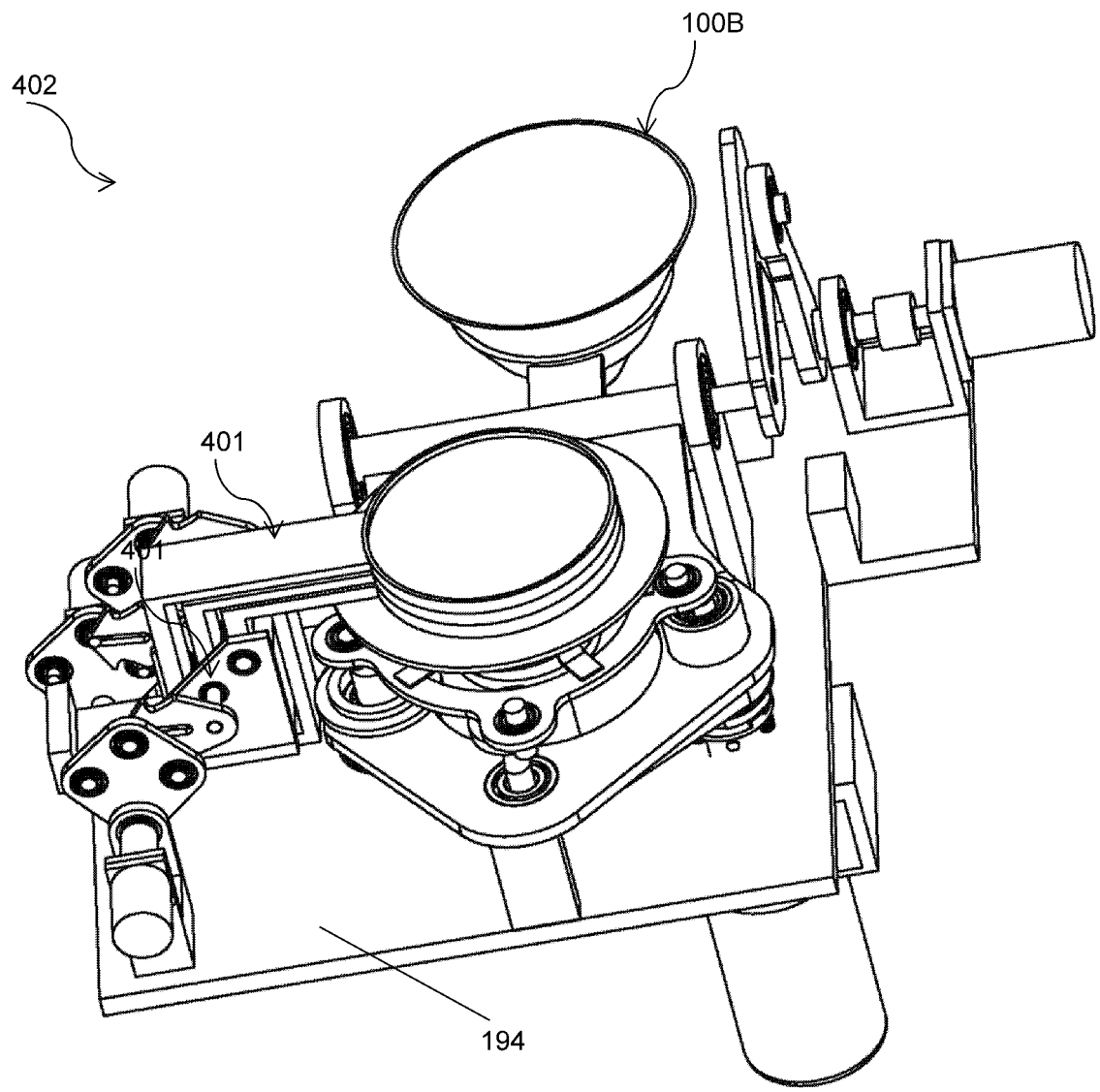
Figure 19C:
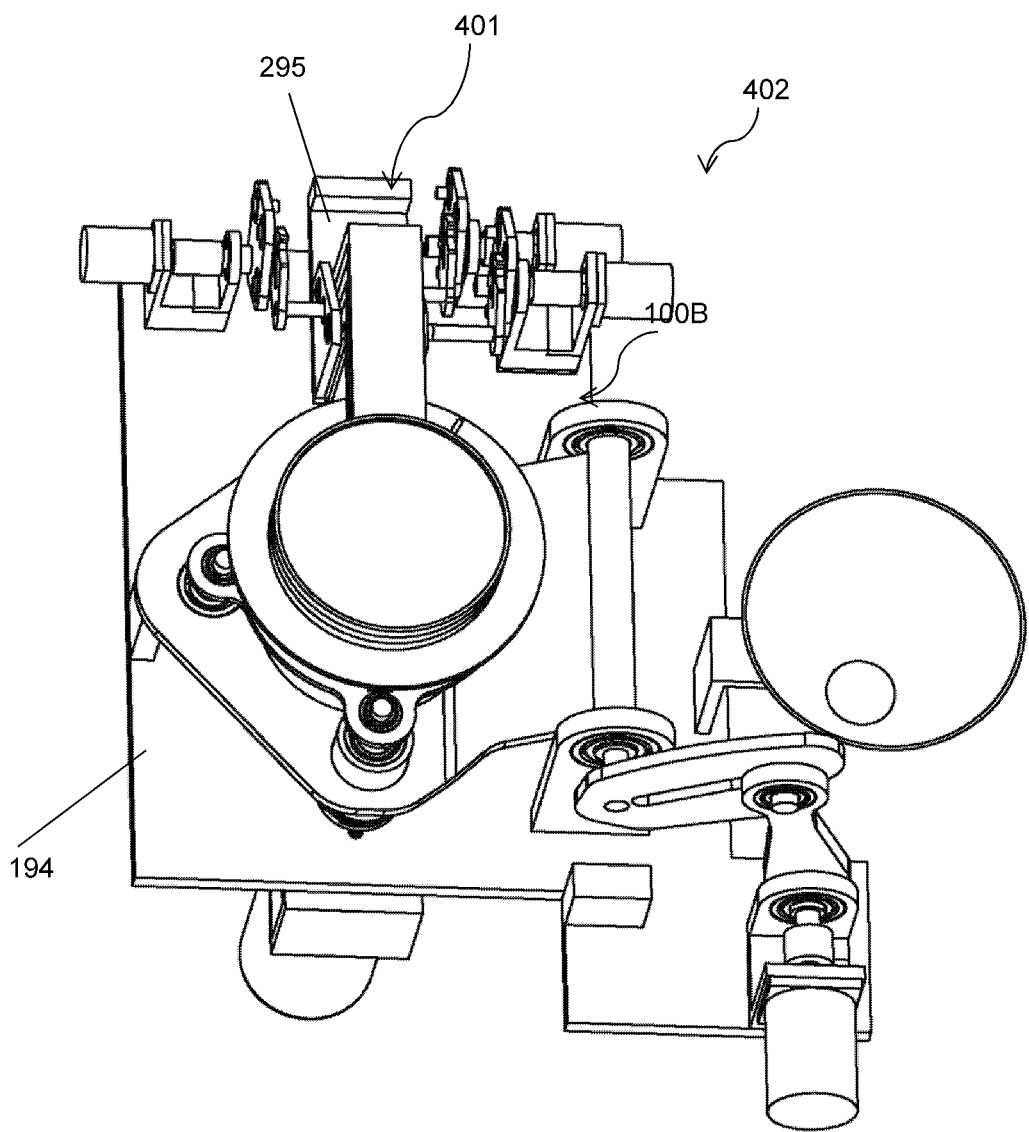

In some embodiments, referring to FIGS. 19A-19C, an automated cooking apparatus 402 comprises the sub-apparatus 100B; the lid mechanism 401; wherein the support component 194 of the sub-apparatus 100B is fixedly connected to the support component 295 (and with the support components 292) in the lid mechanism 401. As explained before, during the time-period a culinary dish is processed by the automated cooking apparatus 202, the unloading mechanism in the sub-apparatus 100B is configured to keep the support component 191 at the first end-position relative to the support component 194. The stirring motion mechanism of the sub-apparatus 100B is further configured to produce a planar motion in the cookware 101 as to stir, mix or distribute the food or food ingredients held in the cookware 101 (where the directions of the planar motions may be configured to be horizontal or nearly horizontal in many applications). The curve 102 on the top edge of the cookware 101 is configured to be a curve which substantially lies in a plane parallel to the directions of the planar motions by the stirring motion mechanism. When the blocking device 211 (together with the ring 212, shaft 216 and connector 215) is rotated by the motorized mechanism 901d to the limit position when the connector 215 touches the plate 215b, the lower surface of the blocking device 211 is also configured to be on a plane which is parallel to the directions of the planar motions produced by the stirring motion mechanism, and the cookware 101 is configured to be below the blocking device 211. Then the distance from the curve 102 to the lower surface of the blocking device 211 is kept constant (by ignoring factors such as elastic deformations and allowances in spaces and errors) when the cookware 101 is moved by the stirring motion mechanism. In particular, the blocking device 211 at the above limit position does not interfere with the cookware when the cookware is moved by the stirring motion mechanism. When the blocking device 211 is at the limit position where the connector 215 touches the plate 215b, the distance from the curve 102 to the lower surface of the blocking device 211 is configured to be substantially small, less than a millimeter, or more generally, less than two millimeters in many applications, as to help trap the food or food ingredients held in the cookware. On its part, the solid cover 221, together with the ring 222, shaft 226, connector 225, may be rotated by the motorized mechanism 901e. Also, the porous cover 231, together with the ring 232, shaft 236, connector 235, may be rotated by the motorized mechanism 901f. When the blocking device 211 is at the limit position where the connector 215 touches the plate 215b, the porous cover may be rotated to a position in which the porous cover 231, ring 232, together with the blocking device 211 may help trap the food or food ingredients held in the cookware 101. Then, the solid cover may be rotated to an open position or to a closed position in which case the solid cover, together with the rings 222, 232, 214 and blocking device 211 may trap the air inside the cookware 101

When the blocking device 211 is moved away from the limit position where the connector 215 touches the plate 215b, the blocking device 211 should stay away from the cookware 101 when the cookware 101 is moved by the stirring motion mechanism. The other parts of the lid mechanism 400 should stay away from the cookware 101 as well. Then, the lid mechanism 400 does not interfere with the cookware 101 when the cookware 101 is moved by the stirring motion mechanism.

It should be noted that the solid cover 221 and the porous cover 232 are not required to be flat. They may have a curved shape. The porous cover 232 may be substituted by a net cover. Similarly, the rings 214, 232, 222 may be of other shapes.

It should be noted that the cylindrical ring 212 in the mechanism 200 (or the cylindrical ring 213 in the mechanism 300, or the cylindrical ring 214 in the mechanism 400) may be substituted by a frame or a solid of other shape. Such a ring may be combined with the blocking device 211 and the connector 215 into a single piece. The cylindrical ring 222 in the mechanism 300 or 400, or the cylindrical ring 232 in the mechanism 400 may be substituted by a frame or a solid of other shape. The ring 222 and the connector 225 may be combined into a single part; the ring 232 and the connector 235 may be combined into a single part.

Figure 20:
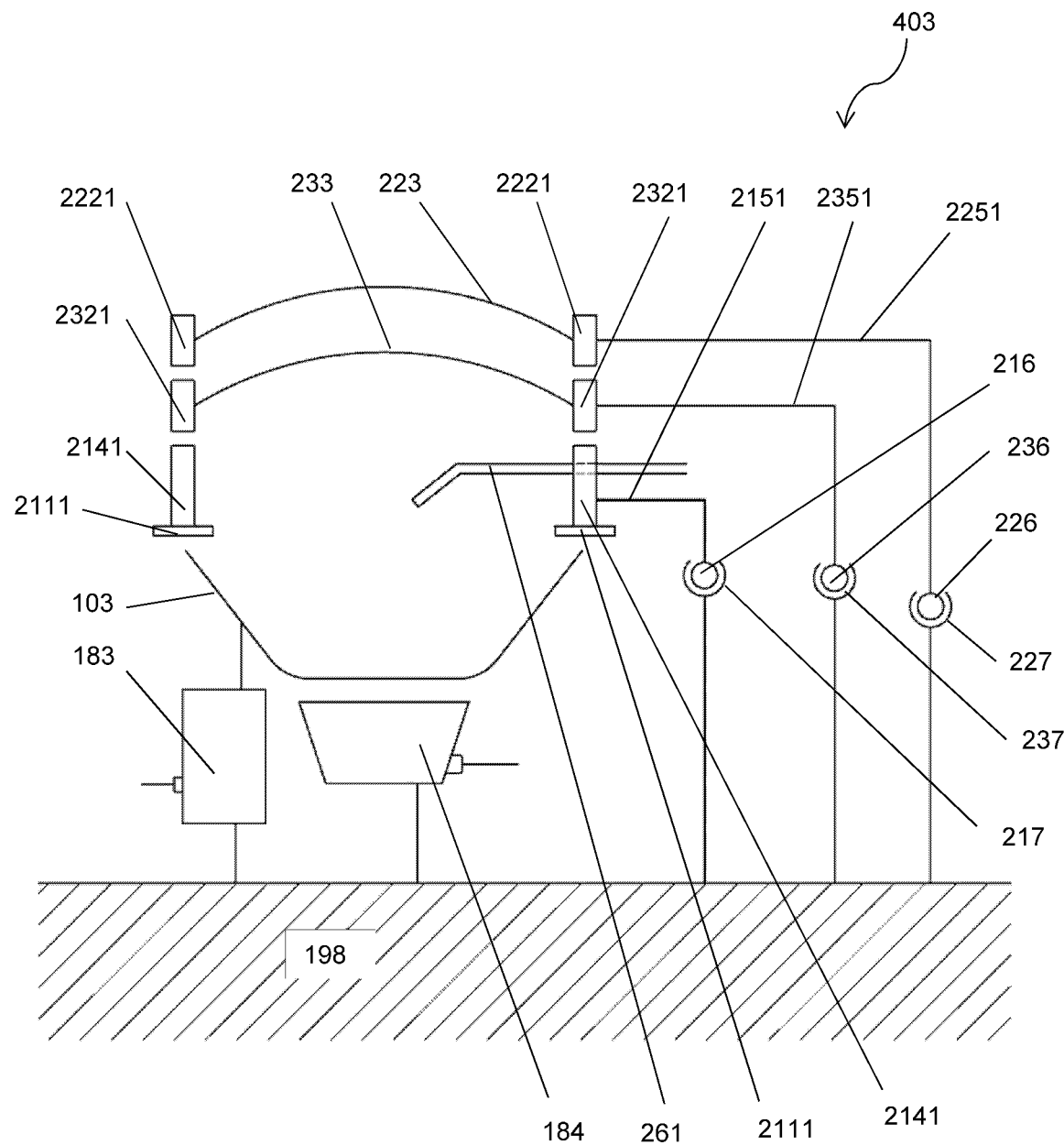
FIG. 20 shows a schematic view of an automated cooking mechanism which includes a lid mechanism.

In some embodiments, referring to FIG. 20, an automated cooking apparatus 403 comprises: a cookware 103 configured to hold food or food ingredients, a support component 198, a stirring motion mechanism 183 comprising a support component configured to be fixedly connected to the support component 198, where the stirring motion mechanism 183 is configured to move the cookware 103 relative to the support component 198 as to stir or mix or distribute the food or food ingredients held in the cookware 103; a heater 184 mounted on the support component 198 configured to heat the food or food ingredients held in the cookware 103; and a lid mechanism. The lid mechanism comprises: a blocking device 2111; a frame 2141 as a support element which is configured to be rigidly connected to the blocking device 2111; a shaft 216; a connector 2151 joining the frame 2141 with the shaft 216; a tube 261 which is inserted through the frame 2141; a frame 2321 as a support element and a porous cover 233 which is attached to the frame 2321; a shaft 236 and a connector 2351 configured to rigidly connect the shaft 236 with the frame 2321; a frame 2221 and a solid cover 223 which is attached to the frame 2221; a shaft 226 and a connector 2251 configured to rigidly connect the shaft 226 with the frame 2221; bearing housings 217, 227 and 237 which are connected to the support component 198; wherein the shaft 216 and bearing housing 217 are configured to be connected by a bearing; the shaft 226 and bearing housing 227 are configured to be connected by a bearing; the shaft 236 and bearing housing 237 are configured to be connected by a bearing. The relative motion of the shaft 216 and bearing housing 217 may be driven by a motorized mechanism. Similarly, the relative motion of the shaft 226 and bearing housing 227 (or the relative motion of the shaft 236 and bearing housing 237) may be driven by a motorized mechanism. Moreover, a computer may control the stirring motion mechanism 183, the heater 184, the motorized mechanisms and other devices (if any) in the apparatus. At a certain fixed position relative to the support component 198, the blocking device 2111 is configured to help trap the food or food ingredients held in the cookware 103 when the cookware 103 is moved by the stirring motion mechanism 183. Moreover, the blocking device 2111 is configured to not interfere with the cookware 103 when the cookware is moved by the stirring motion mechanism 183.

It should be noted that sensors may be mounted to monitor the heating, the positions of various moving parts in the above described apparatus. A computer may be used to control the motors and other devices in the above described apparatus (including but not limited to, cooking apparatus 201, 202, 301, 302, 401, 402). The sensors may send signals to the computer.

For the purpose of present patent application, if a shaft and a bearing housing are the mating parts of a rotational mechanism, then the bearing housing is referred to as a rotational mating part of the shaft. Similarly, the shaft is referred to as a rotational mating part of the bearing housing.

Figure 3A:
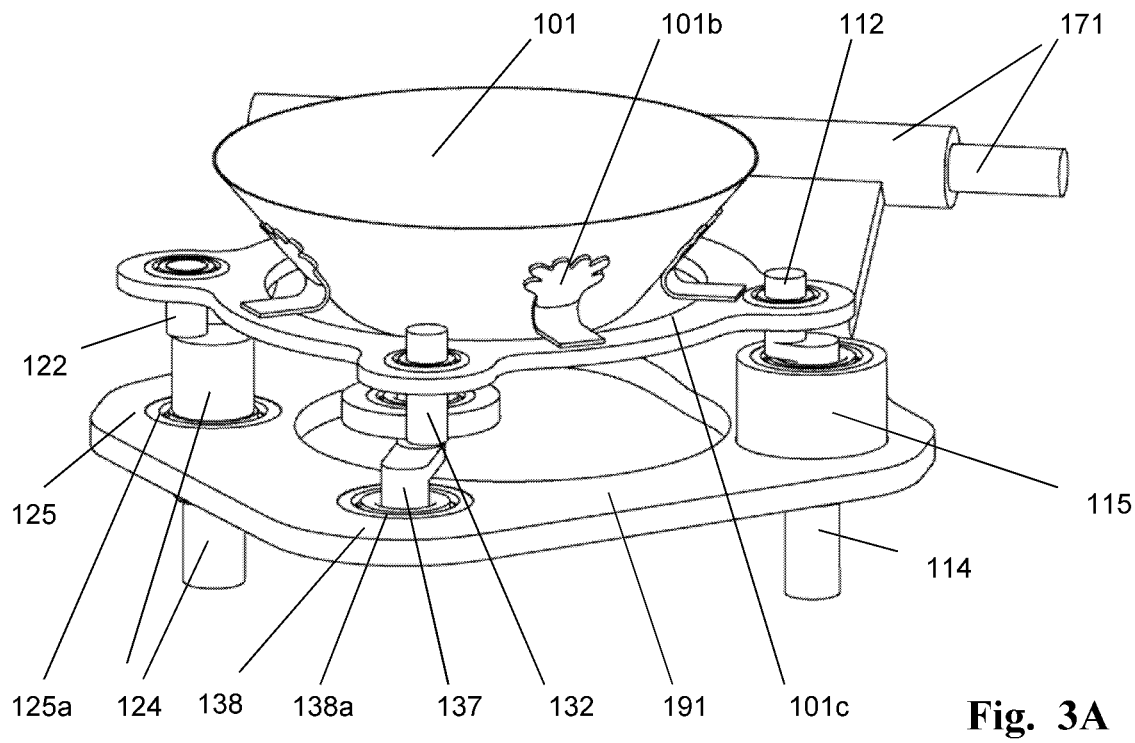
FIGS. 3A-3C show aerial views of some parts of a cooking sub-apparatus without a lid.
Figure 3B:
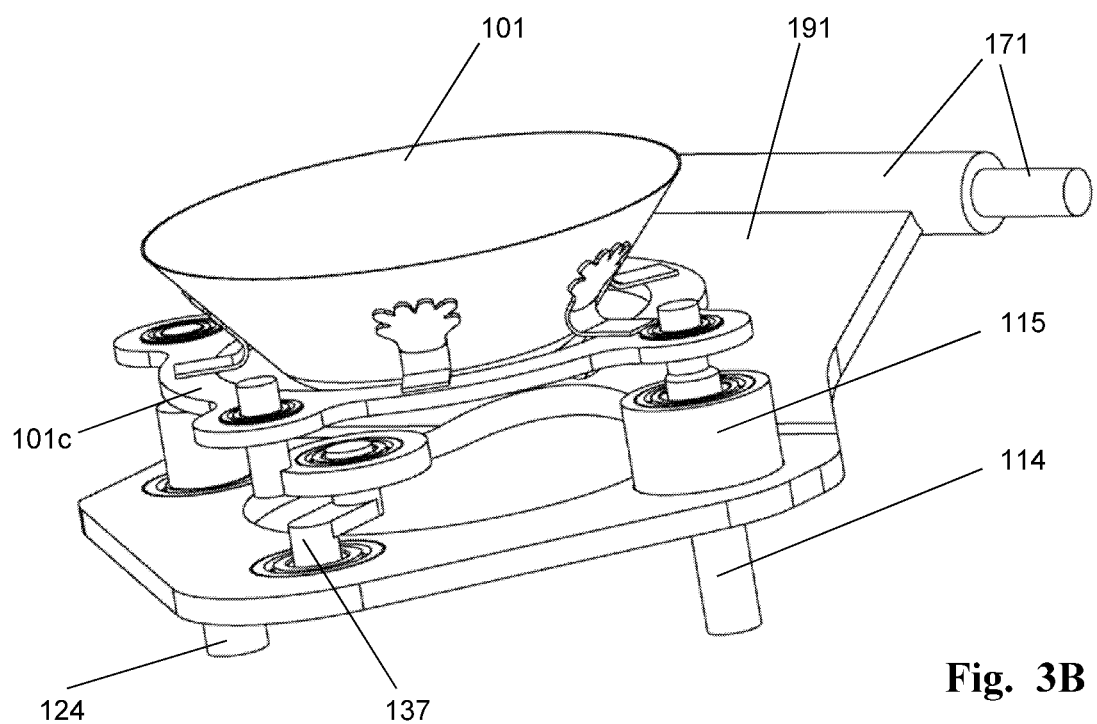
Figure 3C:
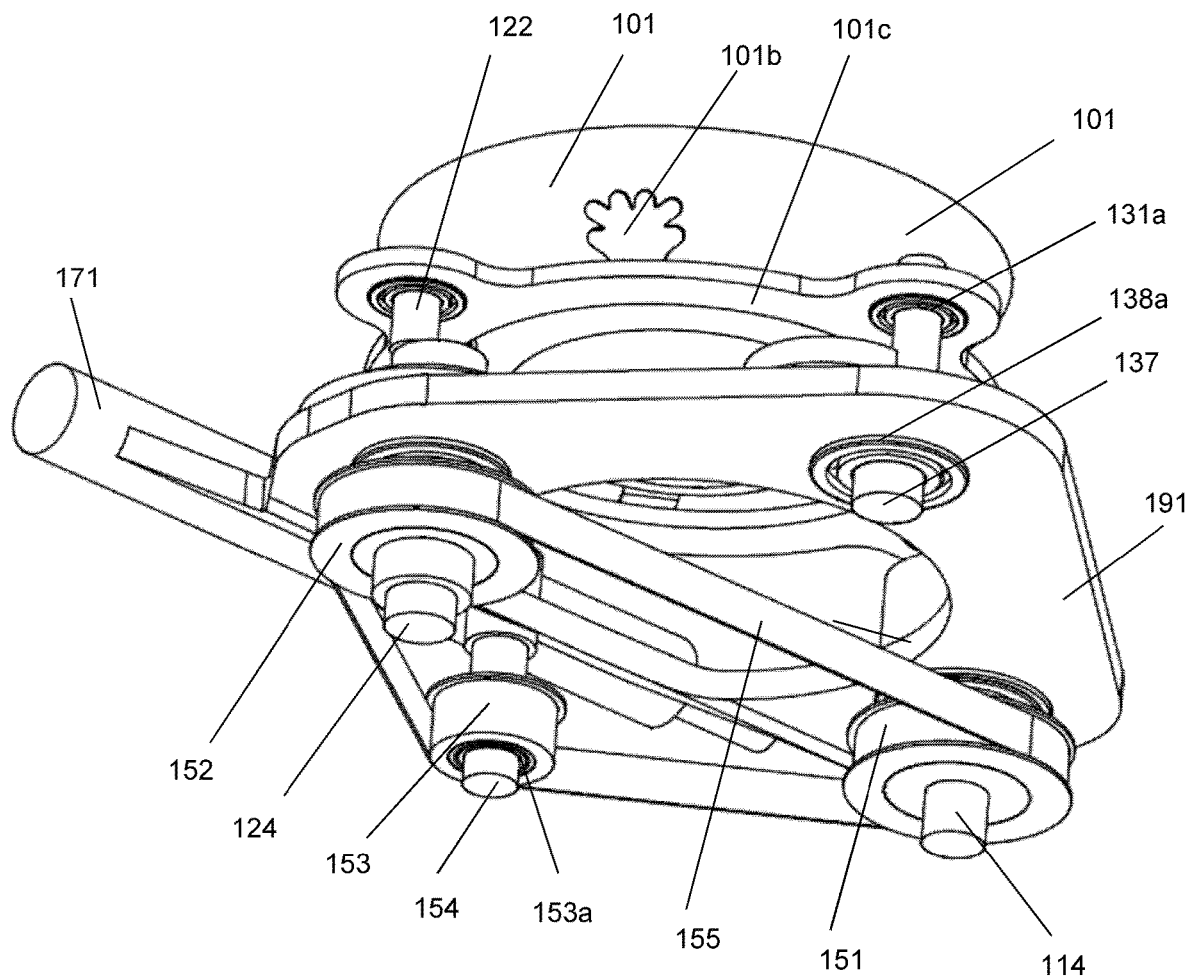
Figure 21A:
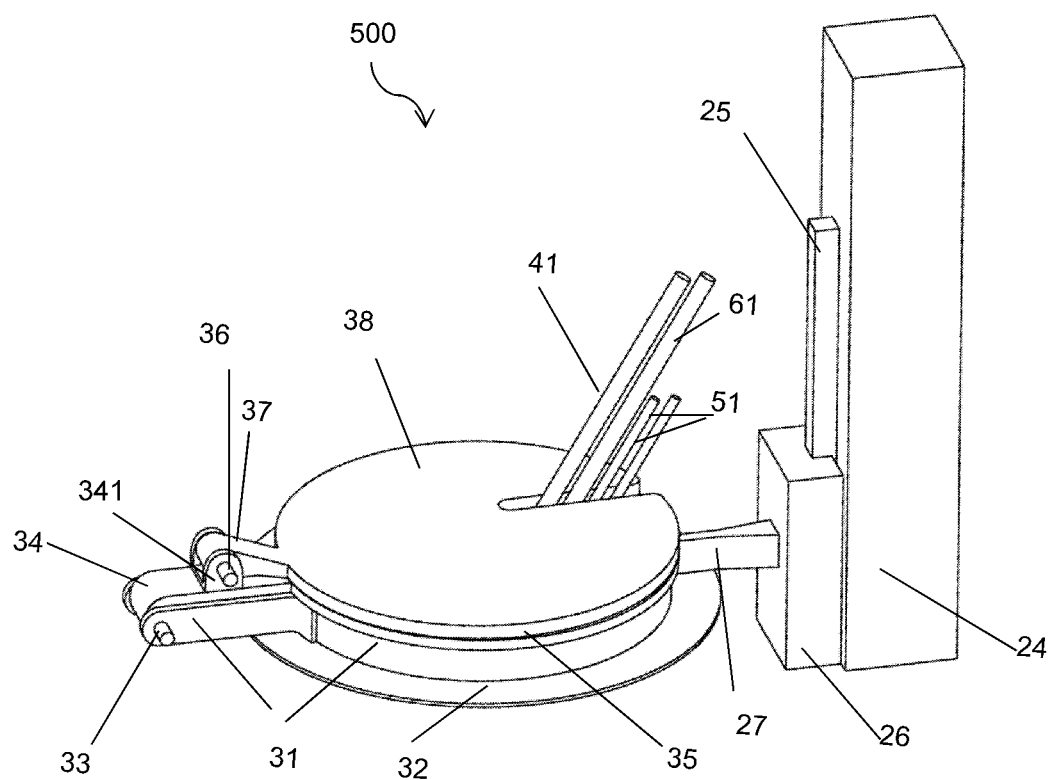
FIGS. 21A-21C show aerial views of a lid mechanism.
Figure 21B:
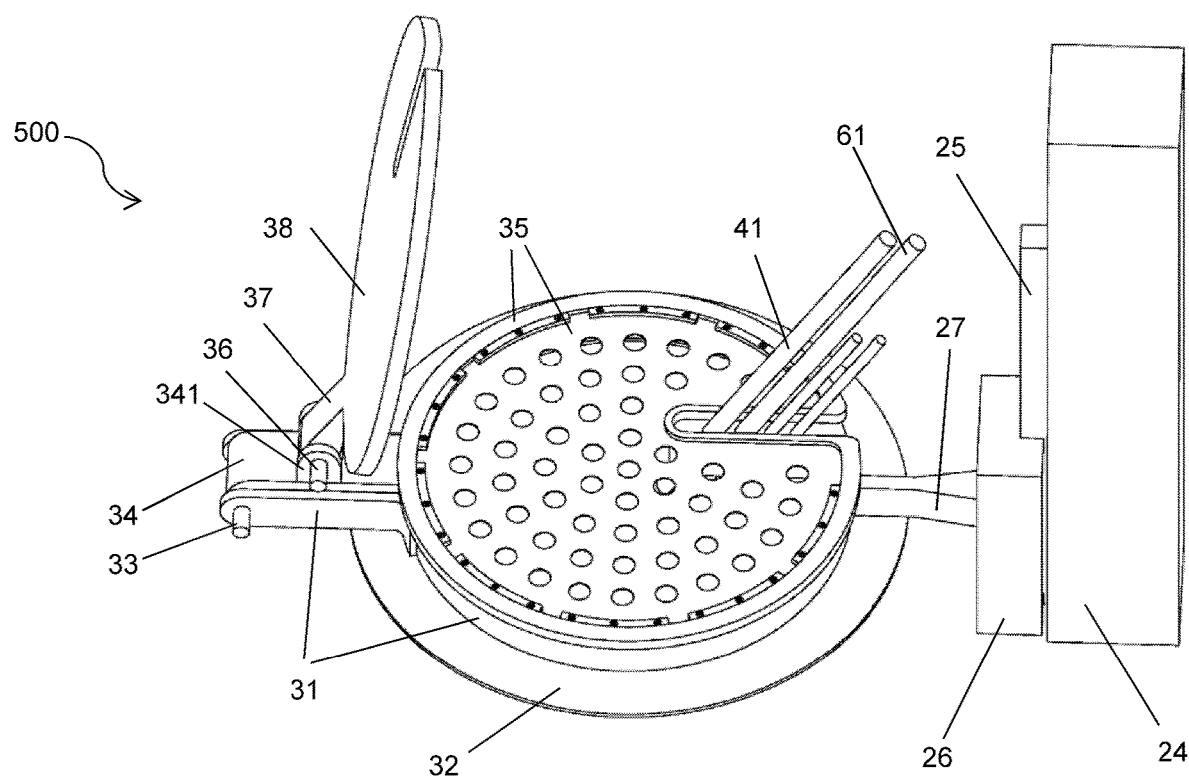
Figure 21C:
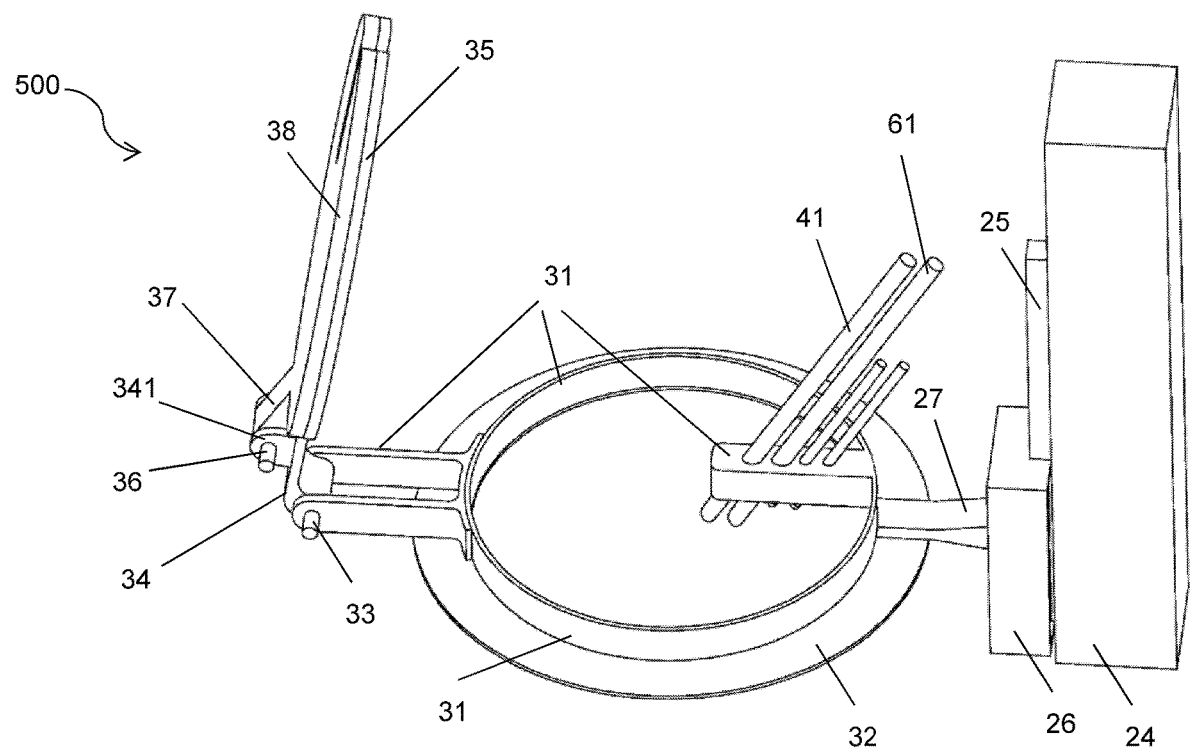
Figure 22:
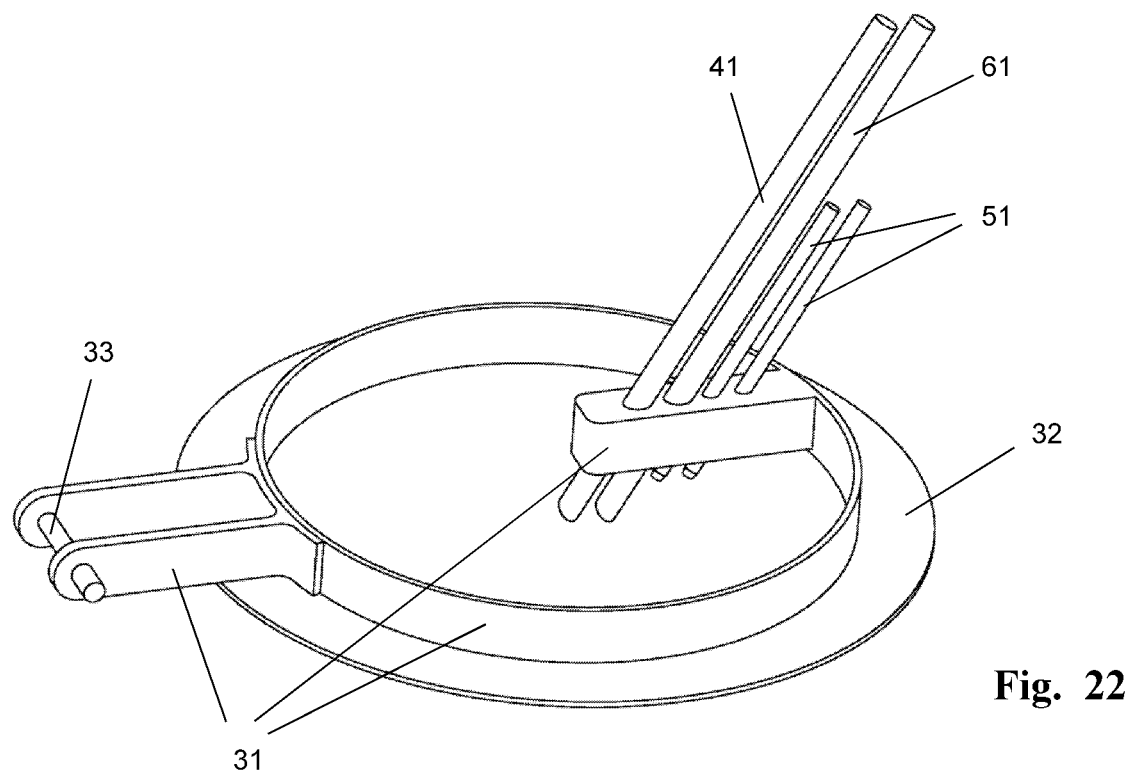
FIG. 22 shows an aerial view of a part of the lid mechanism in FIGS. 21A-21C.
Figure 23A:
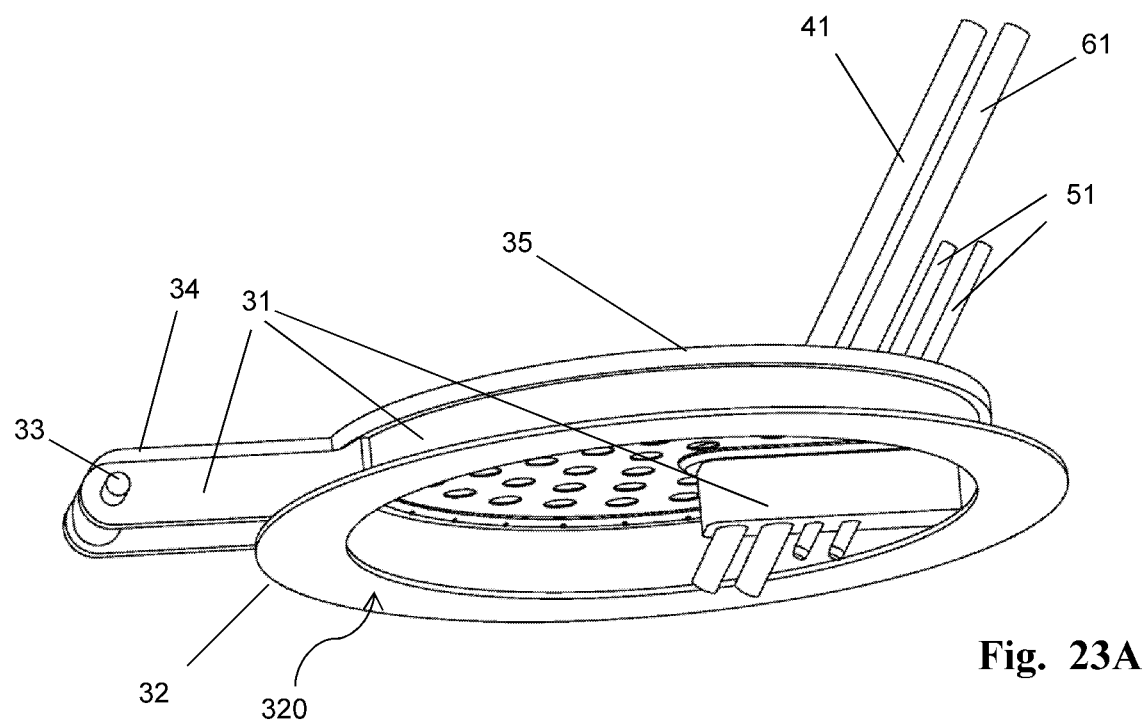
FIG. 23A shows an upward aerial view of a part of the lid mechanism in FIGS. 21A-21C.
Figure 23B:
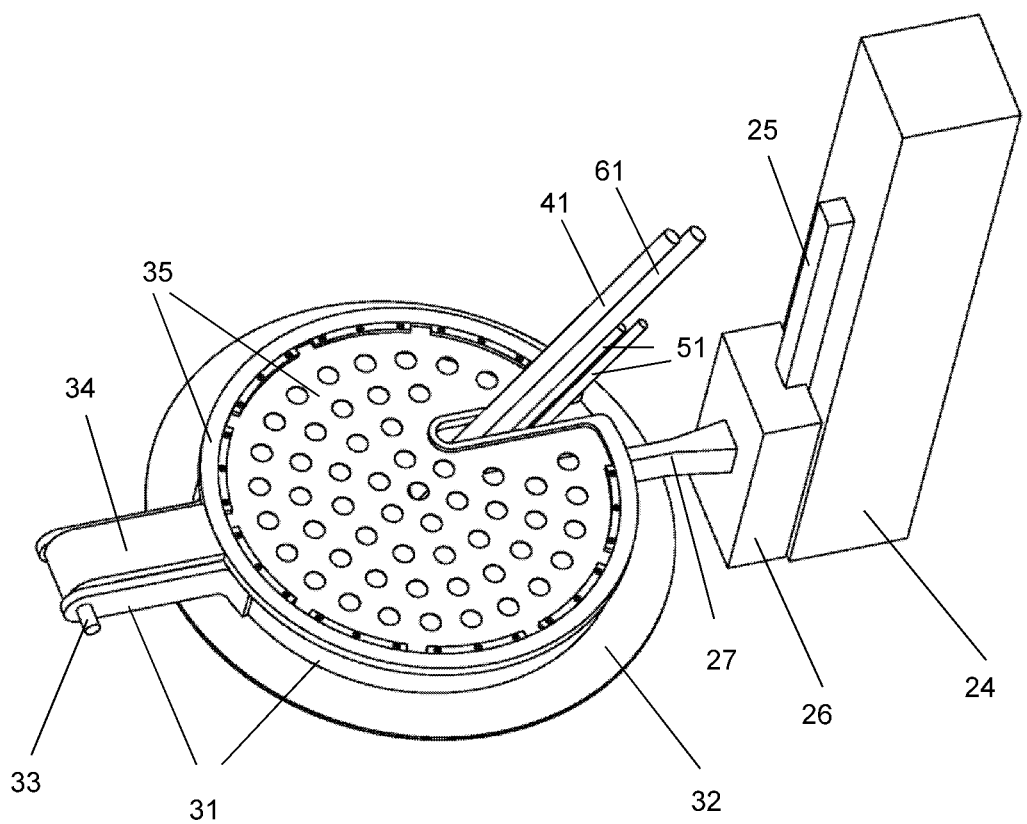
FIG. 23B shows an aerial view of the same part.

Referring to FIGS. 21A-23B, a lid mechanism 500 comprises a frame 31 as a support element, and a ring-shaped blocking device 32 which is attached below the frame 31 (FIG. 22). The blocking device 32 comprises a bottom surface 320 (FIG. 23A) which is either spherical surface or a planar surface. (In geometry, a planar surface may be considered a spherical surface with infinite radius.) The frame 31 also comprises a bearing housing which is a rotational mating part of a shaft 33; wherein the bearing housing and the shaft 33 are connected by a bearing (hidden in figure). Thus, the shaft 33 may be rotated relative to the frame 31 (FIG. 22). A porous cover 35 is joined to the shaft 33 by a connector 34 (FIGS. 23A-3B). A rotational mating part 341 of a shaft 36 is rigidly joined with the connector 34, so that the shaft 36 may be rotatable relative to the connector 34 (FIGS. 21A-21B). A solid cover 38 is joined with the shaft 36 by a connector 37. A computer controlled motorized mechanism (not shown in Figure) may drive the rotation of the shaft 33 relative to the frame 31; and another computer controlled motorized mechanism (not shown in Figure) may drive the rotation of the shaft 36 relative to the bearing housing 341 and the connector 34. An air pipe 41, a pipe for solid 61 and liquid pipes 51 are inserted through the frame 31, so that air (or solid, often in the form of powder, or liquid) may pass the frame 31 through the pipes (FIG. 21A). A motion mechanism comprises: a support component 24; a slider 26 and a linear or curved track 25, wherein the slider is configured to move along the track 25, wherein the track 25 is mounted on the support component 24; a computer controlled motorized mechanism (not shown in Figure) configured to move the slider 26 along the track 25; and a connector 27 configured to join the frame 31 with the slider 26. Thus, the motion mechanism may move the frame 31 and the blocking device 32 relative to the support component 24.

Figure 24A:
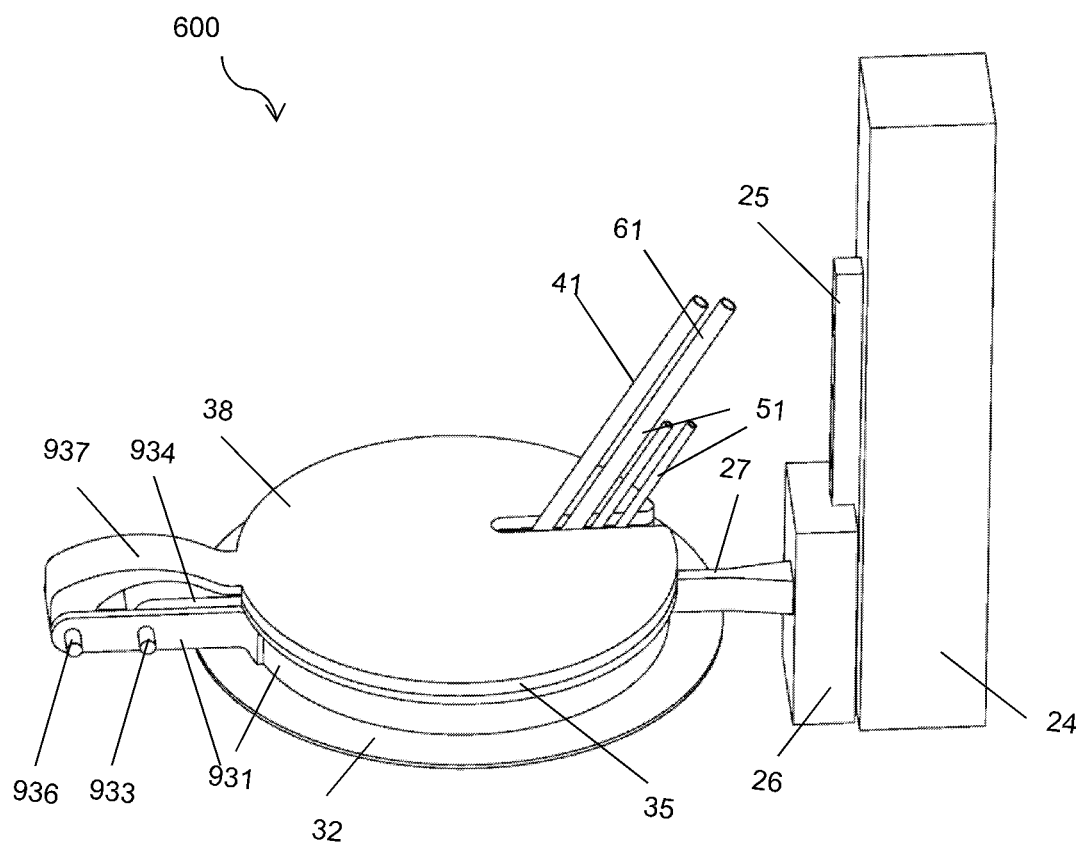
FIGS. 24A-24C show aerial views of a lid mechanism.
Figure 24B:
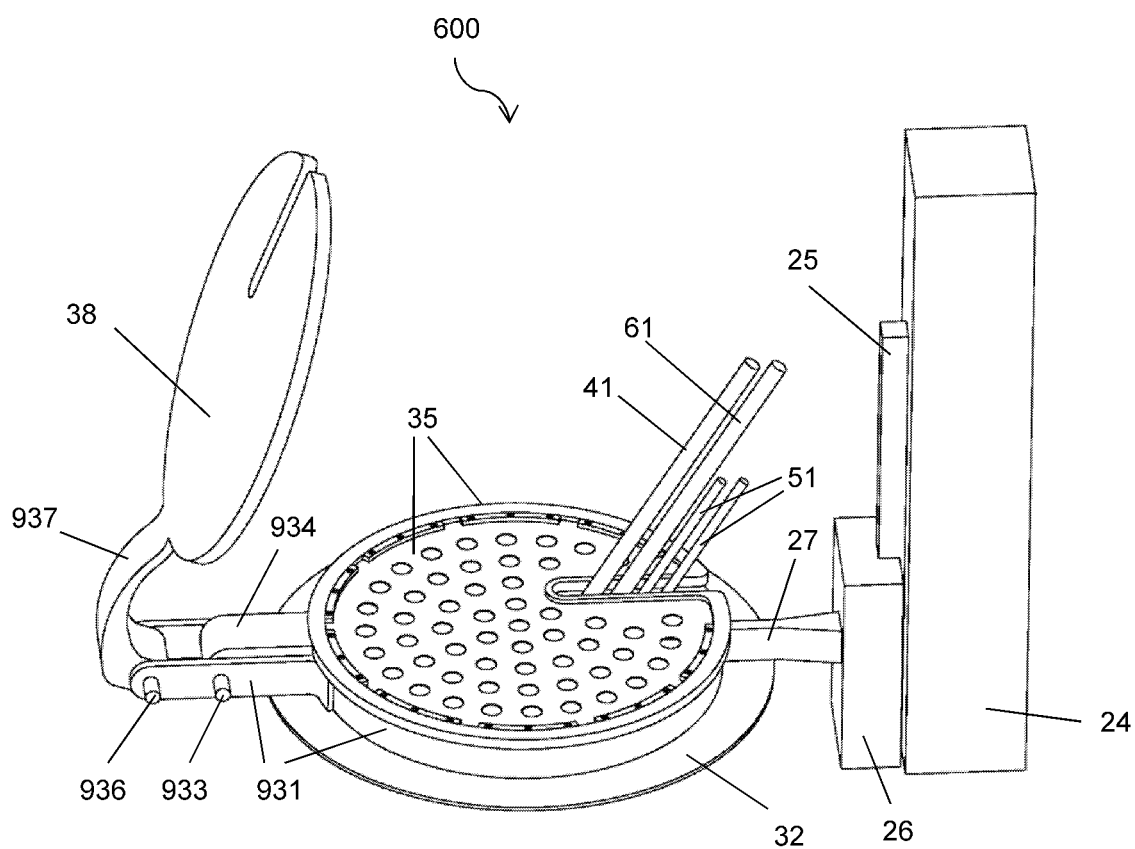
Figure 24C:
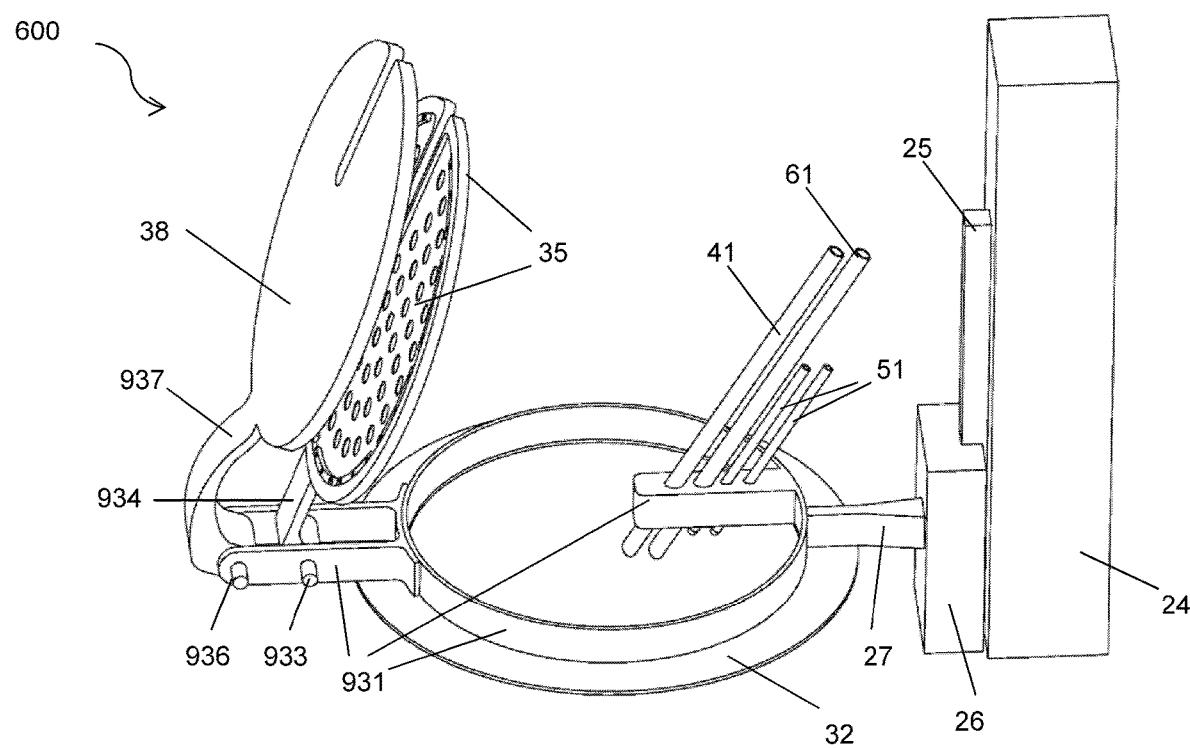

Referring to FIGS. 24A-24C, a lid mechanism 600 comprises a frame 931 as a support element, and a ring-shaped blocking device 32 which is attached below the frame 931. The blocking device 32 comprises a bottom surface. The frame 931 also comprises some rotational mating parts of two shafts 933 and 936, so that each of the shafts 933 and 936 may be rotated relative to the frame 931 around the axis of the shaft. A porous cover 35 is joined to the shaft 933 by a connector 934. A solid cover 38 is joined with the shaft 936 by a connector 937. A computer controlled motorized mechanism (not shown in Figure) is configured to drive the rotation of the shaft 933 relative to the frame 931; and another computer controlled motorized mechanism (not shown in Figure) may drive the rotation of the shaft 936 relative the frame 931. An air pipe 41, a powder pipe 61 and liquid pipes 51 are mounted through the frame 931, so that air (or powder or liquid) may pass through the lid mechanism from top to down when the covers 35 and 38 are both in closed position (FIG. 24A). A motion mechanism comprises: a support component 24; a slider 26 and a linear or curved track 25, wherein the slider is configured to move along the track 25, wherein the track 25 is mounted on the support component 24; a computer controlled motorized mechanism (not shown in Figure) configured to move the slider 26 along the track 25; and a connector 27 configured to join the frame 931 with the slider 26. Thus, the motion mechanism may move the frame 931 and the blocking device 32 relative to the support component 24.

It should be noted that the lid mechanism 600 is similar to the lid mechanism 500, except that the solid cover 38 is mounted on a different part.

It should be noted that the sliding pair with mating parts 25 and 26 in lid mechanism 500 or 600 may be replaced by a kinetic pair of other type. The motion of 25 relative to 26 may be implemented by the traditional techniques. For example, the pair 25 and 26 may be replaced by two mating parts in a rotational mechanism in which the two mating parts are constrained to rotate relative to each other around an axis (e.g., a shaft and a bearing housing); and the relative rotation may be driven by a computer controlled motor. In this case, the motion mechanism moves the frame 31 or respectively 931 and the blocking device 32 by a rotation along an axis.

It should be noted that the cover 35 or 38 in the lid mechanism 500 and 600 are not required to be in flat shape. They can have spherical, oval or other shapes. It should also be noted that the cover 35 or 38 in the lid mechanism 500 and 600 may be moved by other type of motion mechanism, such as a motion mechanism which produces linear movement in the cover.

It should also be noted that the slider 26 in the apparatus 500 (or 600) may be positioned nearer to the shafts 33 and 36 (or respectively, 933 and 936).

For the purpose of present patent application, a sphere is a spherical surface, and the solid which is bounded by a spherical surface is called a ball.

Figure 25A:
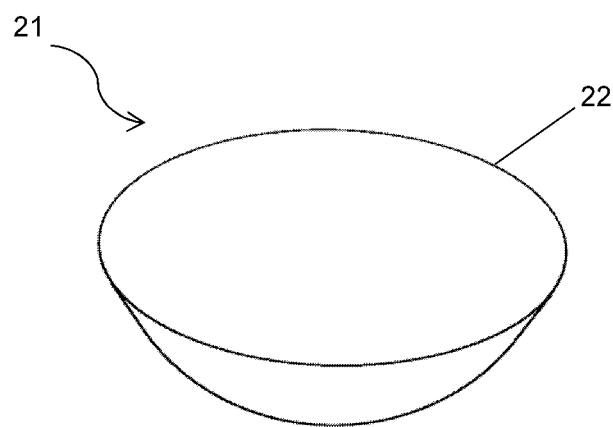
FIG. 25A shows a cookware.

Referring to FIG. 25A, a cookware 21 comprises a closed curve 22 on its top edge. The closed curve 22 is configured to be a circular curve. In particular, it is contained in a sphere.

Figure 25B:
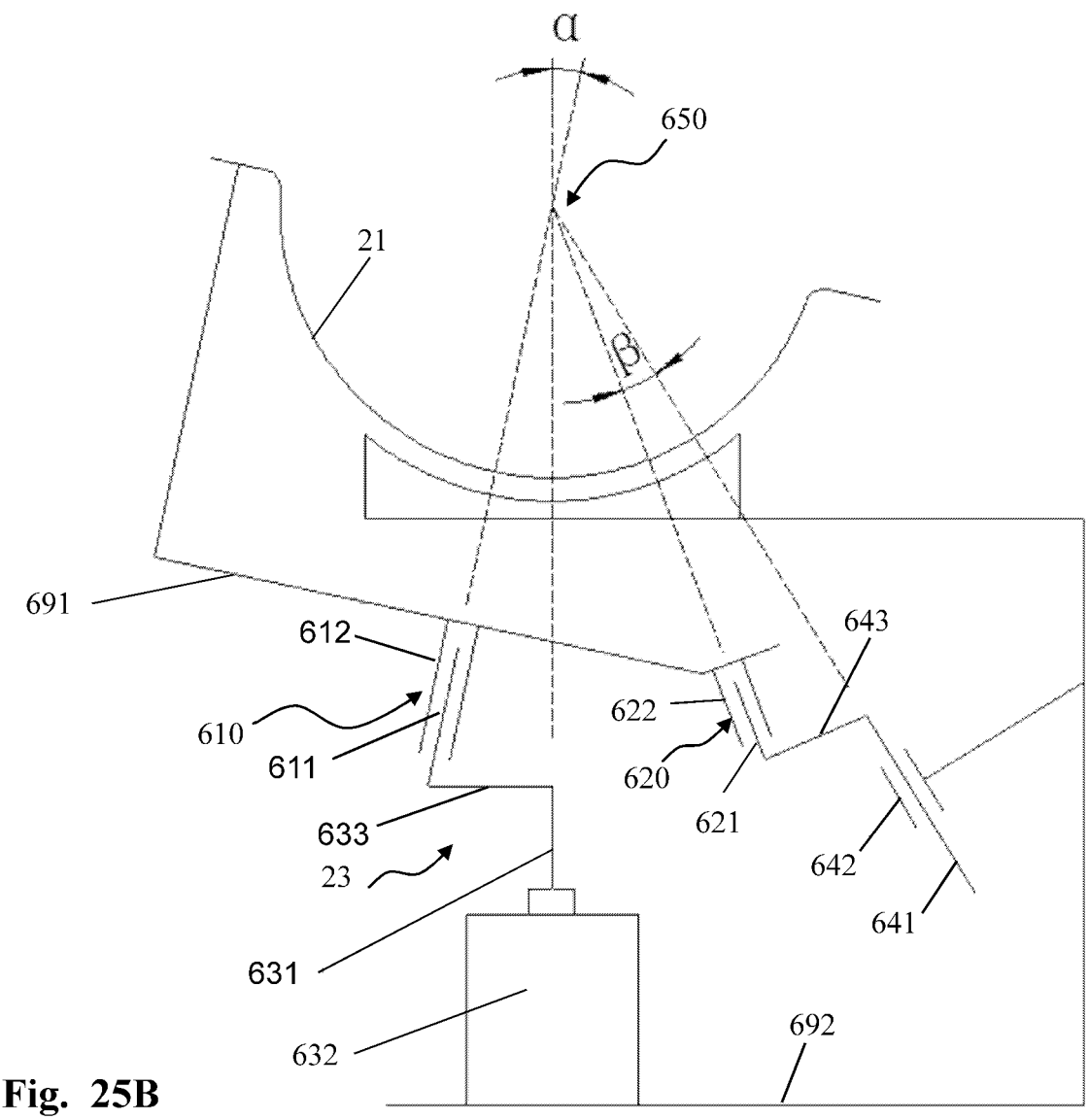
FIG. 25B shows a schematic view of a cookware and a stirring motion mechanism which produces a spherical motion in the cookware.

Referring to FIG. 25B, a stirring motion mechanism 23 comprises: (1) a first rotational mechanism 610 comprising a first shaft 611 and a bearing housing 612 as mating parts, wherein the bearing housing 612 is rigidly connected to the cookware 21 by a rigid connector 691; (2) a support component 692; (3) a shaft 631 configured to be rotatable relative to the support component 692 around the axis of the shaft 631; (4) a motorized mechanism 632 configured to produce a rotation of the shaft 611 relative to the support component 692 around the axis of the shaft 611; (5) a rigid connector 633 joining the shaft 631 and the shaft 611; (6) a rotational mechanism 620 comprising a shaft 621 and a bearing housing 622 as mating parts, wherein the bearing housing is rigidly connected to the cookware 21 by the connector 691; (7) a rotational mechanism comprising a shaft 641 and a bearing housing 642 as mating parts; (8) a rigid connector 643 joining the shafts 621 and 641. The bearing housing 642 is rigidly connected to the support component 692. The motorized mechanism 632 can produce a rotational movement in the shaft 611 around the axis of the shaft 631. The axes of the shafts 611, 621, 631, 641 are configured to intersect at a point 650, where the point 650 is fixed relative to the support component 692. The point 650 is referred to as the center point for the stirring motion mechanism 23. The edge 22 of the cookware 21 is configured to be contained in a sphere centered at the point 650. The angle α between the axes of the shafts 611 and 631 is configured to be smaller than the angle β between the axes of the shafts 621 and 641. The angle α between the axes of the shafts 611 and 631 is positive (i.e., nonzero), and thus the axes of the shafts 611 and 631 never coincide. The shaft 631 can rotate continuously in one direction but the shaft 641 must rotate back and forth by less than 180 degrees. A stove 607 lies right below the cookware 23 and is fixed on the support component 692. The angle between the axes of the shafts 611 and 631 is designed to be properly small. Then the cookware as a whole is displayed by a small distance and by a small inclination change. On the other hand, the rotation speed of the motor 632 can be properly large, as to produce a properly large acceleration in the movement of any point on the internal surface of the cookware. As the motorized mechanism 632 rotates the shaft 631 around the axis of the shaft 631, the cookware 23 is moved. The trajectory of every point of the cookware 23 is contained in a sphere centered at the point 650. In other words, the stirring motion mechanism produces a spherical motion in the cookware 23. Moreover, the ridge 22 of the cookware 23 is configured to be contained in a sphere centered at the point 650.

Since the shaft 631 is rotatable relative to the support component 692, the stirring motion mechanism 23 includes a second rotational mechanism which comprises the second shaft 631 and the support component 692 as mating parts.

In the stirring motion mechanism 23, the rotational mechanism 620 may also be considered as a first rotational mechanism; and the rotational mechanism comprising a shaft 641 and a bearing housing 642 as mating parts may be considered as a second rotational mechanism. Clearly, the axes of rotations of the two rotational mechanisms make a nonzero angle.

The support component 692 is referred to as the support component of the stirring motion mechanism 23. The stirring motion mechanism 23 produces a spherical motion in the cookware 21 relative to the support component 692. The trajectory of each point in the cookware 21 in the motion produced by the stirring motion mechanism 23 is a sphere centered at the point 650. The distance from a point of the cookware 21 to the center point 650 is invariant when the point is moved by the stirring motion mechanism 23.

It should be noted that the spheres centered at the point 650 are invariant surfaces of the stirring motion mechanism 23.

Figure 26A:
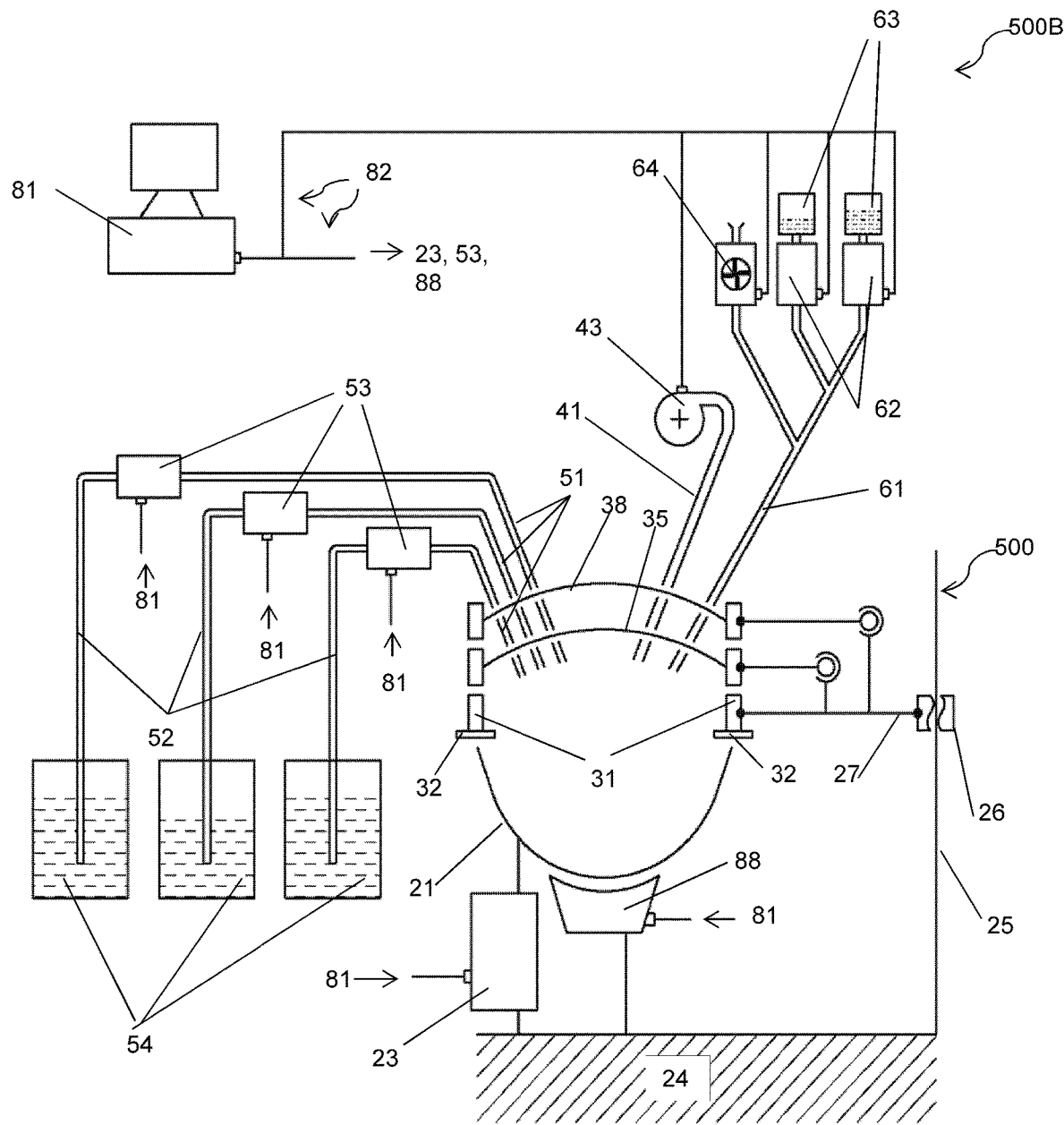
FIG. 26A shows a schematic view of an automated cooking apparatus with an automated lid mechanism.
Figure 26B:
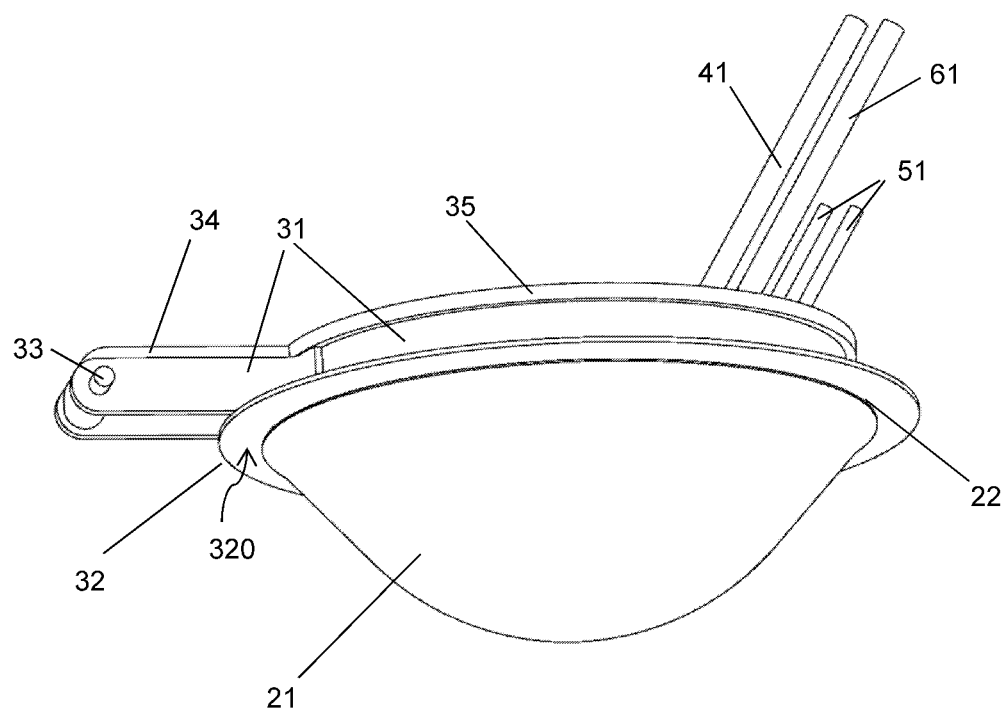
FIG. 26B shows an upward aerial view of a cookware and a part of a lid mechanism.

Referring to FIGS. 26A-26B, an automated cooking apparatus 500B comprises: a support component 24; a cookware 21; the lid mechanism 500; a stirring motion mechanism 23 which produces a spherical motion in the cookware 21 as to stir or mix or distribute the food ingredients held in the cookware 21; and a computer 81. The support component of the stirring motion mechanism 23 is configured to be fixed relative to the support component 24 in the lid mechanism 500 during a cooking process. The blocking device 32 may be moved up or down relative to the support component of the stirring motion mechanism 23, between two end-points; wherein the lower end-point is referred to as a first end-point for the position of the blocking device 32, and the higher end-point is referred to as a second end-point. When the blocking device is at the first end-point relative to the support component of the stirring motion mechanism 23, the closed curve 22 of the cookware 21 lies below the bottom surface of the blocking device 32 of the lid mechanism 500 (FIG. 26B). At this relative position, the bottom surface 320 of the blocking device 32 is configured to be a sub-surface of a sphere centered at the center point 650 of the stirring motion mechanism 23. As explained earlier, the ridge 22 of the cookware is contained in a sphere centered at the center point 650 of the stirring motion mechanism 23. As the stirring motion mechanism 23 produces a spherical motion in the cookware 21, the trajectory of each point is in a sphere centered at the point 650. Thus, the points on the ridge 22 is contained in the same sphere centered at the point 650, when the cookware 21 is moved by the stirring motion mechanism. Therefore, the distance from any point of the ridge 22 of the cookware 21 to the bottom surface 320 of the blocking device 32 is a constant, say D, even if the cookware 21 is actively moved by the stirring motion mechanism 23. The constant D is configured to be substantially small when the cookware is moved by the stirring motion mechanism. Some liquid dispenser mechanisms 53 may dispense liquid ingredients contained in the liquid containers 54, through the liquid pipes 51 and 52; where a liquid dispenser may include a shutoff valve and/or a pump such as, a peristaltic pump. An air pump 43 may pump in or pump out the air through the pipe 41. Some solid dispenser mechanisms 62 may dispense solid ingredients (usually in dry powder form) from containers 63, through the pipes 61. An air pump 64 may pump heated air into the pipe 61, as to prevent moisture flowing into and condensing inside the pipe 61. The computer 81, through the wires 82, may control the stirring motion mechanism 23, the liquid dispenser mechanisms 53, air pumps 43 and 64, solid dispenser mechanisms 62, motors or other devices in the lid mechanism 500. An induction heater 88 is configured to be connected to the support component 24 by a connector. The coils of the induction heater 88 are configured to be placed within a relatively small distance from the exterior surface of the cookware 21; and a certain dynamically changing electric current is designed to pass through the coils as to produce a dynamically changing magnetic field near the cookware 21. The cookware 21 may be partially or entirely made of ferromagnetic material (such as iron). The computer 81 is also configured to control the timing, power output of the heater 88, or the measured temperatures at certain locations of the cookware 21.

When the blocking device 32 is at the first end-position relative to the support component of the stirring motion mechanism 23, the distance D between the edge 22 of the cooking container 21 and lower surface 320 of the blocking device 32 is configured to be small, as explained above. Theoretically, this distance can be arbitrarily small. The distance is only needed to make room for elastic and other deformations, and allowances in spaces and errors. Thus, the distance p need not be more than the sum of the following quantities: (a) the maximal effect caused by the elastic or other non-rigid deformation of the cooking container 21; (b) the maximal effect caused by the elastic or other non-rigid deformation of the blocking device 32; (c) the allowances in spaces and errors. In our applications, the sum of these quantities may be configured to be less than two millimeters, and thus the distance D is configured to be less than one millimeter in most of our applications, and no more two millimeters in any case. This can be achieved by controlling the rigidity and accuracy of the parts in the manufacturing process and the installation and assembly.

The stirring motion mechanism 23 are configured to produce spherical motions, and the closed curve 22 of the cookware 21 and the bottom surface of the blocking device 32 may substantially lie in concentric spheres which are invariant surfaces of the stirring motion mechanism 23, and the concentric spheres are substantially close to each other.

The stirring motion mechanism 23 produces motions in the cookware 21 so that each point of the cookware 21 is only displaced by a small distance from its original position. The acceleration vector of a point of the cookware can be large and the direction of velocity vector of the point may rotate fast. The trajectories of the points of the cookware are never concentric circles.

The coils of the induction heater 88 may be placed near an invariant surface of the stirring motion mechanism 23, and the exterior surface of the cookware 21 may contain a sub-surface which is contained in or near an invariant surface of the stirring motion mechanism 23. Of particular mention is the case when the invariant surfaces of the stirring motion mechanism 23 are concentric spheres. The coils of the induction heater may be placed near a sphere; and the exterior surface of 21 may contain a spherical area, which is close to the coils.

It should be noted that the induction heater 88 may be substituted by other types of heaters using electricity, or a heater using gas or fuel, etc. In fact, the heater 88 may be substituted by a heater which is connected to the cookware, so it may be moved together with the cookware by the stirring motion mechanism 23.

It should be noted that in the automated cooking apparatus 500B, the lid mechanism 500 may be substituted by the lid mechanism 600, or other lid mechanism with the same blocking device. It should be further noted that the blocking device 32 may be a solid in the shape of a flat or curved board, or of other shape.

It should be noted that the air pump 43 may include automated shut-off valve. In some applications, the air pump 43 may be substituted by a shut-off valve. In some applications, two (or more) air pipes 41 and two (or more) corresponding air pumps 43 are needed: through a first air pipe for air to go into the inside of the cookware, through a second air pipe for the air to go out.

Figure 27A:
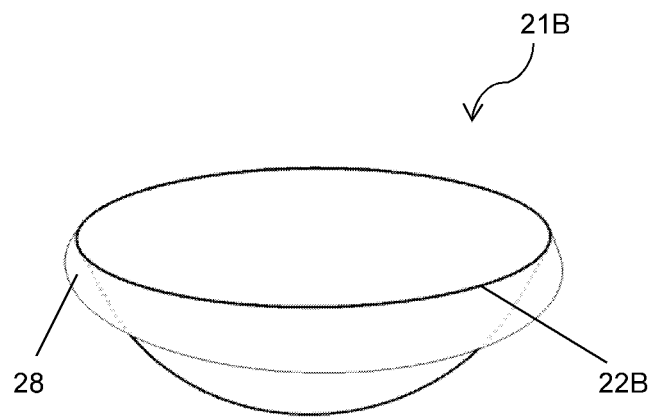
FIG. 27A-27B show aerial views of two different types of cookware.

Referring to FIG. 27A, a cookware 21B has a brim 28 near its edge and a ridge 22B, in contrast to the cookware 21 in which the ridge 22 is at the very edge of the container. In the cooking apparatus 203, 403, or 500B, the cookware (103 or 21) may be substituted by the cookware 21B, under the condition that the distance from (any point of) the ridge 22B to the bottom surface of the blocking device (2111 or 32) is substantially small when the cookware is moved by the stirring motion mechanism 23, if the blocking device (2111 or 32) is at an end-position relative to the support component of the stirring motion mechanism of the respective cooking apparatus.

Figure 27B:
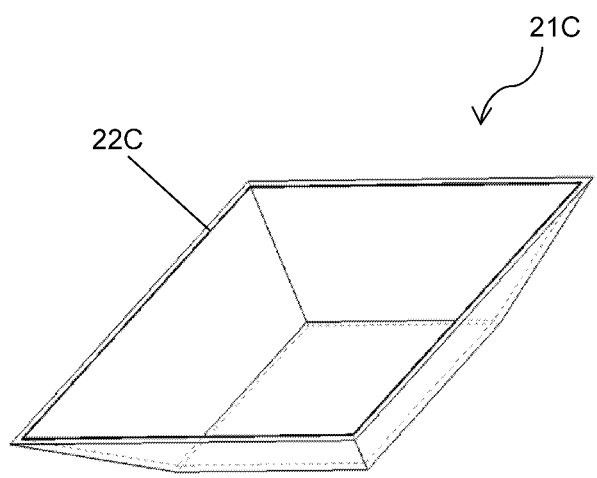

Referring to FIG. 27B, a cookware 21C comprises a ridge 22C on top, of rectangular shape.

Figure 28A:
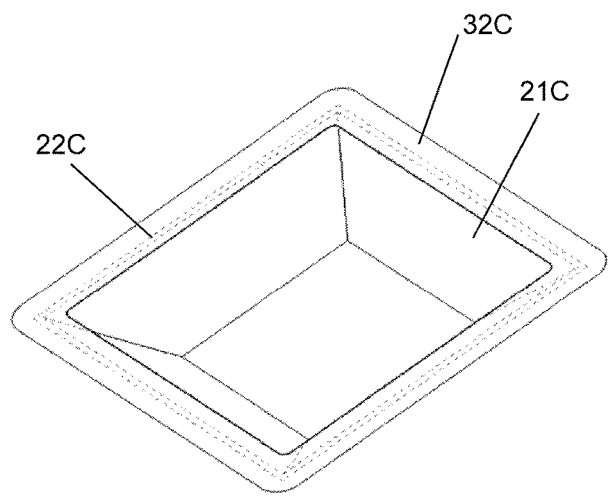
FIG. 28A shows an aerial view of a cookware with a ridge of rectangular shape, and a rectangular ring-shaped blocking device.
Figure 28B:
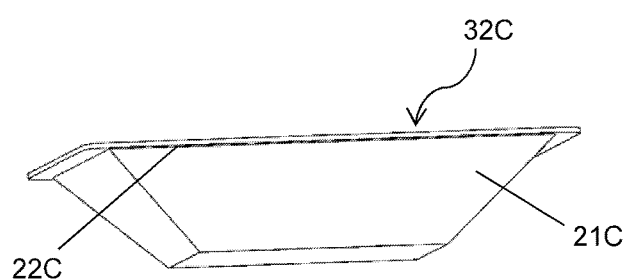
FIG. 28B shows an upward aerial view of the same cookware and rectangular shaped blocking device.
Figure 28C:
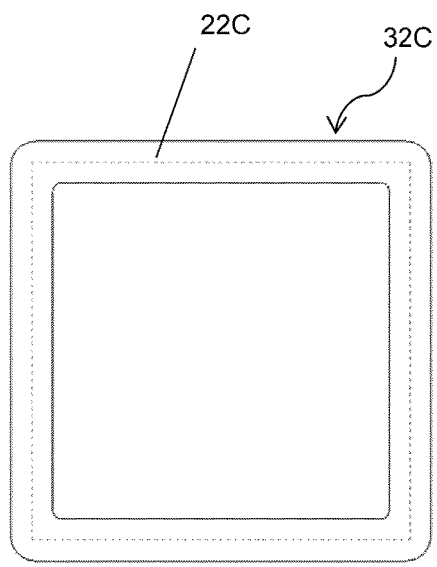
FIG. 28C shows a plane view of the ridge and the rectangular ring-shaped blocking device.
Figure 29:
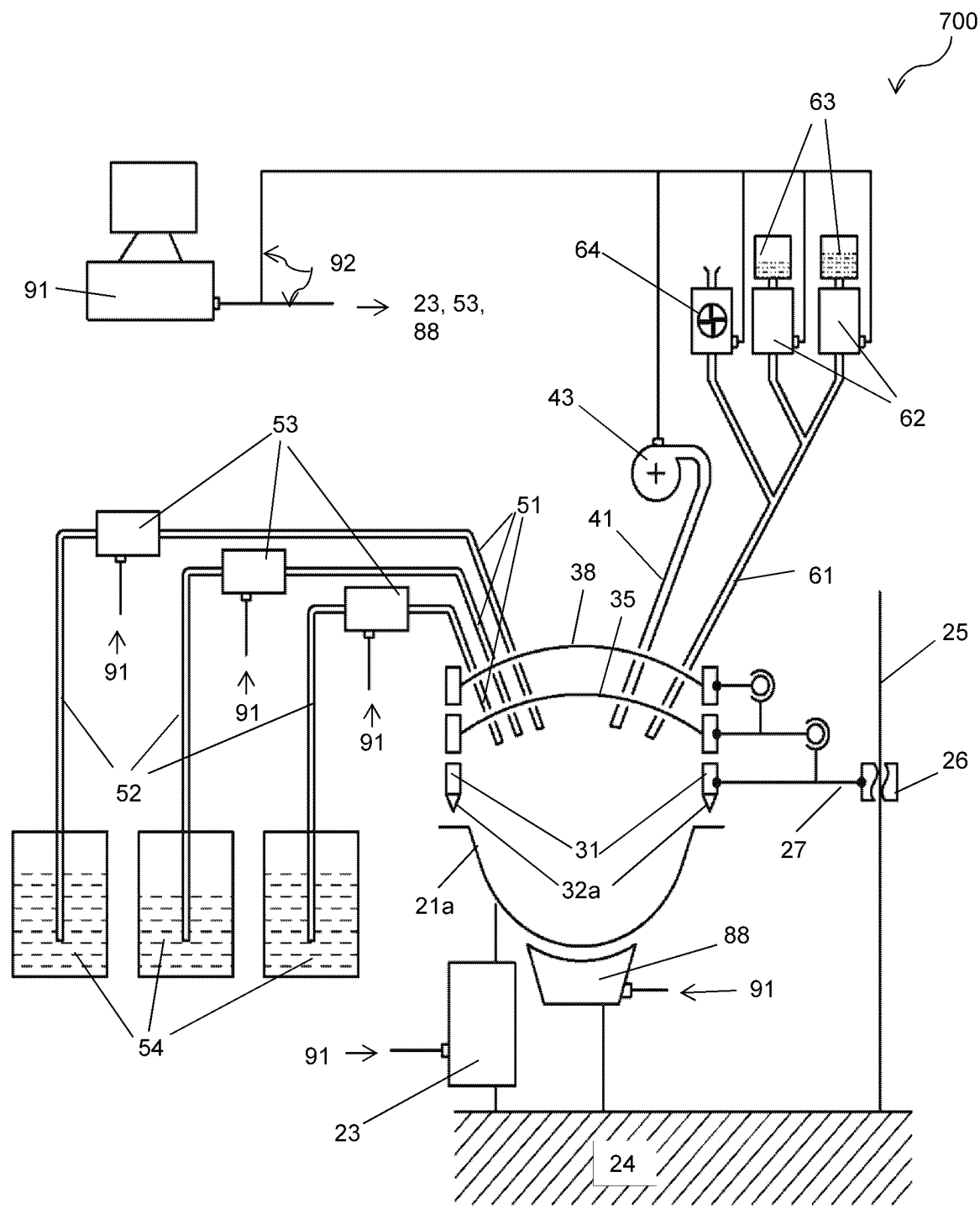
FIG. 29 shows a schematic view of an automated cooking apparatus in which a cookware has a top surface of spherical shape.

Referring to FIGS. 28A-28C, the cookware 21C comprises a top ridge 22C in the shape of a rectangle. A blocking device 32C comprises a lower surface in the shape of a rectangular ring. At a certain relative position, the top ridge 22C of the cookware 21C may be substantially close to the lower surface of the blocking device 32C.

In the apparatus 203, 403, or 500B, etc., the cookware (103 or 21) may be substituted by the cookware 21C and the blocking device (2111 or 32) substituted by a blocking device 32C. The distance from (any point of) the ridge 22C of the cookware 21C to the bottom surface of the blocking device is configured to be substantially small when the cookware is moved by the stirring motion mechanism of the respective cooking apparatus, if the blocking device is at a certain fixed position relative to the support component of the stirring motion mechanism.

It should be further noted that the ridge 22 is a closed curve on the surface of the cookware. In the present patent application, the cookware is a solid and therefore has a surface. We note that the surface of a solid (as the solid occupies a "three-dimensional region") is usually called "boundary surface (of the "three-dimensional region)" in mathematical terms. Please note that if a solid is a (planar or curved) board (of a certain thickness), then the surfaces on either side of the board are two parts of the surface of the solid; and the surface of the solid also includes the surfaces along the edge of the board.

Please note that the ridge 22 on top, as a closed curve, is the boundary of an exterior surface on the surface of the cookware; where the exterior surface is a part of the surface of the cookware, on the exterior side. The exterior surface does not touch the food ingredients contained in the cookware (but it is possible that some food ingredients may jump out of the cookware unintendedly and therefore may touch the exterior surface). Similarly, the closed curve 22 is also the boundary of an interior surface on the surface of the cookware 21. Same comment can be made for the ridge 22B or 22C of the cookware 21B or respectively, 21C. Either ridge is the boundary of an exterior surface (and also the boundary of an interior surface) on the surface of the respective cookware; where the exterior surface does not touch the food ingredients contained in the respective cookware. The surface of respective cookware is a union of the exterior surface, the interior surface and the ridge.

In some embodiments, the cookware 21 with the ridge 22 on top in the automated cooking apparatus 500B may be substituted by a cookware with a closed curve on the surface of the cookware, as far as the closed curve is the boundary curve of an exterior surface of the cookware, where the exterior surface does not touch the food ingredients contained in the cookware. A key requirement is that the distance from (any point of) the closed curve to a surface of the blocking device is substantially small if the blocking device is at an end-position, when the cookware is moved by the stirring motion mechanism 23.

Figure 30A:
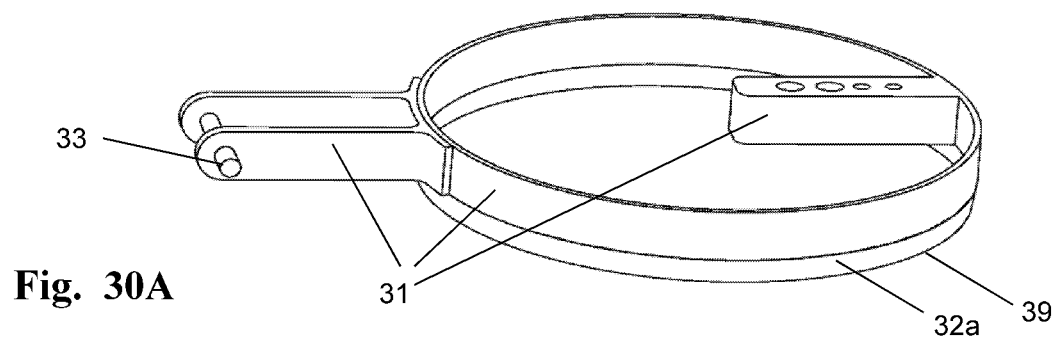
FIG. 30A-30C show aerial views of parts of the automated cooking apparatus in FIG. 29.
Figure 30B:
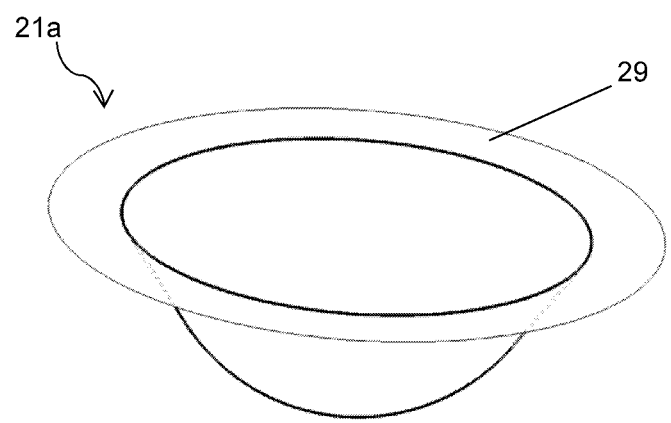
Figure 30C:
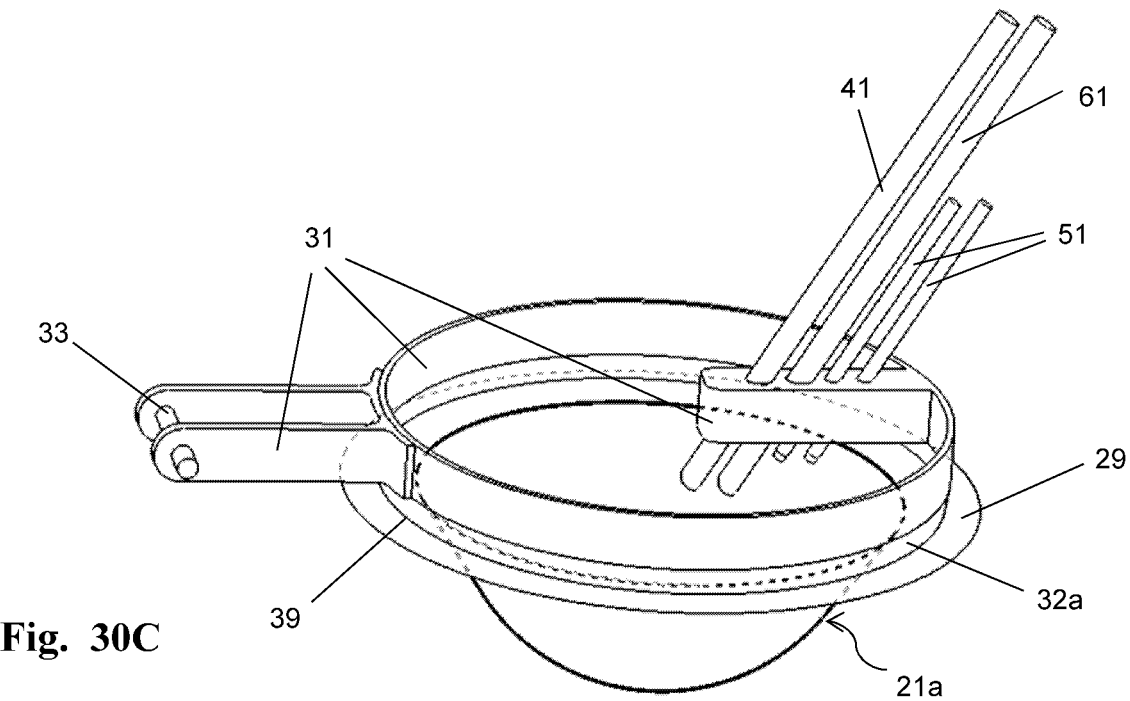

In some embodiments, referring to FIGS. 29, 30A-30C, an automated cooking apparatus 700 is same as the apparatus 500B, with the following modifications. The blocking device 32 is substituted by a blocking device 32a which has a closed curve at or near the trough (e.g. a bottom edge) of its surface. The cookware 21 is substituted by a cookware 21a which comprises a top surface (FIGS. 30A-30B). When the blocking device 32a is at an end-position, by design, the distance from (any point of) the closed curve of the blocking device to the top surface of the cookware stays substantially small while the cookware 21a is moved by the stirring motion mechanism 23. Then the stirring motion mechanism 23 in the cooking apparatus 700 may produce spherical motions, and the closed curve 32a of the blocking device 32 and the top surface 29 of the cookware 21a may substantially lie in two concentric spheres which are invariant surfaces of the stirring motion mechanism 23. The two concentric spheres are substantially close to each other.

The cookware 21a and blocking device 32a may also substitute the cookware 103 and blocking device 2111 in the apparatus 203; or in the apparatus 403.

It should be noted that the blocking device 32a and the cookware 21a of apparatus 700 may be of different shapes. The closed curve of the blocking device 32a may be a curve of round, oval, rectangular, polygonal or other shape, similarly to the ridge displayed in FIGS. 27A-27C, 28A-28C, among others. In some embodiments, the closed curve of the blocking device 32a may not be at or near a trough of the surface of the blocking device. It can be any closed curve on the surface of the blocking device 32a. The key requirement is that the distance from any point of the closed curve of the blocking device (at a certain fixed position) to a surface of the cookware (which is moved by a stirring motion mechanism) is substantially small.

It should be further noted that the top surface of the cookware 21a may have the shape of a ring, although this is not a requirement for our applications.

It should be further noted that the top surface of the cookware 21a borders with an exterior surface on the surface of the cookware 21a; where the exterior surface does not touch with the food ingredients contained in the cookware. The top surface 29 also borders with an interior surface on the surface of the cookware 21a. In fact, the cookware 21a and the top surface 29 may be substituted with a cookware and a sub-surface on the surface of the cookware, where the sub-surface borders an exterior surface (and an interior surface) so that the exterior surface does not touch the food ingredients contained in the cookware. The key requirement is that the distance from the points of a certain closed curve of the blocking device (at an end-position) to the sub-surface of the cookware (in motion) is substantially small.

The key requirement for the apparatus 500B is that the points of the closed curve 22 on the surface of the cookware 21 are within a substantially small distance from the bottom surface of the blocking device 32 of the lid mechanism 500 if the blocking device is at the first end-position, when the cookware is moved by a stirring motion mechanism 23. On the other hand, the cookware in motion should not (severely) collide with the blocking device to avoid substantially damaging their parts. This places some restraints on the design of the closed curve 22 of the cookware 21, the bottom surface of the blocking device 32, and the stirring motion mechanism 23. This restraint may be much easily fulfilled in the following designs. In some embodiments, the closed curve 22 of the cookware substantially lies in a first invariant surface of the stirring motion mechanism 23, the bottom surface of the blocking device 32 substantially lies in a second invariant surface of the stirring motion mechanism 23, and that the first and second invariant surfaces are substantially close to each other.

It should be noted that in order to limit the food ingredients from jumping out of the cookware through the space between the closed curve 22 of the cookware 21 and the bottom surface of the blocking device 32 in the apparatus 500B, the distance from any point of the closed curve to the bottom surface needs to be substantially small. One may ask the question: how small is substantially small? This distance is less than one millimeter in some applications, but no more than two millimeters in any case. In comparison, the maximum displacement of a point on the cookware in the movement produced by the stirring motion mechanism may be tens of millimeters, or even more depending on the size of the cookware.

Similarly, a closed curve or a surface substantially lies in an invariant surface, if it is within a substantially small distance of the invariant surface; where the definition of "substantially small distance" depends on factors such as the types of food ingredients. For the same reason as discussed in the previous paragraph, this distance can be less than one millimeter in some applications, but should be no more than two millimeters in any case.

For the present patent application, a sub-surface of a surface is meant to be a part of the surface. A surface may be divided into several sub-surfaces. The bottom surface of the blocking device is a sub-surface of the surface of the blocking device. The top surface 29 of the cookware is a sub-surface of the surface of the cookware.

It should be noted that the diameter of a cookware (e.g., cookware 101, or 21) should exceed 150 millimeters. Thus, the distance p or D, as discussed above, is substantially small compared with the size of the corresponding cookware.

In some embodiments, an automated cooking apparatus includes a cookware which is moved by a stirring motion mechanism, and a blocking device which is moved by a motion mechanism. The surface of the cookware comprises a closed curve; and the surface of the blocking device comprises a sub-surface. The distance from any point of the closed curve to the sub-surface stays substantially small if the blocking device is at an end-position, when the cookware is moved by the stirring motion mechanism. The closed curve of the cookware and the sub-surface of the blocking device may substantially lie in a pair of invariant surfaces of the stirring motion mechanism; where the pair of invariant surfaces are substantially close to each other. Although this is not a strict requirement, the closed curve is the boundary of an exterior surface of the cookware; where the exterior surface is designed to not touch the food ingredients contained in the cookware. It should be noted that the sub-surface here may be a top surface, or a bottom surface, or other types of surface of the blocking device.

In some embodiments, an automated cooking apparatus comprises a cookware which is moved by a stirring motion mechanism, and a blocking device which is moved by a motion mechanism. The surface of the blocking device may contain a closed curve; and the surface of the cookware may comprise a sub-surface. The distance from any point of the closed curve to the sub-surface stays substantially small if the blocking device is at an end-position, when the cookware is moved by the stirring motion mechanism. The closed curve and the sub-surface may substantially lie in a pair of invariant surfaces of the stirring motion mechanism. Although this is not a strict requirement, the surface of the cookware borders with an exterior surface of the cookware; where the exterior surface is designed to never touch the food ingredients contained in the cookware. It should be noted that the sub-surface here may be a top surface, or a bottom surface, or other types of surface of the cookware.

It should be noted that in each of the automated cooking apparatus described in the previous two paragraphs, the surface of the cookware may be divided into three non-overlapping parts: (1) an exterior surface, (2) an interior surface, and (3) either the closed curve in the paragraph before the previous paragraph or the sub-surface in the previous paragraph, in between the exterior surface and interior surface. The closed curve in the paragraph before the previous paragraph separates the interior surface and the exterior surface in the sense that a path on the surface of the cookware starting at (a point of) the interior surface ending at (a point of) the exterior surface needs to pass through the closed curve. Similarly, the sub-surface in the previous paragraph separates the interior surface and the exterior surface. The food ingredients contained in the cookware are designed to not touch the exterior surface.

Borrowing from terms of Mathematics (Set Theory, in fact), a subset of a set is a part (or the whole) of the set. A surface or a curve may be regarded as a set of points in space. The closed curve or sub-surface as discussed in the previous three paragraphs is a subset of the surface of one of the cookware and the blocking device. The interior surface or exterior surface as discussed in the previous paragraph is a subset of the surface of the cookware.

It should be noted that the blocking device may include two or more solids, each of which is moved by a motion mechanism. When these solids are at some certain positions, in combination they may substantially function as one whole solid.

The descriptions and the claims in this patent application should not be interpreted as overly rigorous mathematical statements, but rather interpreted in substantial, approximate or practical sense.

In some embodiments, the blocking device may be partly or entirely made by a net.

In some embodiments, an automated cooking apparatus may comprise: a cookware and a stirring motion mechanism configured to move the cookware; a blocking device and a motion mechanism configured to move the blocking device; wherein the surface of the cookware comprises a first sub-surface; wherein the surface of the blocking device comprises a second sub-surface. The first sub-surface and the second sub-surface are substantially close to each other if the blocking device is at a certain fixed position, when the cookware is moved by the stirring motion mechanism.

In some embodiments, an automated cooking apparatus may comprise: a cookware and a stirring motion mechanism configured to move the cookware; and a blocking device and a motion mechanism configured to move the blocking device; wherein the surface of the cookware comprises a first subset of points and the surface of the blocking device comprises a second subset of points. The points in the first subset are configured to be substantially close to the second subset of points, if the blocking device is at a certain fixed position, when the cookware is moved by the stirring motion mechanism. Moreover, the blocking device is configured to not interfere with the cookware when the cookware is moved by the stirring motion mechanism.

In some embodiments, an automated cooking apparatus may comprise: a cookware and a stirring motion mechanism configured to move the cookware; and a blocking device and a motion mechanism configured to move the blocking device; wherein the surface of the cookware comprises a first subset of points and the surface of the blocking device comprises a second subset of points. The points in the second subset are configured to be substantially close to the first subset of points, if the blocking device is at a certain fixed position, when the cookware is moved by the stirring motion mechanism. Moreover, the blocking device is configured to not interfere with the cookware when the cookware is moved by the stirring motion mechanism.

In some embodiments, an automated cooking apparatus may comprise: a cookware and a stirring motion mechanism configured to move the cookware; and a blocking device and a motion mechanism configured to move the blocking device; wherein the surface of the cookware comprises a first subset of points and the surface of the blocking device comprises a second subset of points. The first and second subsets are configured to be contained in a pair of invariant surface if the blocking device is at a certain fixed position, when the cookware is moved by the stirring motion mechanism; wherein the pair of invariant surfaces are configured to be substantially close to each other. Moreover, the blocking device is configured to not interfere with the cookware when the cookware is moved by the stirring motion mechanism.

In the present patent application, when we say, "a block device is at an end-position," we mean the block device is at a certain fixed position relative to a support component, usually a support component where the stirring motion mechanism is mounted on.

It should be noted that in the automated cooking apparatus 500B, 700 or in other automated cooking apparatus as discussed above, the motion mechanism to move the blocking device may be substituted by a motion mechanism configured to move the support component of the stirring motion mechanism relative to the blocking device, while blocking device is at a fixed position.

In some embodiments, an automated cooking apparatus comprises: a cookware; a stirring motion mechanism comprising a support component and a mechanism configured to move the cookware relative to the support component as to stir, mix or distribute the food or food ingredients held in the cookware; a blocking device which is configured to be fixed to a second support component; and a motion mechanism configured to move the first support component relative to the second support component. When the first support component is moved to a certain fixed position relative to the second support component, the distance from a closed curve of the cookware to the surface of the blocking device is configured to be substantially small. Moreover, the blocking device is configured to not interfere with the cookware when the cookware is moved by the stirring motion mechanism.

In some embodiments, an automated cooking apparatus comprises: a cookware; a stirring motion mechanism comprising a support component and a mechanism configured to move the cookware relative to the support component as to stir, mix or distribute the food or food ingredients held in the cookware; a blocking device which is configured to be fixed to a second support component; and a motion mechanism configured to move the first support component relative to the second support component. When the first support component is moved to a certain fixed position relative to the second support component, the distance from a closed curve of the blocking device to the surface of the cookware is configured to be substantially small. Moreover, the blocking device is configured to not interfere with the cookware when the cookware is moved by the stirring motion mechanism.

More examples of stirring motion mechanisms are described in the U.S. patent application Ser. No. 13/607,712, filed Sep. 8, 2012, the disclosures of which are hereby incorporated herein by reference in their entireties.

It should be noted that a support component of a motion mechanism may comprise a frame, a board, a shell, a solid, etc. In many applications, a support component of a motion mechanism provides a base on which some other parts of the motion mechanism may be mounted.

It should be noted that a cookware may comprise a barrier as to help better stir or mix the food or food ingredients held in the cookware when the cookware is moved by a stirring motion mechanism.

It should be noted that each of our stirring motion mechanisms produces rather complex movements in the cookware. It is advantageous than rotational motions around an axis, as our stirring motion does not induce eccentric forces which can make the food or food ingredients move away from a rotating axis, and escape the cookware en masse.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the term cookware is used to generally refer to a device for containing food ingredients during cooking. Other words such as wok, cooking pot, cooking pan, cooking board, etc. can also be used to describe the cooking device. The cooking is also not limited to any particular ethnic styles such as stir fry, and the cooking of Asian, Mexican, Middle Eastern, or European food. The cooking apparatus may or may not use a heater.

What is claimed is:

1. An automated cooking apparatus, comprising:
a cookware configured to hold food or food ingredients;
a stirring motion mechanism comprising:
  a support component;
  a first rotational mechanism comprising:
    two mating parts; and
    a connection configured to constrain the relative motion of the two mating parts to a rotation around a first axis of rotation; and
  a second rotational mechanism comprising:
    two mating parts; and
    a connection configured to constrain the relative motion of the two mating parts to a rotation around a second axis of rotation;
  wherein the first axis of rotation of the first rotational mechanism is configured to be different from the second axis of rotation of the second rotational mechanism;
  wherein a part of the first rotational mechanism is connected to a part of the second rotational mechanism
  wherein the stirring motion mechanism is configured to move the cookware relative to the support component as to stir, mix or distribute the food ingredients contained in the cookware; and
a lid mechanism comprising a blocking device and a motion mechanism configured to move the relative position between the blocking device and the support component of the stirring motion mechanism, said lid mechanism further comprising a first position for the blocking device relative to the support component of the stirring motion mechanism;
wherein the blocking device is configured to not interfere with the cookware when the cookware is moved by the stirring motion mechanism;
wherein the blocking device is configured to help trap the food or food ingredients held in the cookware when the cookware is moved by the stirring motion mechanism and when the blocking device is fixed at the first position relative to the support component of the stirring motion mechanism.

2. The automated cooking apparatus of claim 1, wherein the surface of one of the cookware and the blocking device comprises a closed curve, wherein the surface of the other one of the cookware and the blocking device comprises a sub-surface.

3. The automated cooking apparatus of claim 2, wherein said closed curve is contained in an invariant surface of the stirring motion mechanism and said sub-surface is contained in another invariant surface of the stirring motion mechanism, if the blocking device is at the first position relative to the support component of the stirring motion mechanism.

4. The automated cooking apparatus of claim 3,
wherein the stirring motion mechanism is configured to produce a planar movement in the cookware,
wherein said closed curve and said sub-surface are respectively contained in a pair of parallel planes relative to the support component of the stirring motion mechanism if the blocking device is fixed at the first position relative to the support component of the stirring motion mechanism,
wherein the trajectory of any point in the motion produced by the stirring motion mechanism is contained in a plane which is parallel to said pair of planes.

5. The automated cooking apparatus of claim 3,
wherein the stirring motion mechanism is configured to produce a spherical movement in the cookware,
wherein said closed curve and said sub-surface are respectively contained in a pair of concentric spheres relative to the support component of the stirring motion mechanism if the blocking device is fixed at the first position relative to the support component of the stirring motion mechanism,
wherein the trajectory of any point in the motion produced by the stirring motion mechanism is contained in a sphere which is concentric with said pair of spheres.

6. The automated cooking apparatus of claim 1,
wherein the blocking device is configured to have a passage in the middle,
wherein the lid mechanism further comprises a cover and a second motion mechanism configured to move the cover as to open or close the passage.

7. The automated cooking apparatus of claim 6, wherein the cover comprises a solid cover.

8. The automated cooking apparatus of claim 6, wherein the cover comprises a porous or net cover.

9. The automated cooking apparatus of claim 1, further comprising a cover; wherein the cover and the blocking device are rigidly joined together.

10. The automated cooking apparatus of claim 1, wherein the two mating parts of the first rotational mechanism respectively comprises a shaft and a bearing housing, wherein the two mating parts of the second rotational mechanism respectively comprise a shaft and a bearing housing.

11. The automated cooking apparatus of claim 1, wherein the blocking device comprises a solid in the shape of a ring.

12. The automated cooking apparatus of claim 1, further comprising a pipe configured to dispense liquid or other ingredient into the cookware.

13. The automated cooking apparatus of claim 1, wherein the motion mechanism of the lid mechanism is configured to move the support component of the stirring motion mechanism relative to the blocking device.

14. The automated cooking apparatus of claim 1, wherein the motion mechanism of the lid mechanism is configured to move the blocking device or a lid relative to the support component of the stirring motion mechanism.

15. The automated cooking apparatus of claim 14, wherein the motion mechanism comprises a cam, wherein the cam is fixedly connected to the blocking device.

16. The automated cooking apparatus of claim 15, wherein the motion mechanism further comprises: a first component configured to rotate around an axis relative to the support component; and a second component configured to be rotatable relative to the first component; wherein the second component is configured to be in contact with the cam as to move the cam when the first component is rotated in between some positions.

17. The automated cooking apparatus of claim 1, further comprising an unloading mechanism configured to unload cooked food from the cookware into a container, wherein the unloading mechanism is configured to produce a two-way motion in the support component of the stirring motion mechanism.

18. The automated cooking apparatus of claim 1, further comprising a computer.

* * * * *